US011460628B2

(12) United States Patent
Schowengerdt et al.

(10) Patent No.: US 11,460,628 B2
(45) Date of Patent: Oct. 4, 2022

(54) PROJECTOR INTEGRATED WITH A SCANNING MIRROR

(71) Applicant: Magic Leap, Inc., Plantation, FL (US)

(72) Inventors: Brian T. Schowengerdt, Seattle, WA (US); Mathew D. Watson, Bellevue, WA (US); Steven Alexander-Boyd Hickman, Seattle, WA (US); Charles David Melville, Camano Island, WA (US); Samuel Scott Frank, Shoreline, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/211,276

(22) Filed: Mar. 24, 2021

(65) Prior Publication Data

US 2021/0278587 A1     Sep. 9, 2021

Related U.S. Application Data

(63) Continuation of application No. PCT/US2019/053592, filed on Sep. 27, 2019.
(Continued)

(51) Int. Cl.
*G02B 6/00* (2006.01)
*F21V 8/00* (2006.01)
(Continued)

(52) U.S. Cl.
CPC ............ *G02B 6/0078* (2013.01); *G02B 6/12* (2013.01); *H04N 5/7408* (2013.01); *G02B 2006/0098* (2013.01)

(58) Field of Classification Search
CPC .............. G02B 6/0078; G02B 6/12; G02B 2006/0098; H04N 5/7408
(Continued)

(56) References Cited

U.S. PATENT DOCUMENTS 4,711,512 A * 12/1987 Upatnieks .......... G02B 27/4272
359/15
2003/0202247 A1 * 10/2003 Niv ...................... G02B 5/1847
359/569

(Continued)

FOREIGN PATENT DOCUMENTS

| CN | 106133569 A | 11/2016 |
| WO | 2020069371 A1 | 4/2020 |
| WO | 2020069400 A1 | 4/2020 |

OTHER PUBLICATIONS

Application No. EP19867430.1, Extended European Search Report, dated Oct. 15, 2021, 8 pages.
(Continued)

*Primary Examiner* — Jerry M Blevins
(74) *Attorney, Agent, or Firm* — Kilpatrick Townsend & Stockton LLP

(57) ABSTRACT

A waveguide display system may include an eyepiece waveguide that can have a first surface and a second surface, the waveguide including an incoupling diffractive optical element (DOE) and an outcoupling DOE. The waveguide display system may include a light source and a scanning mirror, and may include reflective and collimating optical elements. The incoupling DOE can be configured to selectively propagate incident light beams to the outcoupling DOE in the waveguide through total internal reflection (TIR).

19 Claims, 31 Drawing Sheets

Related U.S. Application Data

(60) Provisional application No. 62/896,138, filed on Sep. 5, 2019, provisional application No. 62/738,900, filed on Sep. 28, 2018, provisional application No. 62/738,907, filed on Sep. 28, 2018.

(51) Int. Cl.
  *G02B 6/12* (2006.01)
  *H04N 5/74* (2006.01)

(58) Field of Classification Search
  USPC .......................................................... 349/62
  See application file for complete search history.

(56) References Cited

U.S. PATENT DOCUMENTS

| | | |
|---|---|---|
| 2010/0079865 A1 | 4/2010 | Saarikko et al. |
| 2010/0201953 A1 | 8/2010 | Freeman et al. |
| 2013/0285885 A1 | 10/2013 | Nowatzyk et al. |
| 2017/0038579 A1 | 2/2017 | Yeoh et al. |
| 2017/0153460 A1* | 6/2017 | Vallius ............... G02B 27/0172 |
| 2018/0120559 A1 | 5/2018 | Yeoh et al. |
| 2018/0275396 A1 | 9/2018 | Schowengerdt et al. |
| 2021/0278686 A1 | 9/2021 | Schowengerdt et al. |

OTHER PUBLICATIONS

Liu, et al., "All-Angle Negative Reflection with An Ultrathin Acoustic Gradient Metasurface: Floquet-Bloch Modes Perspective and Experimental Verification", Scientific Reports, vol. 7, Article No. 13852, Oct. 23, 2017, pp. 1-9.

PCT/US2019/053538, "International Preliminary Report on Patentability", dated Apr. 8, 2021, 7 pages.

PCT/US2019/053538, "International Search Report and Written Opinion", dated Dec. 19, 2019, 8 pages.

PCT/US2019/053592, "International Preliminary Report on Patentability", dated Apr. 8, 2021, 9 pages.

PCT/US2019/053592, "International Search Report and Written Opinion", dated Feb. 10, 2020, 12 pages.

PCT/US2019/053592, "Invitation to Pay Additional Fees and, Where Applicable, Protest Fee", Dec. 13, 2019, 2 pages.

* cited by examiner

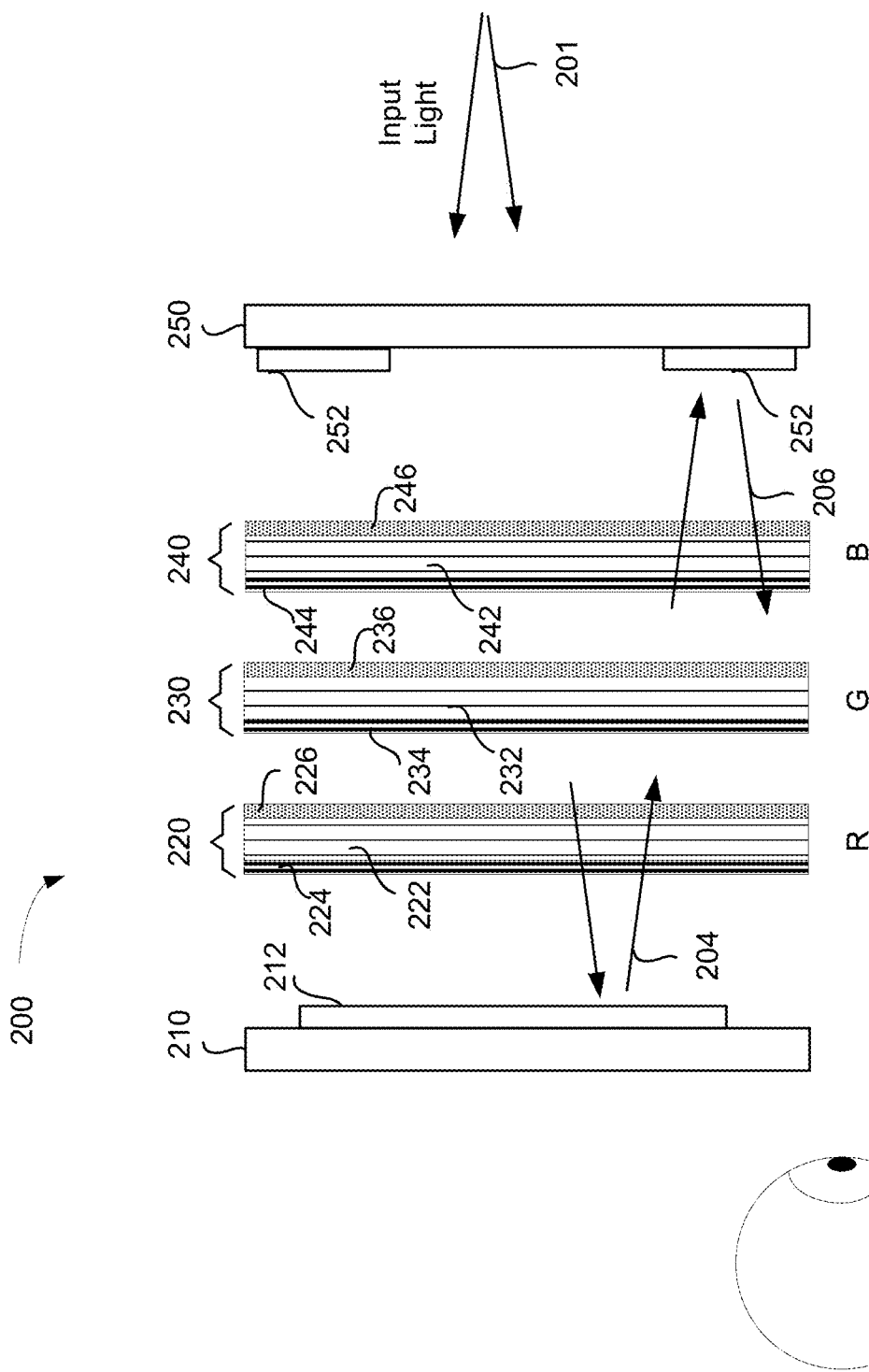

PROJECTOR INTEGRATED WITH A SCANNING MIRROR

CROSS-REFERENCES TO RELATED APPLICATIONS

This application is a continuation of International Patent Application No. PCT/US2019/053592, filed Sep. 27, 2019, entitled "PROJECTOR INTEGRATED WITH A SCANNING MIRROR," which claims the benefit of and priority to U.S. Provisional Application No. 62/896,138, filed Sep. 5, 2019, entitled "PROJECTOR INTEGRATED WITH A SCANNING MIRROR," U.S. Provisional Patent Application No. 62/738,900, filed Sep. 28, 2018, entitled "METHOD AND SYSTEM FOR PROJECTOR INTEGRATED WITH A SCANNING MIRROR," and U.S. Provisional Patent Application No. 62/738,907, filed Sep. 28, 2018, entitled "METHOD AND SYSTEM FOR FIBER SCANNING PROJECTOR WITH ANGLED EYEPIECE," the entire disclosures of which are hereby incorporated by reference, for all purposes, as if fully set forth herein.

This application is related to U.S. patent application No. U.S. Ser. No. 17/210,236, filed Mar. 23, 2021, entitled "METHOD AND SYSTEM FOR FIBER SCANNING PROJECTOR WITH ANGLED EYEPIECE," which is a continuation of International Patent Application No. PCT/US2019/053538, filed Sep. 27, 2019, entitled "METHOD AND SYSTEM FOR FIBER SCANNING PROJECTOR WITH ANGLED EYEPIECE," which claims priority to U.S. Provisional Patent Application No. 62/738,907, filed Sep. 28, 2018, entitled "METHOD AND SYSTEM FOR FIBER SCANNING PROJECTOR WITH ANGLED EYEPIECE."

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

According to an embodiment of the present invention, a waveguide display system is provided. The waveguide display system includes a waveguide having a first surface and a second surface, the waveguide including an incoupling DOE (diffractive optical element) and an outcoupling DOE. The waveguide display system also includes a first light beam transmitted toward the incoupling DOE of the waveguide and a first reflective optical element, configured to receive the first light beam passing through the incoupling DOE of the waveguide. The first reflective optical element is configured to reflect a second light beam toward the incoupling DOE of the waveguide. The first reflective optical element is configured to reflect the received first light beam as the second light beam. The waveguide display system is configured to prevent propagation of the first light beam to the outcoupling DOE in the waveguide through total internal reflection (TIR) and cause the second light beam to propagate to the outcoupling DOE in the waveguide through TIR.

In some embodiments of the above waveguide display system, the angles of incidence of the first and second light beams and a grating period of the incoupling DOE are configured to determine diffraction angles, such that the first light beam transmitting through the incoupling DOE does not satisfy a TIR condition for the first light beam to propagate to the outcoupling DOE, and the second light beam reaching the incoupling DOE satisfies the TIR condition to propagate to the outcoupling DOE.

In some embodiments, diffraction of the first light beam by the incoupling DOE produces a first negative first order diffracted light beam that fails total internal reflection (TIR) condition of the waveguide, and diffraction of the second light beam by the incoupling DOE produces a second negative first order diffracted light beam that meets the TIR condition of the waveguide.

In some embodiments, the first light beam is a non-scanning collimated image beam, and the first reflective optical element is a scanning mirror.

In some embodiments, wherein the first light beam is a divergent light beam provided by a scanning light source, and the first reflective optical element is a collimating scanning mirror.

In some embodiments, wherein the scanning light source includes a fiber scanner.

In some embodiments, wherein the scanning light source includes a cantilever scanner.

In some embodiments, the first light beam is a collimated light beam provided by a collimating mirror, and the first reflective optical element can be a non-collimating scanning mirror.

In some embodiments, the waveguide display system also includes a scanning mirror and a light source, and the first light beam is a scanned divergent light beam provided by the scanning mirror. The scanning mirror is configured to receive an input light beam from the light source and provide the scanned divergent light beam. The scanned divergent light beam is transmitted through the waveguide to reach the first reflective optical element. The first reflective optical element is a collimating mirror, which is configured to receive the scanned divergent light beam and provide a reflected collimated light beam to the waveguide.

In some embodiments, the light source includes a fiber scanner.

In some embodiments, the light source includes a cantilever scanner.

In some embodiments, wherein the light source includes a fiber point light source.

In some embodiments, the light source includes a waveguide disposed on a cantilever beam.

In some embodiments, the light source and the scanning mirror are disposed on a same side of the waveguide.

In some embodiments, the light source and the scanning mirror are disposed on an opposite side of the waveguide.

In some embodiments, the incoupling DOE is configured to prevent propagation of the input light beam to the outcoupling DOE in the waveguide through total internal reflection (TIR).

In some embodiments, the waveguide display system is configured such that the input light beam enters the waveguide without going through the incoupling DOE.

According to another embodiment of the present invention, a waveguide display system is provided. The waveguide display system includes a waveguide having a first surface and a second surface, the waveguide including an incoupling DOE (diffractive optical element) and an outcoupling DOE. The incoupling DOE is a polarization-sensitive DOE that is configured to pass through a light beam of a first polarization and to diffract a light beam of a second polarization. The waveguide display system also includes a light source for transmitting toward the first surface of the waveguide a first light beam of a first polarization toward the incoupling DOE and through the incoupling DOE, a first reflective optical element disposed adjacent to the second surface of the waveguide, and a wave plate disposed adjacent to the second surface of the waveguide and between the waveguide and the first reflective optical element. The first reflective optical element is configured to receive the first light beam after it passes through the incoupling DOE and the wave plate. The first reflective optical element is configured to reflect the received first light beam through the wave plate toward the waveguide. The waveguide display system is configured to convert the first light beam from the first polarization to the second polarization after two passes through the wave plate and cause the incoupling DOE to diffract the first light beam received from the first reflective optical element and the wave plate to propagate in the waveguide to the outcoupling DOE through total internal reflection (TIR).

In some embodiments of the above waveguide display system, the first light beam is a collimated light beam.

In some embodiments, the first reflective optical element is a scanning mirror.

In some embodiments, the wave plate is a quarter wave plate.

According to an embodiment of the present invention, a waveguide display system is provided. The waveguide display system includes a waveguide having a first surface and a second surface, the waveguide including an incoupling DOE (diffractive optical element) and an outcoupling DOE. The waveguide display system also includes a collimated light source for transmitting an input collimated light beam toward the first surface of the waveguide at a first incident angle and a scanning mirror disposed adjacent to the second surface of the waveguide. The scanning mirror is configured to receive the input collimated light beam and to provide a reflected collimated light beam toward the waveguide at a second incident angle. The incoupling DOE is configured to prevent the collimated input light beam from propagating to the outcoupling DOE in the waveguide through total internal reflection (TIR) and cause the reflected collimated light beam to propagate to the outcoupling DOE in the waveguide through total internal reflection (TIR).

In some embodiments of the above waveguide display system, the incoupling DOE is disposed adjacent the first surface of the waveguide.

In some embodiments, angles of incidence of the input collimated light beam and the reflected collimated light beam and a grating period of the incoupling DOE are configured to determine diffraction angles, such that the input collimated light beam transmitting through the incoupling DOE does not satisfy a TIR condition for propagating to the outcoupling DOE, and the reflected collimated light beam reaching the incoupling DOE satisfies the TIR condition for propagating to the outcoupling DOE.

According to another embodiment of the present invention, a waveguide display system is provided. The waveguide display system includes a waveguide having a first surface and a second surface, the waveguide including an incoupling DOE (diffractive optical element) and an outcoupling DOE and a scanning light source disposed adjacent to the first surface of the waveguide. The scanning light source is configured to scan a divergent input light beam toward the incoupling DOE at a first incident angle. The waveguide display system also includes a scanning mirror disposed adjacent to the second surface of the waveguide, the scanning mirror being a collimating optical element configured to receive the divergent input light beam from the scanning light source through the waveguide, and to provide a collimated reflected light beam toward the incoupling DOE of the waveguide. The incoupling DOE is configured to prevent the divergent input light beam from propagating to the outcoupling DOE in the waveguide through total internal reflection (TIR) and cause the collimated reflected light beam to propagate to the outcoupling DOE in the waveguide through total internal reflection (TIR).

In some embodiments of the above waveguide display system, the incoupling DOE is a periodic grating having a pitch configured to selectively incouple light beams of different incident angles.

In some embodiments, the incoupling DOE is configured to diffract the divergent input light beam to produce a first negative first order diffracted light beam that fails a total internal reflection (TIR) condition of the waveguide.

In some embodiments, the incoupling DOE is configured to diffract the collimated reflected light beam to produce a second negative first order diffracted light beam that meets a total internal reflection (TIR) condition of the waveguide.

In some embodiments, the scanning light source includes a fiber scanner, which includes an optical fiber and a scanning mechanism configured to scan the optical fiber in a linear direction, such that a tip of the optical fiber is configured to scan along a trajectory, the trajectory defining a first optical axis.

In some embodiments, the scanning light source includes a cantilever scanner, which includes a cantilevered optical member including a waveguide and a scanning mechanism configured to scan the cantilevered optical member in a linear direction, such that a tip of the cantilevered optical member is configured to scan along a trajectory, the trajectory defining a first optical axis.

In some embodiments, the first incident angle is formed between an optical axis of the divergent input light beam and a normal of the first surface of the waveguide.

In some embodiments, the scanning mirror is configured to provide a collimated reflected light beam along a second optical axis toward the waveguide at a second incident angle, the second incident angle defined by a second optical axis and a normal of the first surface of the waveguide.

In some embodiments, the scanning mirror is a one-axis scanning mirror that scans in a direction orthogonal to a scan direction of the scanning light source.

According to an embodiment of the present invention, a waveguide display system is provided. The waveguide display system includes a waveguide having a first surface and a second surface, the waveguide including an incoupling DOE (diffractive optical element), an outcoupling DOE, and a scanning light source disposed adjacent to the first surface of the waveguide. The scanning light source is configured to scan a divergent input light beam to the incoupling DOE of the waveguide at a first incident angle. The waveguide display system also includes a scanning mirror disposed adjacent to the second surface of the waveguide, the scanning mirror configured to receive the divergent input light beam from the scanning light source through the waveguide, and to provide a divergent reflected light beam toward the incoupling DOE at a second incident angle and a collimating optical element positioned adjacent to the first surface of the waveguide, the collimating optical element being configured to receive the divergent reflected light beam emitted from the scanning mirror through the incoupling DOE of the waveguide, and to produce a collimated light beam toward the waveguide. The incoupling DOE is configured to prevent the divergent input light beam from the scanning light source from propagating to the outcoupling DOE in the waveguide through total internal reflection (TIR), prevent the divergent reflected light beam from the scanning mirror from propagating to the outcoupling DOE in the waveguide through TIR, and cause the collimated light beam to propagate to the outcoupling DOE in the waveguide through TIR.

In some embodiments of the above waveguide display system, the incoupling DOE is disposed adjacent to the first surface of the waveguide.

In some embodiments, the incoupling DOE is a periodic grating having a pitch configured to selectively incouple light beams of different incident angles.

In some embodiments, the scanning light source includes a fiber scanner, which includes an optical fiber and a scanning mechanism configured to scan the optical fiber in a linear direction, such that a tip of the optical fiber is configured to scan along a trajectory, the trajectory defining a first optical axis.

In some embodiments, the scanning light source includes a cantilever scanner, which includes a cantilevered optical member including a waveguide and a scanning mechanism configured to scan the cantilevered optical member in a linear direction, such that a tip of the cantilevered optical member is configured to scan along a trajectory, the trajectory defining a first optical axis.

In some embodiments, the scanning mirror is a one-axis scanning mirror that scans in a direction orthogonal to a scan direction of the scanning light source.

According to an alternative embodiment of the present invention, a waveguide display system is provided. The waveguide display system includes a waveguide having a first surface and a second surface, the waveguide including an incoupling DOE (diffractive optical element) and an outcoupling DOE and a scanning light source disposed adjacent to the first surface of the waveguide. The scanning light source is configured to project a divergent input light beam to the waveguide at a first incident angle. The waveguide display system also includes a collimating optical element positioned adjacent to the first surface of the waveguide, the collimating optical element being configured to receive the divergent input light beam emitted from the scanning light source, and to produce a collimated reflected light beam toward the incoupling DOE of the waveguide at a first incident angle, and a scanning mirror disposed adjacent to the second surface of the waveguide, the scanning mirror configured to receive the collimated reflected light beam from the collimating optical element, and to provide a collimated scanned light beam toward the incoupling DOE of the waveguide at a second incident angle. The incoupling DOE is configured to prevent the collimated reflected light beam from the collimating optical element from propagating to the outcoupling DOE in the waveguide through total internal reflection (TIR) and cause the collimated scanned light beam from the scanning mirror to propagate to the outcoupling DOE in the waveguide through total internal reflection (TIR).

In some embodiments of the above waveguide display system, the incoupling DOE is disposed adjacent to the first surface of the waveguide.

In some embodiments, the incoupling DOE is a periodic grating having a pitch configured to selectively incouple light beams of different incident angles.

In some embodiments, the scanning light source includes a fiber scanner, which includes an optical fiber having an angled facet such that a light beam emitted from a tip of the optical fiber is refracted at an angle relative to an axis of the optical fiber, and a scanning mechanism configured to scan the optical fiber in a linear direction, such that a tip of the optical fiber is configured to scan along a trajectory, the trajectory defining a first optical axis.

In some embodiments, the scanning light source includes a cantilever scanner, which includes a cantilevered optical member including a waveguide and a scanning mechanism configured to scan the cantilevered optical member in a linear direction, such that a tip of the cantilevered optical member is configured to scan along a trajectory, the trajectory defining a first optical axis.

In some embodiments, the collimating optical element comprises a section of a concave collimating mirror.

In some embodiments, a normal of the collimating optical element is disposed at an angle relative to the scanning light source such that the collimated reflected light beam from the collimating optical element is directed away from the scanning light source.

In some embodiments, the scanning mirror is a one-axis scanning mirror that scans in a direction orthogonal to a scan direction of the scanning light source.

In some of the above waveguide display systems, the scanning light source can be a fiber scanner, which includes an optical fiber and a scanning mechanism configured to scan the optical fiber in a linear direction, such that a tip of the optical fiber is configured to scan along a trajectory, the trajectory defining a first optical axis. Alternatively, the scanning light source can be a cantilever scanner, which includes a cantilevered optical member having a waveguide and a scanning mechanism configured to scan the cantilevered optical member in a linear direction, such that a tip of the cantilevered optical member is configured to scan along a trajectory, the trajectory defining a first optical axis.

According to yet another embodiment of the present invention, a waveguide display system is provided. The waveguide display system includes a waveguide having a first surface and a second surface, the waveguide including an incoupling DOE (diffractive optical element) and an outcoupling DOE, and a point light source disposed adjacent to the second surface of the waveguide. The point light source is configured to provide a divergent input light beam to a portion of the waveguide outside the incoupling DOE. The waveguide display system also includes a scanning mirror disposed adjacent to the second surface of the waveguide, the scanning mirror configured to receive the divergent input light beam from the point light source to provide a divergent reflected light beam toward the incoupling DOE of the waveguide, and a collimating lens positioned adjacent to the second surface of the waveguide and between the scanning mirror and the waveguide. The collimating lens being configured to receive the divergent reflected light beam emitted from the scanning mirror and to produce a collimated reflected light beam toward the incoupling DOE of the waveguide. The incoupling DOE is configured to diffract the collimated reflected light beam to propagate to the outcoupling DOE in the waveguide through total internal reflection (TIR).

In some embodiments of the above waveguide display system, the point light source includes a fiber point light source or a cantilever point light source.

According to yet another specific embodiment of the present invention, a waveguide display system is provided. The waveguide display system includes a waveguide having a first surface and a second surface, the waveguide including an incoupling DOE (diffractive optical element) and an outcoupling DOE, and a point light source disposed adjacent to the first surface of the waveguide. The point light source is configured to provide a divergent input light beam to a portion of the waveguide outside the incoupling DOE. The waveguide display system also includes a scanning mirror disposed adjacent to the second surface of the waveguide, the scanning mirror configured to receive the divergent input light beam from the point light source through the waveguide and to provide a divergent reflected light beam toward the incoupling DOE of the waveguide. The waveguide display system further includes a collimating scanning optical element positioned adjacent to the first surface of the waveguide, the collimating scanning optical element being configured to receive the divergent reflected light beam emitted from the scanning mirror through the incoupling DOE of the waveguide and to produce a collimated reflected light beam toward the incoupling DOE of the waveguide. The incoupling DOE is configured to prevent the divergent reflected light beam from the scanning mirror from propagating to the outcoupling DOE in the waveguide through total internal reflection (TIR) and cause the collimated reflected light beam to propagate to the outcoupling DOE in the waveguide through total internal reflection (TIR).

In some embodiments of the above waveguide display system, the incoupling DOE is disposed adjacent to the first surface of the waveguide.

In some embodiments, the incoupling DOE is a periodic grating having a pitch configured to selectively incouple light beams of different incident angles.

In some embodiments, incoupling DOE is configured to pass through the divergent reflected light beam from the scanning mirror and incouple the collimated reflected light beam from the collimating scanning optical element to propagate to the outcoupling DOE in the waveguide through total internal reflection (TIR).

In some embodiments, the point light source includes a fiber point light source, which includes an optical fiber having a tip with an angled facet, and the optical fiber is configured to emit a light beam in a direction at an angle with respect to an axis of the optical fiber.

In some embodiments, the point light source comprises a cantilever scanner with a waveguide.

According to yet another alternative embodiment of the present invention, a waveguide display system is provided. The waveguide display system includes a waveguide having a first surface and a second surface, the waveguide including an incoupling DOE (diffractive optical element) and an outcoupling DOE, a collimating scanning optical element positioned adjacent to the first surface of the waveguide, and a scanning mirror disposed adjacent to the second surface of the waveguide. The waveguide display system also includes a point light source disposed adjacent to the second surface of the waveguide. The point light source is configured to provide a divergent input light beam to the scanning mirror. The scanning mirror is configured to receive the divergent input light beam from the point light source and to provide a divergent reflected light beam toward the waveguide at a first incident angle. The collimating optical element is configured to receive the divergent reflected light beam emitted from the scanning mirror through the incoupling DOE of the waveguide and to produce a collimated reflected light beam toward the waveguide at a second incident angle. The incoupling DOE is configured to prevent the divergent reflected light beam from the scanning mirror from propagating to the outcoupling DOE in the waveguide through total internal reflection (TIR) and cause the collimated reflected light beam to propagate to the outcoupling DOE in the waveguide through total internal reflection (TIR).

In some of the above waveguide display systems, the point light source can include a fiber point light source or a cantilever point light source.

In some embodiments of the above waveguide display system, the waveguide display system of claim 56, the incoupling DOE is disposed adjacent to the first surface of the waveguide.

In some embodiments, the incoupling DOE is a periodic grating having a pitch configured to selectively incouple light beams of different incident angles.

In some embodiments, the incoupling DOE is configured to pass through the divergent reflected light beam from the scanning mirror and incouple the collimated reflected light beam from the collimating scanning optical element to propagate to the outcoupling DOE in the waveguide through TIR.

In some embodiments, the point light source includes a fiber point light source, which includes an optical fiber having a tip with an angled facet, and the optical fiber is configured to emit a light beam in a direction at an angle with respect to an axis of the optical fiber.

In some embodiments, the point light source comprises a cantilever scanner with a waveguide.

In some embodiments, the scanning mirror is configured to provide the divergent reflected light beam toward the waveguide at a first incident angle and the collimating scanning optical element is configured to produce a collimated reflected light beam toward the waveguide at a second incident angle.

According to some alternative embodiments of the present invention, a two-dimensional scanning light source includes a cantilever scanner configured to provide a scanning light beam and a reflective optical element disposed adjacent to the cantilever scanner and configured to receive the scanning light beam and to provide a reflected scanning light beam. The two-dimensional scanning light source also includes a collimating optical element disposed adjacent to the reflective optical element and configured to receive the reflected scanning light beam from the reflective optical element and to provide a collimated scanning light beam. The two-dimensional scanning light source also includes a scanning optical element disposed adjacent to the collimating optical element and configured to receive the collimated scanning light beam and to provide a collimated two-dimensional scanning light beam.

In some embodiments of the above two-dimensional scanning light source, the cantilever scanner includes a base portion, and a cantilevered optical member protruding from the base portion. The cantilevered optical member includes a waveguide for coupling to a light source. The two-dimensional scanning light source also includes a transducer assembly includes one or more piezoelectric actuators coupled to the cantilevered optical member and configured to induce motion of the cantilevered optical member in a first scan plane to provide the scanning light beam.

In some embodiments, the base portion of the cantilever scanner comprises a layer of monocrystalline silicon and wherein the cantilevered optical member comprises a cantilevered beam integrally formed with and protruding from the layer of monocrystalline silicon.

In some embodiments, each of the one or more piezoelectric actuators is oriented in a direction substantially parallel to a longitudinal axis of the cantilevered optical member.

In some embodiments, the scanning optical element is a one-axis scanning mirror that scans in a second plane orthogonal to the first scan plane of the cantilever scanner.

In some embodiments, the collimating optical element comprises a mirror with positive optical power.

In some embodiments, the collimating optical element is a concave mirror.

In some embodiments, the cantilever scanner, the reflective optical element, the collimating optical element, and the scanning optical element are integrated in a silicon micro-electro-mechanical system (MEMS) device.

According to some embodiments of the invention, a waveguide display system includes a waveguide, a cantilever scanner, a reflective optical element, a collimating optical element, and a scanning optical element. The waveguide has a first surface and a second surface, and includes an incoupling DOE (diffractive optical element) and an outcoupling DOE. The cantilever scanner is disposed adjacent to the first surface of the waveguide and is configured to provide a scanning light beam. The reflective optical element is disposed adjacent to the cantilever scanner and configured to receive the scanning light beam and to provide a reflected scanning light beam. The collimating optical element is disposed adjacent to the reflective optical element and configured to receive the reflected scanning light beam from the reflective optical element and to provide a collimated scanning light beam. The scanning optical element is disposed adjacent to the collimating optical element and configured to receive the collimated scanning light beam and to provide a collimated two-dimensional scanning light beam. The cantilever scanner, the reflective optical element, the collimating optical element, and the scanning optical element are disposed on a same side of the waveguide, adjacent to the first surface. The waveguide is configured to receive the collimated two-dimensional scanning light beam at the incoupling DOE and to propagate the collimated two-dimensional scanning light beam to the outcoupling DOE through total internal reflection (TIR).

In some embodiments of the above waveguide display system, the cantilever scanner includes a base portion and a cantilevered optical member protruding from the base portion. The cantilevered optical member includes a waveguide for coupling to a light source. the cantilever scanner also includes a transducer assembly comprising one or more piezoelectric actuators coupled to the cantilevered optical member and configured to induce motion of the cantilevered optical member in a first scan plane to provide the scanning light beam.

In some embodiments, the base portion of the cantilever scanner comprises a layer of monocrystalline silicon and wherein the cantilevered optical member comprises a cantilevered beam integrally formed with and protruding from the layer of monocrystalline silicon.

In some embodiments, each of the one or more piezoelectric actuators is oriented in a direction substantially parallel to a longitudinal axis of the cantilevered optical member.

In some embodiments, the collimating optical element includes a mirror with positive optical power.

In some embodiments, the collimating optical element is a concave mirror.

In some embodiments, the scanning optical element is a one-axis scanning mirror that scans in a direction orthogonal to a scan direction of the cantilever scanner.

In some embodiments, the reflective optical element, the collimating optical element, and the scanning optical element are disposed adjacent to and on the same side of the first surface of the waveguide.

In some embodiments, the cantilever scanner, the reflective optical element, the collimating optical element, and the scanning optical element are integrated in a semiconductor MEMS device.

In some embodiments, the incoupling DOE is disposed adjacent to the first surface of the waveguide.

The following description, together with the accompanying drawings, provides further description of the nature and advantages of the claimed invention.

BRIEF DESCRIPTION OF THE DRAWINGS

FIG. 2B is a partial cross-sectional view illustrating a structure of an eyepiece according to an embodiment of the present invention.

DETAILED DESCRIPTION OF THE INVENTION

The present invention relates generally to methods and systems related to projection display systems including wearable displays. More particularly, embodiments of the present invention provide methods and systems for volumetric displays, also referred to as a light field displays, that create volumetric sculptures of light at more than one depth plane. The invention is applicable to a variety of applications in computer vision and image display systems.

Figure 1A:
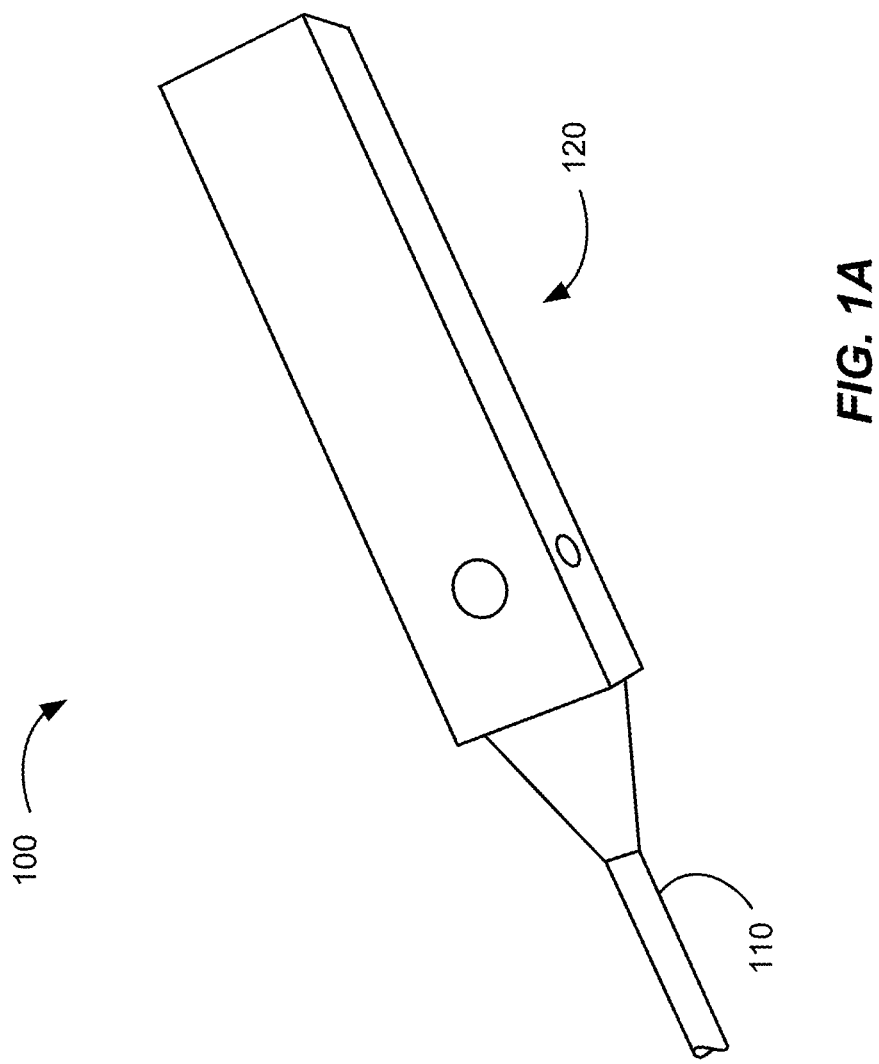
FIG. 1A is a simplified perspective view illustrating a fiber scanner according to an embodiment of the present invention.

FIG. 1A is a simplified perspective view illustrating a fiber scanner according to an embodiment of the present invention. The fiber scanner 100, which can have dimensions on the order of 2 mm×2 mm×7 mm, includes a fiber input 110, and a fiber oscillation region 120. Driven by piezoelectric actuators (not illustrated), an optical fiber oscillates in the fiber oscillation region 120, for example, in a spiral configuration with an increasing angular deflection during the projection of light for a given frame time. The various elements of the fiber scanner are described more fully throughout the present specification.

Figure 1B:
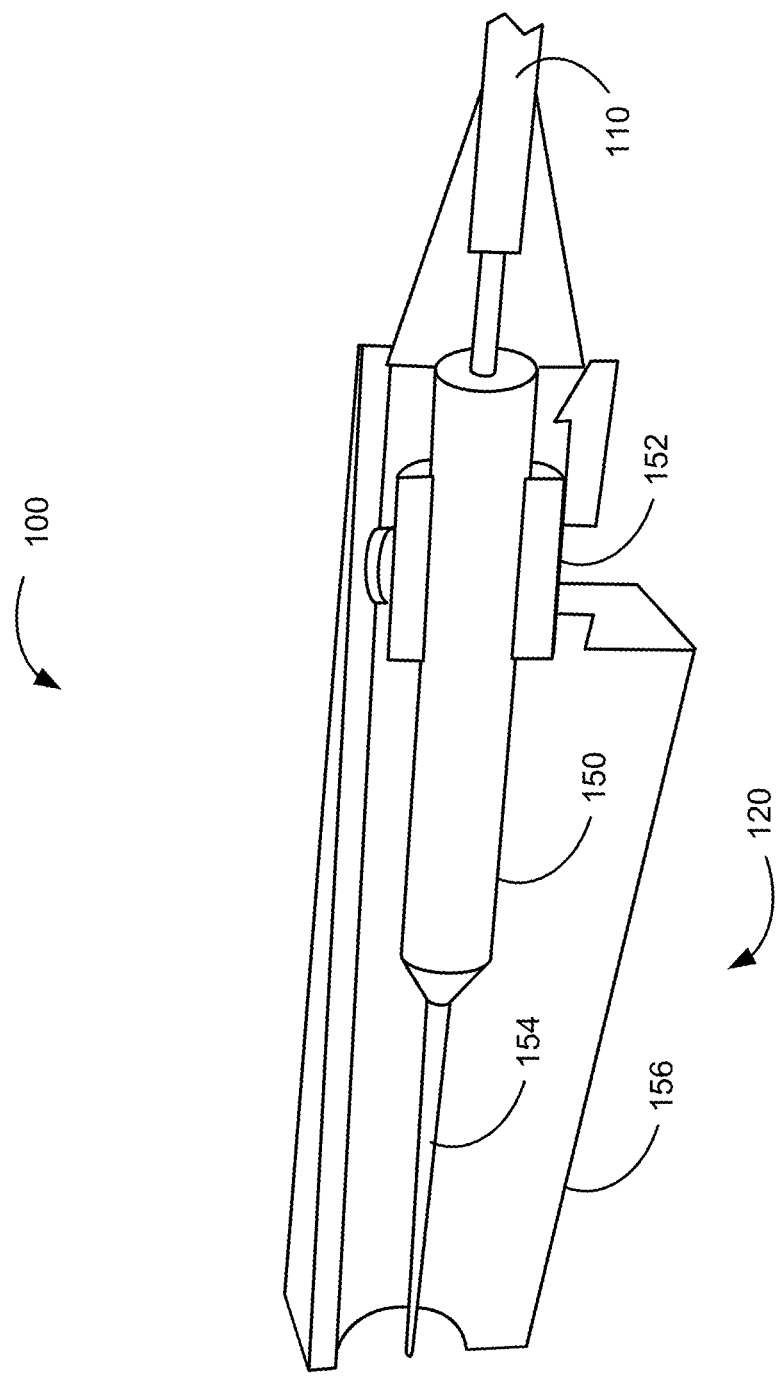
FIG. 1B is a simplified cutaway perspective view illustrating a fiber scanner according to an embodiment of the present invention.

FIG. 1B is a simplified cutaway perspective view illustrating a fiber scanner according to an embodiment of the present invention. In the view illustrated in FIG. 1B, the fiber scanner 100 has been rotated horizontally. The fiber input 110 is illustrated on the right hand side of the figure, providing an input to the fiber oscillation section 120, which includes a piezoelectric actuator 150 supported by a retaining collar 152 (and driven by electric signals from wires that are not shown), and a scanning fiber 154 is disposed in a mechanical enclosure 156.

During operation, the scanning fiber 154, which is mechanically attached to the piezoelectric actuator 150, oscillates in the fiber oscillation region 120. In an embodiment, the piezoelectric actuator 150 includes four electrodes distributed at circumferential positions that are shifted 90° with respect to each other. Accordingly, positive and negative voltages applied to opposing sides of the piezoelectric actuator can flex the actuator, and the scanning fiber, in the plane of the electrodes. By driving all four electrodes in synchronization, oscillation of the fiber can be accomplished.

As described more fully herein, small form factors comparable to standard eyeglasses are enabled by embodiments of the present invention. By utilizing embodiments of the present invention, displays with a desired field of view, depth of resolution, integrated inertial measurement units (IMUs), cameras, audio components, and the like are provided. In some embodiments, the fiber scanner 100 illustrated in FIGS. 1A and 1B is mounted in the temple or frame of the eyeglasses and works in combination with an eyepiece disposed in the frame to direct the projected light toward the eye of the user. The size of the fiber scanner 100 enables the integration of multiple fiber scanners that can direct light toward each eye, increasing the field of view through tiling of the display areas. As an example, if two projectors are used per eye, a diagonal field of view of 89° can be provided using two projectors. Using four projectors per eye, a diagonal field of view of 134° can be achieved. Additionally, in addition to increases in the field of view, additional depth planes can be provided through the use of multiple projectors. Additional description related to tiling of display areas and the use of multiple projectors to increase the field of view is provided in U.S. patent application Ser. No. 15/927,821, filed on Mar. 21, 2018, the disclosure of which is hereby incorporated by reference in its entirety for all purposes.

In an embodiment, the fiber scanner 100 is fed by fiber input 110 and the fiber oscillation region 120 is mounted in the outside edge of the frame as illustrated in FIG. 2 of U.S. patent application Ser. No. 15/927,855, filed on Mar. 21, 2018, the disclosure of which is hereby incorporated by reference in its entirety for all purposes. Additional descriptions of a fiber scanner are provided in U.S. patent application Ser. No. 15/927,765, filed on Mar. 21, 2018, the disclosure of which is hereby incorporated by reference in its entirety for all purposes.

Figure 2A:
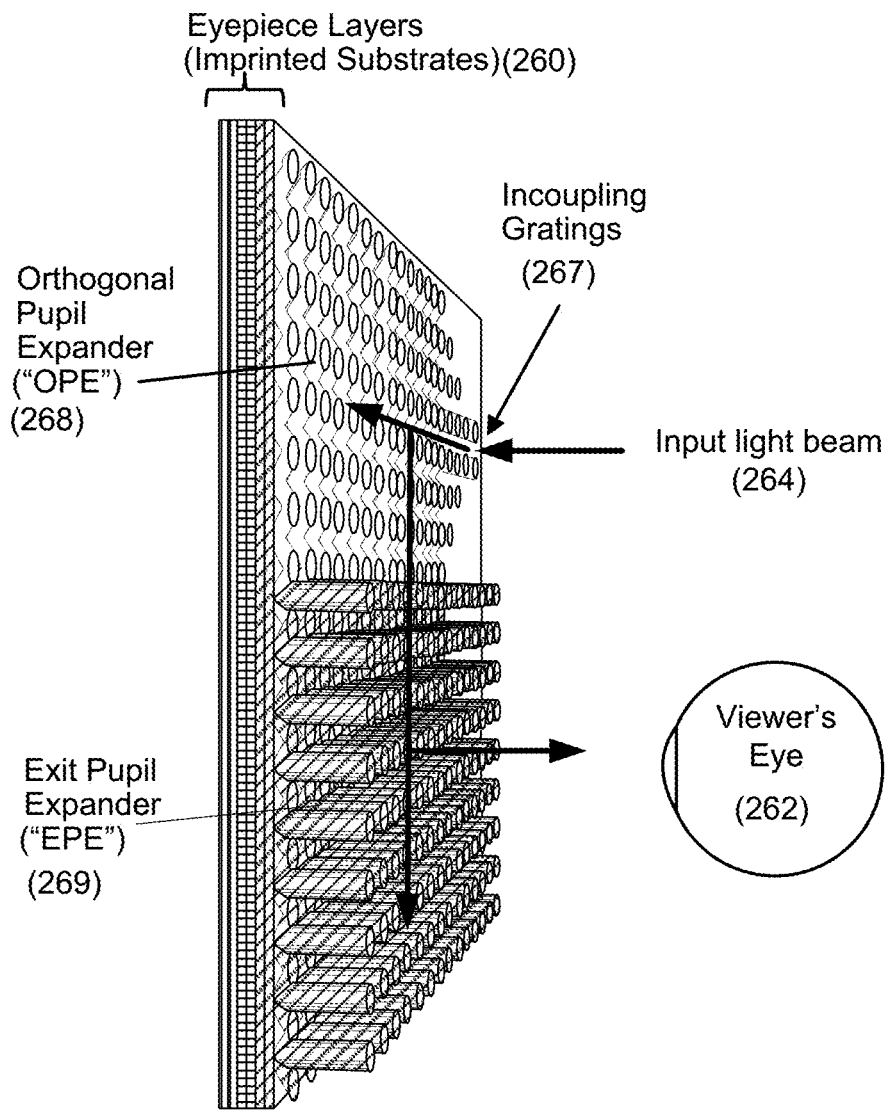
FIG. 2A illustrates schematically the light paths in a viewing optics assembly (VOA) that may be used to present a digital or virtual image to a viewer, according to an embodiment of the present invention.

FIG. 2A illustrates schematically the light paths in a viewing optics assembly (VOA) that may be used to present a digital or virtual image to a viewer, according to an embodiment of the present invention. The VOA includes an eyepiece 260 that may be worn around or in front of a viewer's eye. As discussed, herein the VOA can be integrated with the frames of a pair of glasses to present the digital or virtual image to a viewer wearing these glasses. The eyepiece 260 may include one or more eyepiece layers. In one embodiment, the eyepiece 260 includes three eyepiece layers, one eyepiece layer for each of the three primary colors, red, green, and blue. In another embodiment, the eyepiece 260 may include six eyepiece layers, i.e., one set of eyepiece layers for each of the three primary colors configured to form a virtual image at one depth plane, and another set of eyepiece layers for each of the three primary colors configured to form a virtual image at another depth plane. In other embodiments, the eyepiece 260 may include three or more eyepiece layers for each of the three primary colors for three or more different depth planes. Each eyepiece layer comprises a planar waveguide and may include an incoupling grating 267, an orthogonal pupil expander (OPE) region 268, and an exit pupil expander (EPE) region 269.

Still referring to FIG. 2A, an input light beam 264 (e.g., provided by a fiber scanner 100 as illustrated in FIGS. 1A and 1B) projects image light onto the incoupling grating 267 in an eyepiece layer 260. The incoupling grating 267 couples the image light provided by the input light beam 264 into the planar waveguide propagating in a direction toward the OPE region 268. The waveguide propagates the image light in the horizontal direction by total internal reflection (TIR). The OPE region 268 of the eyepiece layer 260 also includes a diffractive element that couples and redirects a portion of the image light propagating in the waveguide toward the EPE region 269. The EPE region 269 includes a diffractive element that couples and directs a portion of the image light propagating in the waveguide in a direction approximately perpendicular to the plane of the eyepiece layer 260 toward a viewer's eye 262. In this fashion, an image projected by the input light beam 264 may be viewed by the viewer's eye 262.

As described above, image light generated by a projector may include light in the three primary colors, namely blue (B), green (G), and red (R). Such image light can be separated into the constituent colors, for example, temporally or spatially, so that image light in each constituent color may be coupled to a respective waveguide in the eyepiece.

FIG. 2B is a partial cross-sectional view illustrating a structure of an eyepiece according to an embodiment of the present invention. The region shown in the cross-sectional view includes the region of the incoupling diffractive optical element (e.g., incoupling grating) of the eyepiece 200. As shown in FIG. 2B, the eyepiece 200 includes a stack of waveguide plates 220, 230, and 240 that receive input light from the fiber scanner and output image information to the eye 202 of a viewer. The eyepiece 200 illustrated in FIG. 2B includes an eye-side cover layer 210 positioned on the side of the eyepiece adjacent the viewer's eye, and a world-side cover layer 250 positioned on the side of the eyepiece facing toward the world.

In some embodiments, the waveguide plates 220, 230, and 240 include respective planar waveguides 222, 232, or 242, for propagating light in the planes of their respective waveguide plates 220, 230, and 240. Each planar waveguide 222, 232, or 242 has a back surface facing the viewer's eye, and a front surface facing the world. In the embodiment illustrated in FIG. 2B, the waveguide plates 220, 230, and 240 also include respective gratings 224, 234, or 244 disposed on the back surfaces of their respective waveguides 222, 232, or 242, for coupling and redirecting a portion of the light propagating in their respective waveguides 222, 232, or 242.

In the illustrated embodiment, each waveguide 222, 232, or 242, as well as each grating 224, 234, or 244, may be wavelength selective, such that it selectively propagates or redirects light in a given wavelength range. In some embodiments, each of the waveguide plates 220, 230, and 240 may be configured for a respective primary color. For example, the waveguide plate 220 is configured for red (R) light, the waveguide plate 230 is configured for green (G) light, and the waveguide plate 240 is configured for blue (B) light. It will be appreciated that the eyepiece 200 may include two or more waveguide plates for red light, two or more waveguide plates for green light, and two or more waveguide plates for blue light, for different depth planes, as described above. In some other embodiments, other colors, including magenta and cyan, may be used in addition to or may replace one or more of red, green, or blue.

In order to improve the optical efficiency, some embodiments utilize a reflective surface, for example, metallization of the surface, on one of the surfaces, for example, the front surface, of the eye-side cover layer to provide a highly reflective surface (e.g., ~100% reflective coating) that forms a reflective structure behind the input coupling elements (e.g., vertically aligned incoupling gratings) to reflect the input light, which can be RGB light, that passes through the input coupling elements and produce a second pass through the input coupling elements to improve the image brightness. As illustrated in FIG. 2B, reflector 212 reflects input light 201 incident from the fiber scanner that is not coupled into the waveguides. After reflection from reflector 212, the input light is able to make a second pass through the input coupling elements and increase the amount of light coupled into the waveguides.

In an alternative embodiment, an annular reflector 252, for example, fabricated using 100% reflective metal coatings, can be placed on the world-side cover glass. Although this annular reflector 252 is shown on the back side of the world-side cover layer 250, this is not required by the present invention and it may alternatively be mounted on the front side. One of ordinary skill in the art would recognize many variations, modifications, and alternatives. In this alternative embodiment, the input light 201 from the fiber scanner passes through the center of the annular reflector 252 after it is output from the optical assembly section of the fiber scanner. Since the input light is diverging, the beam spreads as it passes through the eyepiece and reflects from the reflector 212 behind the input coupling elements. This reflected light 204 propagates back through the eyepiece, with the cone of light expanding during propagation. In some embodiments, reflected light 204 is also coupled into the incoupling gratings during the return path, being characterized by the same orientation as the input beams for display to the viewer since, although reflected light 204 is the mirror image of input light 201, entry through the opposing side of the incoupling grating results in the same orientation. A substantial portion, which can be the majority, of the light, reflects from the annular reflector 252 on the world-side cover layer as illustrated by doubly reflected light 206 and is able to make a third pass through the input coupling elements, resulting in additional coupling of light into the waveguide plates. As will be evident to one of skill in the art, a Hall of Mirrors effect can be achieved that results in increased brightness correlated with the increased number of rays passing through the eyepiece, improving the fill factor and image quality.

A channel can be cut in the temple and the frames to accommodate the fiber and electrical wiring. As the fiber/wires pass over the spring hinge, the design dimensions enable the fiber to not be bent past is minimum bend radius of curvature as the temples are folded.

In addition to reflective structures associated with the input coupling elements discussed in relation to FIG. 2B, some embodiments utilize a partially reflective (e.g., 50% aluminized) surface on the inside surface of world-side cover glass so that a portion (e.g., half) of the light that is propagating toward the world from the eyepiece is reflected and directed back toward the eye of the user, which increases the overall brightness and increases the beam density as a result of the slight lateral offset to the beams, which contributes to an improved fill factor.

Embodiments of the present invention provide improvements over conventional optical configurations. For example, as described U.S. patent application Ser. No. 15/927,765, a polarizing beam splitter may be utilized as a component of a collimating optical assembly for collimating an input light beam emitted from an optical fiber. However, it may be difficult to produce a polarizing beam splitter that performs well for a wide range of incidence angles. In addition, it may be desirable to have high optical throughput through the polarizing beam splitter, which requires high transmission on the first pass and high reflection on the second pass. For a non-polarized input light beam, about fifty percent of the light intensity may be lost on the first pass, and another twenty five percent of the light intensity may be lost on the second pass. To improve the light throughput, it may be desirable to use a polarization-maintaining (PM) optical fiber to deliver a polarized input light beam. Some PM optical fibers have stress members to introduce birefringence to facilitate the polarization-maintaining property. Depending on the etchants used to fabricate the fiber scanner components, the stress members may etch more rapidly or more slowly than the fiber core, resulting in challenges associated with the use of PM optical fibers. Accordingly, some embodiments of the present invention utilize optical waveguides, including optical fibers, that are not polarization maintaining, thereby reducing system complexity and cost.

Moreover, embodiments of the present invention provide optical configurations that utilize a collimating optical element in an on-axis configuration. As will be evident to one of skill in the art, it may be desirable to use optical elements in an on-axis configuration in which light is incident on the optical elements at angles that are generally normal to the surface of the optical element, which contrasts with implementations in which light is incident on the optical elements at angles that are off-axis, that is, high angles of incidence. By utilizing on-axis configurations, embodiments of the present invention are characterized by high levels of optical performance in contrast with off-axis configurations in which the optical elements may introduce aberrations such as astigmatism and coma.

Figure 3:
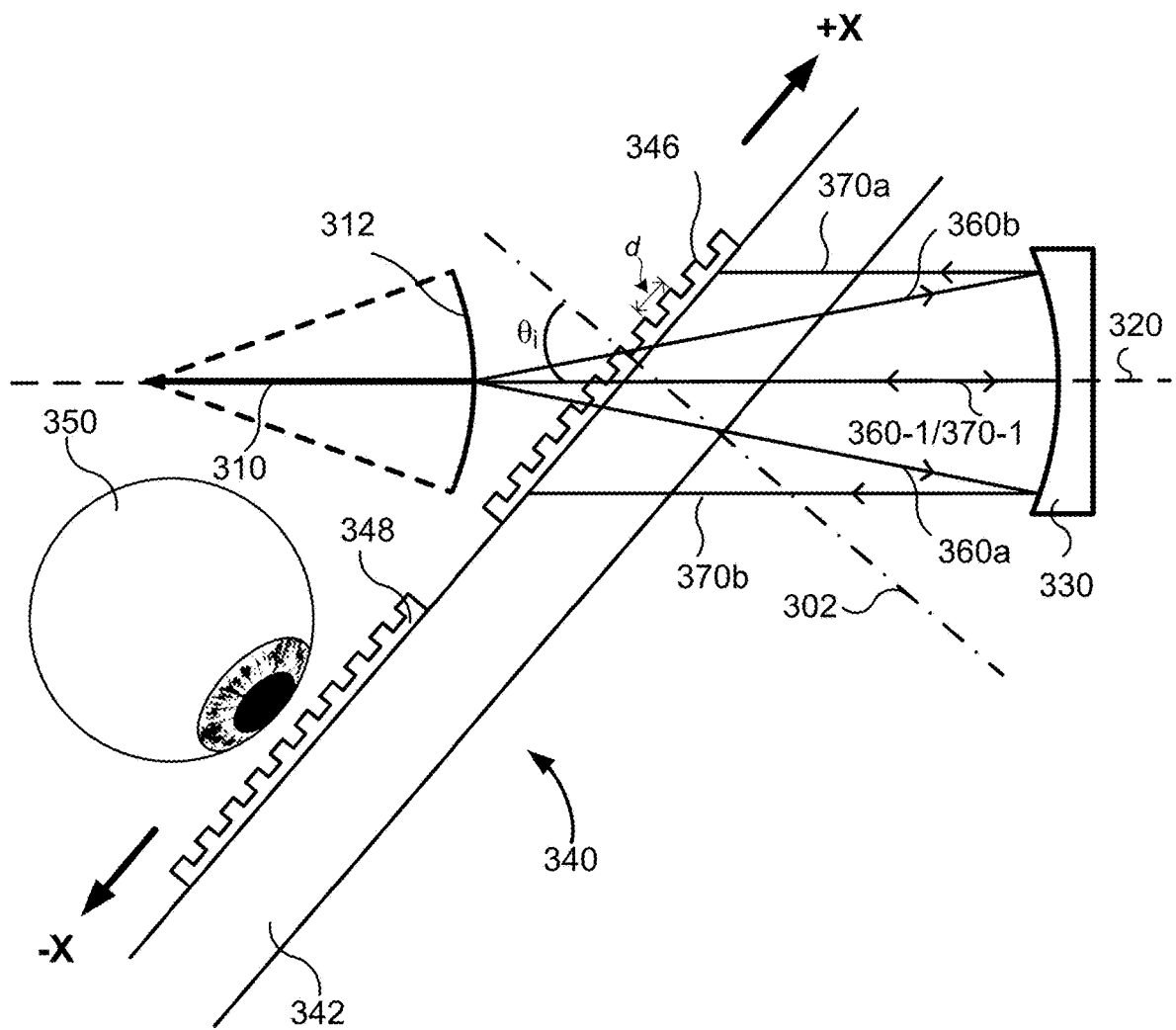
FIG. 3 illustrates schematically a fiber scanning projector coupled to an eyepiece according to some embodiments of the present invention.

FIG. 3 illustrates schematically a fiber scanning projector coupled to an eyepiece according to some embodiments of the present invention. The fiber scanning projector, also referred to as a fiber scanner, is an example of a scanning light source. The fiber scanner can include an optical fiber and a scanning mechanism configured to scan the optical fiber in a linear direction, such that a tip of the optical fiber is configured to scan along a trajectory, the trajectory defining a first optical axis. As shown in FIG. 3, the fiber scanning projector may include an optical fiber 310 (or another suitable waveguide scanner). The optical fiber 310 may be deflected such that the trajectory of its tip defines a two-dimensional convex object surface 312 (e.g., a part of a spherical surface). An optical axis 320 may be defined as a line that passes through the optical fiber 310 when the optical fiber 310 is not deflected. For example, the optical axis 320 may pass through the center of the convex object surface 312. The fiber scanning projector may further include a collimating optical element 330, such as a concave collimating mirror, positioned in an on-axis configuration along the optical axis 320. In this on-axis configuration, the optical axis 320 is aligned with the normal to the center of the collimating optical element 330. As the light exits the tip of the optical fiber 310, the light beam may diverge as a cone of light rays (e.g., bounded by the marginal rays 360a and 360b as illustrated in FIG. 3) with a subtended angle determined by the numerical aperture of the optical fiber 310. Accordingly, the collimating optical element 330 may be configured to receive a divergent input light beam characterized by marginal rays 360a and 360b emitted from the tip of the optical fiber 310, and produce a collimated light beam characterized by marginal rays 370a and 370b as a reflected light beam. Although only a single divergent input light beam is illustrated for the undeflected position of the optical fiber, it will be appreciated that the spatial extent of the collimating optical element 330 will be such that divergent input light beams produced by the fiber tip across the range of deflection angles will be captured and collimated by the collimating optical element 330.

As illustrated in FIG. 3, the deflection of optical fiber 310 defines a convex object surface 312. In some embodiments, the collimating optical element 330 may have a reflecting surface that can be a substantially spherical mirror having twice the radius of curvature of the radius of curvature of the convex object surface 312. Accordingly, in some embodiments, the majority of focusing is achieved using collimating optical element 330, which can be implemented as a curved mirror with an aspheric correction term. In alternative embodiments, the reflecting surface is characterized by a radius of curvature that is greater than twice the radius of the scanning surface, i.e., convex object surface 312.

In some embodiments, the profile of the reflecting surface of collimating optical element 330 may vary from a curvature twice the radius of curvature of the convex object surface 312, for example, as a function of the index of refraction of the intermediate components in the light path (e.g., the index of refraction of the waveguide 342) and the angle of incidence, which may accommodate the asymmetric configuration due to the tilting of the waveguide 342 with respect to the optical axis 320.

Referring to FIG. 3, the waveguide 342 and the incoupling DOE 346 are tilted at an angle θ$_i$ with respect to the optical axis 320. As a result, light from optical fiber 310 may be incident upon waveguide 342 at various and asymmetric angles. For example, ray 360a has angle of incidence less than the angle of incidence of ray 360b; that is, ray 360b is closer to a grazing incidence than 360a. Although, for purposes of clarity, rays propagating through waveguide 342 are illustrated as not refracting, in actual practice, the difference in inputs angles will result in a difference in refraction angle and transmission through waveguide 342. Accordingly, in some embodiments, to compensate for the non-zero angle θ$_i$ between the normal 302 of the surface of the waveguide 342 and the optical axis 320, asymmetries impressed on the convex object surface 312 after propagation through waveguide 342 are compensated for by modification of the curvature of collimating optical element 330. In these embodiments, the curvature or concavity of collimating optical element 330 can vary as a function of position based on the angle θ$_i$ as well as the index of refraction and thickness of waveguide 342 as well as other optical elements through which the diverging beam passes. By varying the curvature of the collimating optical element 330 as a function of position, compensation for the impact of the tilted orientation of the waveguide relative to the optical axis 320 of the optical fiber 310 and any resulting impact on the propagation angles of light rays emitted by the optical fiber 310 is provided by some embodiments of the present invention.

As illustrated in FIG. 3, an eyepiece 340 may be positioned between the tip of the optical fiber 310 and the collimating optical element 330. The eyepiece 340 may include a planar waveguide 342 tilted with respect to the optical axis 320, such that a normal 302 of the surface of the waveguide 342 forms a non-zero angle θ$_i$ with respect to the optical axis 320. The eyepiece 340 may further include an incoupling diffractive optical element (DOE) 346, for example, an incoupling grating (ICG) that is coupled to a first lateral region of the waveguide 342 that intercepts the optical axis 320.

The eyepiece 340 may further include an outcoupling diffractive optical element (DOE) 348 (e.g., an outcoupling grating) that is coupled to a second lateral region of the surface of the waveguide 342 that is displaced from the first lateral region by a predetermined distance. The outcoupling DOE 348 may comprise a diffraction grating that is configured to diffract a portion of light propagating in the waveguide 342 out of the waveguide 342 and toward an eye 350 of a viewer. For example, the outcoupling DOE 348 may be the exit pupil expander (EPE) discussed above in relation to FIG. 2A. To facilitate the discussion below, the direction oriented along the plane of the waveguide pointing from the incoupling DOE 346 toward the outcoupling DOE 348 as the "−X" direction, and the opposite direction as the "+X" direction, as illustrated in FIGS. 3 and 4A-4B.

As described more fully below in relation to FIGS. 4A-4B, since the light from the optical fiber 310 is incident on the incoupling DOE 346 at an oblique angle of incidence, the diffractive coupling of the incident light into the waveguide 342 can be controlled to achieve desired diffractive coupling conditions.

Figure 4A:
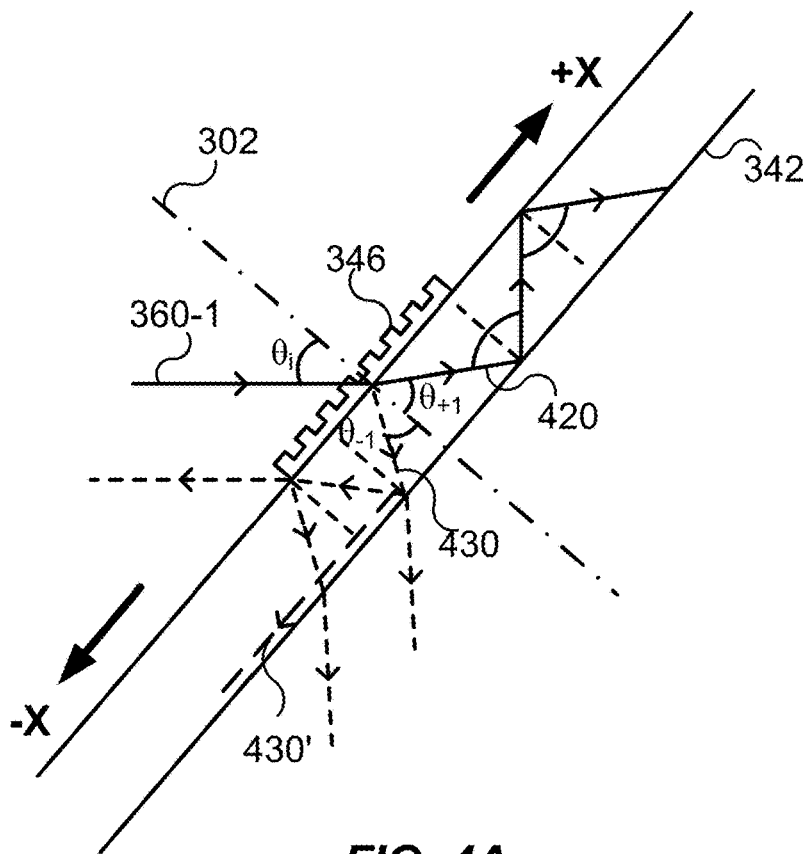
FIGS. 4A and 4B are simplified schematic diagrams illustrating diffractive coupling of light for an angled incoupling diffractive optical element as illustrated in FIG. 3 on a first pass and a second pass, respectfully, according to an embodiment of the present invention.
Figure 4B:
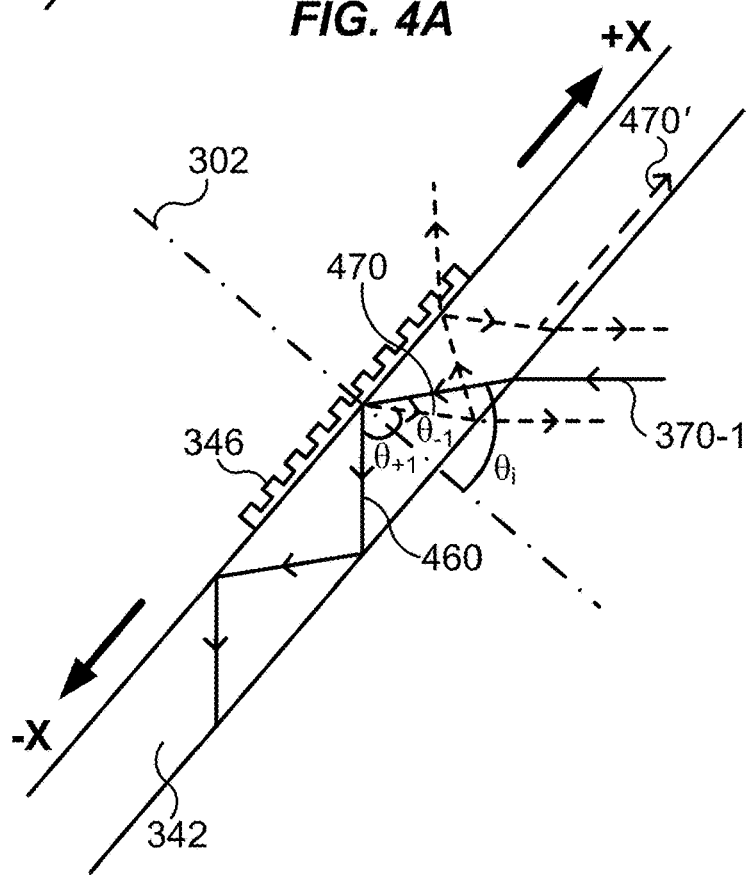

FIG. 4A is a simplified schematic diagram illustrating diffractive coupling of light for an angled incoupling DOE 346 as illustrated in FIG. 3 according to an embodiment of the present invention. FIG. 4A illustrates schematically the optical effect of the incoupling DOE 346 as the divergent input light beam (represented by central ray 360-1) emitted from the tip of the optical fiber 310 is incident on the incoupling DOE 346 on the first pass. For clarity, only the central ray 360-1 of the divergent input light beam that is aligned with the optical axis 320 is shown. However, it will be appreciated that the analysis below is applicable to other rays of the divergent input light beam. As illustrated in FIG. 4A, the incoupling DOE 346 may diffract a first portion of the input light beam (represented by central ray 360-1) as a positive first order ("+1") diffraction 420 (in a transmission geometry) at the diffraction angle θ$_{+1}$, and a second portion of the input light beam (represented by central ray 360-1) as a negative first order ("−1") diffraction 430 (in a transmission geometry) at the diffraction angle θ$_{-1}$. Because the central ray 360-1 is tilted at a non-zero angle of incidence θ$_i$ with respect to normal 302 of the waveguide associated with the incoupling DOE 346, the angles of the diffracted orders will not be equal. In other words, if diffraction angle θ$_{+1}$ is positive, then diffraction angle θ$_{+1}$ will not be equal to the absolute value of diffraction angle θ$_{-1}$. Accordingly, as described below, the diffracted orders will not experience uniform total internal reflection in the waveguide.

The operation of a diffraction grating may be governed by the grating equation:

$$\theta_m = \arcsin\left(\frac{m\lambda}{d} - \sin(\theta_i)\right),$$

where θ$_m$ is the diffraction angle of light exiting (diffraction angle) the diffraction grating relative to a vector normal to the surface of the grating; λ is the wavelength; m is an integer valued parameter known as the "order"; d is the period of the grating; and θ$_i$ is the angle of incidence of light relative to the vector normal to the surface of the grating. Thus, the diffraction angle θ$_m$ for a particular order m (where m is non-zero) may depend on the angle of incidence θ$_i$ and the period d of the grating.

According to some embodiments, the angle of incidence θ$_i$ of the light making up the divergent input light beam (which is determined by angle at which the waveguide 342 is tilted with respect to the optical axis 320) and the grating period d may be selected such that the positive first order diffraction 420 at the diffraction angle θ$_{+1}$ may meet the total internal reflection (TIR) condition of the waveguide 342, and therefore may propagate in the waveguide 342 in the +X direction, whereas the negative first order diffraction 430 at the diffraction angle θ$_{-1}$ may fail the TIR condition of the waveguide 342, and therefore may either propagate as an evanescent wave along the surface of the waveguide 342 in the −X direction (represented by the long-dashed line 430' in FIG. 4A) or be refracted out of the waveguide 342 at each bounce in the waveguide 342. Since the positive first order diffraction 420 propagates in the waveguide 342 in the +X direction away from the outcoupling DOE 348, it will not be diffracted by the outcoupling DOE 348 out of the waveguide 342 to reach the eye 350 of the viewer. Rather, a light trap or other light absorbing structure can be utilized as a beam dump to absorb light that is diffracted into the positive first order diffraction on the first pass.

Referring once again to FIG. 3, a portion of the divergent input light beam characterized by marginal rays 360a and 360b and emitted from the tip of the optical fiber 310 may be transmitted through the incoupling DOE 346 (e.g., as a zeroth order transmission) to be incident on the collimating optical element 330 in an on-axis configuration. The collimating optical element 330 may reflect the divergent input light beam as a collimated light beam (e.g., as a bundle of parallel light rays bounded by the marginal rays 370a and 370b as illustrated in FIG. 3) directed back toward the incoupling DOE 346 on a second pass. As before, although the ray at the edge of the divergent light beam is illustrated by marginal rays 360a and 360b, other rays will be collimated in a similar manner to form the collimated light beam represented by marginal rays 370a and 370b.

FIG. 4B is a simplified schematic diagram illustrating diffractive coupling of the collimated light beam illustrated by central ray 370-1 for an angled incoupling DOE 346 as illustrated in FIG. 3 according to an embodiment of the present invention. For clarity, only the central ray 370-1 of the collimated light beam is shown. However, it will be appreciated that the analysis below is applicable to other rays of the collimated input light beam. As illustrated in FIG. 4B, the incoupling DOE 346 may diffract a first portion of the collimated light beam illustrated by central ray 370-1 as a positive first order ("+1") diffraction 460 (in a reflection geometry) at the diffraction angle $\theta_{+1}$, and a second portion of the collimated light beam illustrated by central ray 370-1 as a negative first order ("−1") diffraction 470 (in a reflection geometry) at the diffraction angle $\theta_{-1}$.

As discussed in relation to the light that was incident on the incoupling DOE during the first pass before collimation, because the central ray 370-1 of the collimated light beam is tilted at a non-zero angle of incidence $\theta_i$ with respect to the normal 302 of the waveguide associated with the incoupling DOE 346, the angles of the diffracted orders will not be equal. In other words, if diffraction angle $\theta_{+1}$ is positive, then diffraction angle $\theta_{+1}$ will not be equal to the absolute value of diffraction angle $\theta_{-1}$. Accordingly, as described below, the diffracted orders will not experience uniform total internal reflection in the waveguide.

Referring to FIG. 4B, because the central ray 370-1 of collimated light beam is incident on the incoupling DOE 346 from an opposite direction as compared to the central ray 360-1 of input light beam 360 illustrated in FIG. 4A, the positive first order diffraction 460 may meet the TIR condition of the waveguide 342, and therefore may propagate in the waveguide 342 in the −X direction; whereas the negative first order diffraction 470 may fail the TIR condition of the waveguide 342, and therefore may either propagate as an evanescent wave along the surface of the waveguide 342 in the +X direction (represented by the long-dashed line 470' in FIG. 4B) or be refracted out of the waveguide 342 at each bounce in the waveguide 342. Since the positive first order diffraction 460 propagates in the waveguide 342 along the −X direction toward the outcoupling DOE 348, it may be diffracted by the outcoupling DOE 348 out of the waveguide 342 to reach the eye 350 of the viewer.

As described above, by exploiting the asymmetrical behavior of the incoupling DOE 346 and the waveguide 342 in the angled configuration of the eyepiece 340 with respect to the fiber scanning projector, efficient coupling of the input light beam emitted from the optical fiber 310 into the waveguide 342 may be achieved using an on-axis collimating optical element 330. This optical configuration avoids using a polarizing beam splitter as discussed in U.S. patent application Ser. No. 15/927,765. As such, a non-polarized input light beam may be transported by using a non-polarization-maintaining optical fiber, which can remediate one or more technical difficulties associated with conventional techniques. The fiber scanning projector illustrated in FIG. 3 may also have the advantage of having fewer optical components as compared to the configurations that use a polarizing beam splitter, and thus may be easier to manufacture. The on-axis configuration of the collimating optical element 330 may prevent off-axis aberrations, such as astigmatism and coma, which can be difficult to correct in a single-element collimating optical element 330.

In some embodiments, the incoupling DOE 346 may be blazed (i.e., given a particular periodic profile), so as to preferentially diffract light into desired diffraction orders. For example, the incoupling DOE 346 may be blazed such that the intensity of the positive first order diffraction 460 may be higher than the intensity of the negative first order diffraction 470, so as to maximize the fraction of the input light beam reaching the eye 350 of the viewer.

In addition, the incoupling DOE 346 may be configured to have a higher efficiency in the reflection orders than the transmission orders, so that the incoupling DOE 346 may have a higher coupling efficiency as the input light beam incident on the incoupling DOE 346 on the second pass than that as the input light beam incident on the incoupling DOE 346 on the first pass. As such, a smaller fraction of the input light beam may be wasted on the first pass, resulting in a larger fraction of the input light beam reaching the eye 350 of the viewer.

The periodic structure of the incoupling DOE 346 may include a surface relief profile or a volume modulation of the index of refraction of a transparent material according to various embodiments. In some embodiments, the incoupling DOE 346 may include a metasurface. A metasurface is an optically thin subwavelength structured interface. Metasurfaces are generally created by assembling arrays of miniature, anisotropic light scatterers (i.e., resonators such as optical antennas). The spacing between antennas and their dimensions are much smaller than the wavelength. The metasurfaces, on account of Huygens principle, are able to mold optical wavefronts into arbitrary shapes with subwavelength resolution by introducing spatial variations in the optical response of the light scatterers. Metasurfaces may allow controlling the polarization, phase and amplitude of light. The factors that can be used to manipulate the wavefront of the light include the material, size, geometry and orientation of the nanostructures. The resonant wavelength of a metasurface can be engineered by changing the geometric sizes of its constituent nanostructures, thereby providing wavelength selectivity. For example, metasurfaces may be engineered to be highly wavelength-selective in redirecting light. Thus, metasurfaces can be used as wavelength-selective incoupling optical elements and outcoupling optical elements. Additional descriptions of metasurface diffractive optical elements are provided in U.S. patent application Ser. No. 15/683,644, filed on Aug. 22, 2017, the disclosure of which is hereby incorporated by reference in its entirety for all purposes.

Figure 5:
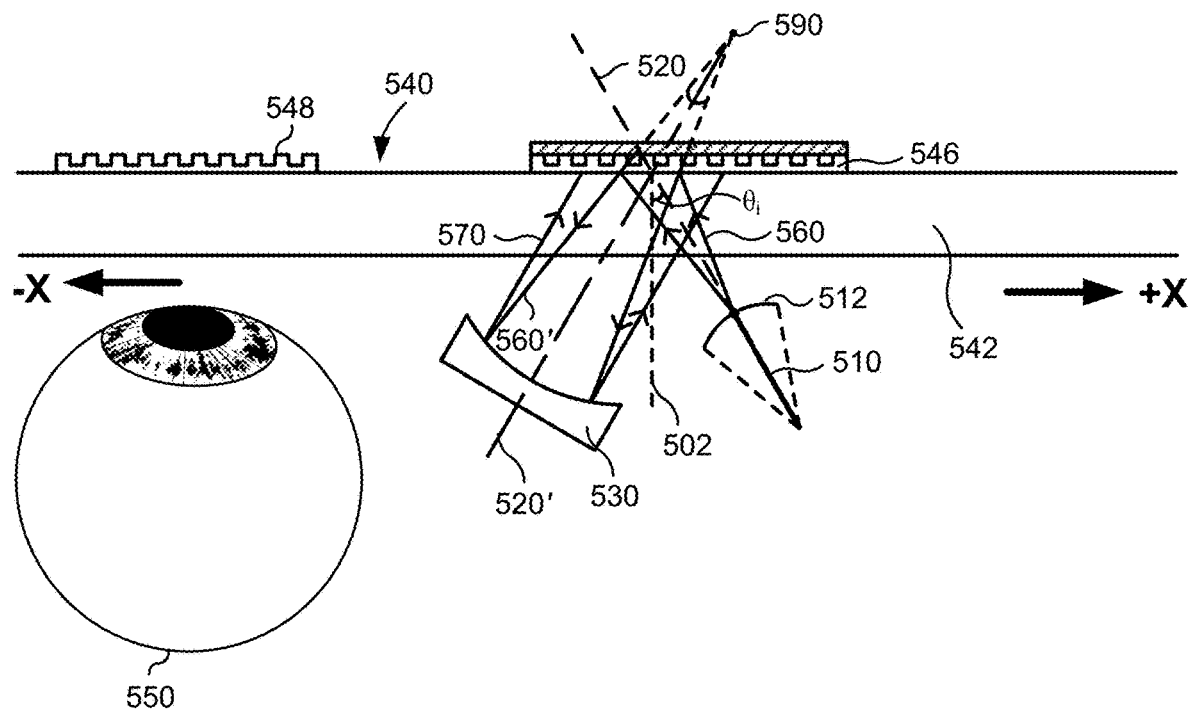
FIG. 5 illustrates schematically a fiber scanning projector coupled to an eyepiece according to some other embodiments of the present invention.
Figure 6A:
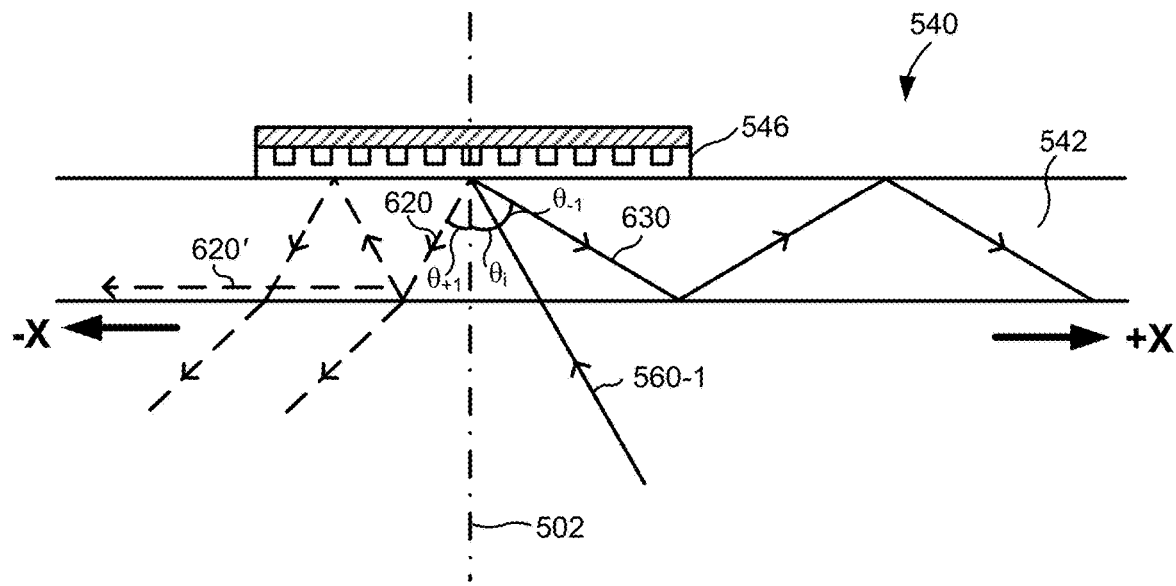
FIGS. 6A and 6B are simplified schematic diagrams illustrating diffractive coupling of light for an angled incoupling diffractive optical element as illustrated in FIG. 5 on a first pass and a second pass, respectfully, according to an embodiment of the present invention.
Figure 6B:
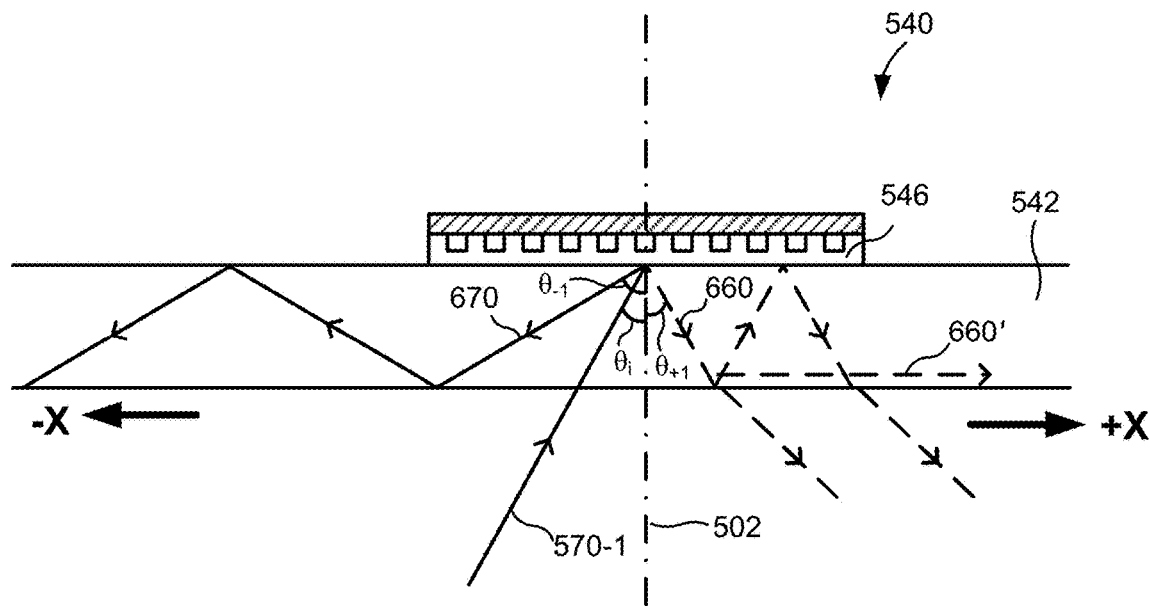

FIG. 5 illustrates schematically a fiber scanning projector coupled to an eyepiece 540 according to some other embodiments of the present invention. The eyepiece 540 includes a planar waveguide 542, an incoupling DOE 546 coupled to a first lateral region of the back surface of the waveguide 542, and an outcoupling DOE 548 coupled to a second lateral region of the waveguide 542. Note the outcoupling DOE 548 is illustrated in FIG. 5 as coupled to the back surface of the waveguide 542, but it can be coupled to either the front surface or the back surface. The back of the incoupling DOE 546 is metallized so that the incoupling DOE 546 may operate in a reflection geometry. Generally, a metallized incoupling DOE may have higher coupling efficiencies than a non-metallized incoupling DOE. The outcoupling DOE 548 may comprise a diffraction grating (may be referred herein as an outcoupling grating) configured to diffract a portion of light propagating in the waveguide 542 out of the waveguide 542 and toward an eye 550 of a viewer. To facilitate the discussion below, let's denote the direction pointing from the incoupling DOE 546 toward the outcoupling DOE 548 as the "−X" direction, and the opposite direction as the "+X" direction, as illustrated in FIGS. 5 and 6A-6B.

The fiber scanning projector includes an optical fiber 510 (or another suitable waveguide scanner). The optical fiber 510 may be deflected such that the trajectory 512 of its tip defines a two-dimensional convex object surface (e.g., a part of a spherical surface). An optical axis 520 may be defined as a line that passes through the optical fiber 510 when the optical fiber 510 is not deflected. For example, the optical axis 520 may pass through the center of the convex object surface. The optical fiber 510 is positioned relative to the eyepiece 540 in an angled configuration such that the optical axis 520 forms a non-zero angle $\theta_i$ with respect to a normal 502 of the waveguide 542. As described more fully below in relation to FIGS. 6A-6B, since the light from the optical fiber 510 is incident on the incoupling DOE 546 at an oblique angle of incidence, the diffractive coupling of the incident light into the waveguide 542 can be controlled to achieve desired diffractive coupling conditions.

Because the incoupling DOE 546 is metallized, a portion of the input light beam 560 may be reflected by the incoupling DOE 546 (e.g., as a zeroth order reflection) on the first pass, and appear as a divergent input light beam emitted from the virtual object point 590. As described below in relation to FIG. 6A, the incoupling DOE 546 will also diffract the input light beam 560 into other diffracted orders (e.g., positive first order diffraction and negative first order diffraction).

The fiber scanning projector may further include a collimating optical element 530, such as a concave mirror, positioned on the same side of the eyepiece 540 as the optical fiber 510. The collimating optical element 530 is positioned in an on-axis configuration to receive the divergent input light beam 560' reflected by the metallized incoupling DOE 546 (i.e., the zeroth order reflection). The collimating optical element 530 collimates the input light beam as a collimated reflected light beam 570 directed back toward the incoupling DOE 546 on a second pass.

FIG. 6A is a simplified schematic diagram illustrating diffractive coupling of light for an angled incoupling DOE 546 as illustrated in FIG. 5 according to an embodiment of the present invention. For clarity, only the central ray 560-1 of the divergent beam 560 is shown. As illustrated, the incoupling DOE 546 may diffract a first portion of the input light beam 560 as a positive first order ("+1") diffraction 620 (in a reflection geometry) at the diffraction angle $\theta_{+1}$, and a second portion of the input light beam 560 as a negative first order ("−1") diffraction 630 (in a reflection geometry) at the diffraction angle $\theta_{-1}$. Similar to the incoupling DOE 346 illustrated in FIGS. 3 and 4A-4B, the angle of incidence $\theta_i$ and the grating period d of the incoupling DOE 546 may be selected such that the negative first order diffraction 630 at the diffraction angle $\theta_{-1}$ may meet the TIR condition of the waveguide 542, and therefore may propagate in the waveguide 542 in the +X direction, whereas the positive first order diffraction 620 at the diffraction angle $\theta_{+1}$ may fail the TIR condition of the waveguide 542, and therefore may either propagate as an evanescent wave along the surface of the waveguide 542 in the −X direction (represented by the long-dashed line 620' in FIG. 6A) or be refracted out of the waveguide 542 at each bounce in the waveguide 542, as illustrated in FIG. 6A. Accordingly, selection of the angle of incidence $\theta_i$ and the grating period d of the incoupling DOE 546 may result in little to no light diffracted into the first positive order reflection 620 reaching the outcoupling DOE 548. Since the negative first order diffraction 630 propagates in the waveguide 542 in the +X direction away from the outcoupling DOE 548, it may not be diffracted by the outcoupling DOE 548 out of the waveguide 542 to reach the eye 550 of the viewer as illustrated in FIG. 5. Rather, a light trap or other light absorbing structure can be utilized as a beam dump to absorb light that is diffracted into the negative first order diffraction 630 on the first pass.

FIG. 6B is a simplified schematic diagram illustrating diffractive coupling of the collimated light beam 570 for an angled incoupling DOE 546 as illustrated in FIG. 5 according to an embodiment of the present invention. For clarity, only the central ray 570-1 of the collimated light beam 570 is shown. However, it will be appreciated that the analysis below is applicable to other rays of the collimated input light beam 570. As illustrated, the incoupling DOE 546 may diffract a first portion of the collimated light beam 570 as a positive first order ("+1") diffraction 660 (in a reflection geometry), and a second portion of the collimated light beam 650 as a negative first order ("−1") diffraction light beam 670 (in a reflection geometry). Now because the collimated light beam 570 is incident on the incoupling DOE 546 from an opposite direction as compared to the input light beam 560 illustrated in FIG. 6A, the negative first order diffraction light beam 670 may meet the TIR condition of the waveguide 542, and therefore may propagate in the waveguide 542 in the −X direction, whereas the positive first order diffraction 660 may fail the TIR condition of the waveguide 542, and therefore may either propagate as an evanescent wave along the surface of the waveguide 542 in the +X direction (represented by the long-dashed line 660' in FIG. 6B) or be refracted out of the waveguide 542 at each bounce in the waveguide 542, as illustrated in FIG. 6B. Since the negative first order diffraction light beam 670 propagates in the waveguide 542 along the −X direction toward the outcoupling DOE 548, it may be diffracted by the outcoupling DOE 548 out of the waveguide 542 to reach the eye 550 of the viewer.

The angle $\theta_i$ between the optical axis 520 and the normal 502 of the waveguide 542 may be selected to facilitate the asymmetric behavior of the incoupling DOE 546 and the waveguide 542, as described above. Other geometrical considerations may also be taken into account. For example, the angle $\theta_i$ may be selected so as to avoid any conflict between the trajectory 512 of tip of the optical fiber 510 and the collimating optical element 530. In various embodiments, the angle $\theta_i$ may be selected, for example, to be 15°, 20°, 25°, 30°, 35°, 40°, or 45°. In some other embodiments, the collimating optical element 530 may have a hole through which the optical fiber 510 may pass, similar to the configuration illustrated in FIG. 5 of U.S. patent application Ser. No. 15/927,765. This configuration may be used where the angle $\theta_i$ is selected such that the optical fiber 510 would otherwise be in geometrical conflict with the collimating optical element 530.

Figure 7:
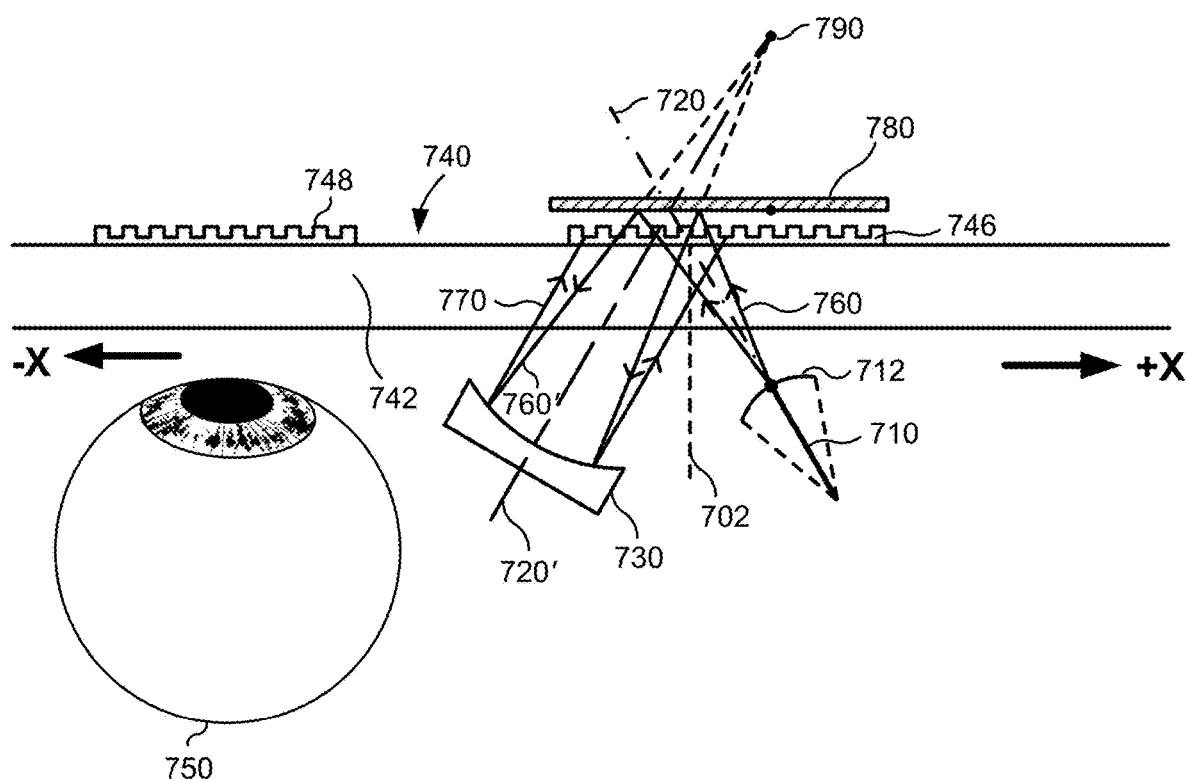
FIG. 7 illustrates schematically a fiber scanning projector coupled to an eyepiece according to some further embodiments of the present invention.

FIG. 7 illustrates schematically a fiber scanning projector coupled to an eyepiece 740 according to some further embodiments of the present invention. Similar to the eyepiece 540, the eyepiece 740 includes a planar waveguide 742, an incoupling DOE 746 coupled to a first lateral region of the back surface of the waveguide 742, and an outcoupling DOE 748 coupled to a second lateral region of the waveguide 742 (although the outcoupling DOE 748 is illustrated as coupled to the back surface of the waveguide 742 in FIG. 7, but it can be coupled to either the front surface or the back surface). The outcoupling DOE 748 may comprise a diffraction grating (may be referred herein as an outcoupling grating) configured to diffract a portion of light propagating in the waveguide 742 out of the waveguide 742 and toward an eye 750 of a viewer. Here, the back of the incoupling DOE 746 is not metallized. Instead, the eyepiece 740 includes a separate planar mirror 780 positioned behind the incoupling DOE 746.

The fiber scanning projector includes an optical fiber 710 (or a waveguide). The optical fiber 710 may be deflected such that the trajectory of its tip defines a two-dimensional convex object surface 712 (e.g., a part of a spherical surface). An optical axis 520 may be defined as a line that passes through the optical fiber 710 when the optical fiber 710 is not deflected. For example, the optical axis 720 may pass through the center of the convex object surface 712. The optical fiber 710 is positioned relative to the eyepiece 740 such that the optical axis 720 forms a non-zero angle $\theta_i$ with respect to a normal 702 of the waveguide 742. A portion of the input light beam 760 may pass through the incoupling DOE 746 on the first pass, and be reflected by the planar mirror 780. Thus, the input light beam 760 may appear as a divergent input light beam emitted from the virtual object point 790.

The fiber scanning projector may further include a collimating optical element 730, such as a concave mirror, positioned on the same side of the eyepiece 740 as the optical fiber 710. The collimating optical element 730 is positioned in an on-axis configuration to receive the divergent input light beam 760. The collimating optical element 730 reflects the input light beam 760 as a collimated light beam 770 directed back toward the incoupling DOE 746 on a second pass.

Similar to the fiber scanning projector illustrated in FIG. 5, the angle of incidence $\theta_i$ and the grating period d of the incoupling DOE 746 may be selected such that, for the input light beam 760 incident on the incoupling DOE 746 on the first pass, a negative first order diffraction (in a reflection geometry) may meet the TIR condition of the waveguide 742, whereas a positive first order diffraction (in a reflection geometry) may fail the TIR condition of the waveguide 742, similar to the illustration in FIG. 6A. For the collimated light beam 770 incident on the incoupling DOE 746 on the second pass, the negative first order diffraction (in a reflection geometry) may meet the TIR condition of the waveguide 742, and the positive first order diffraction (in a reflection geometry) may fail the TIR condition of the waveguide 742, similar to the illustration in FIG. 6B.

Figure 8:
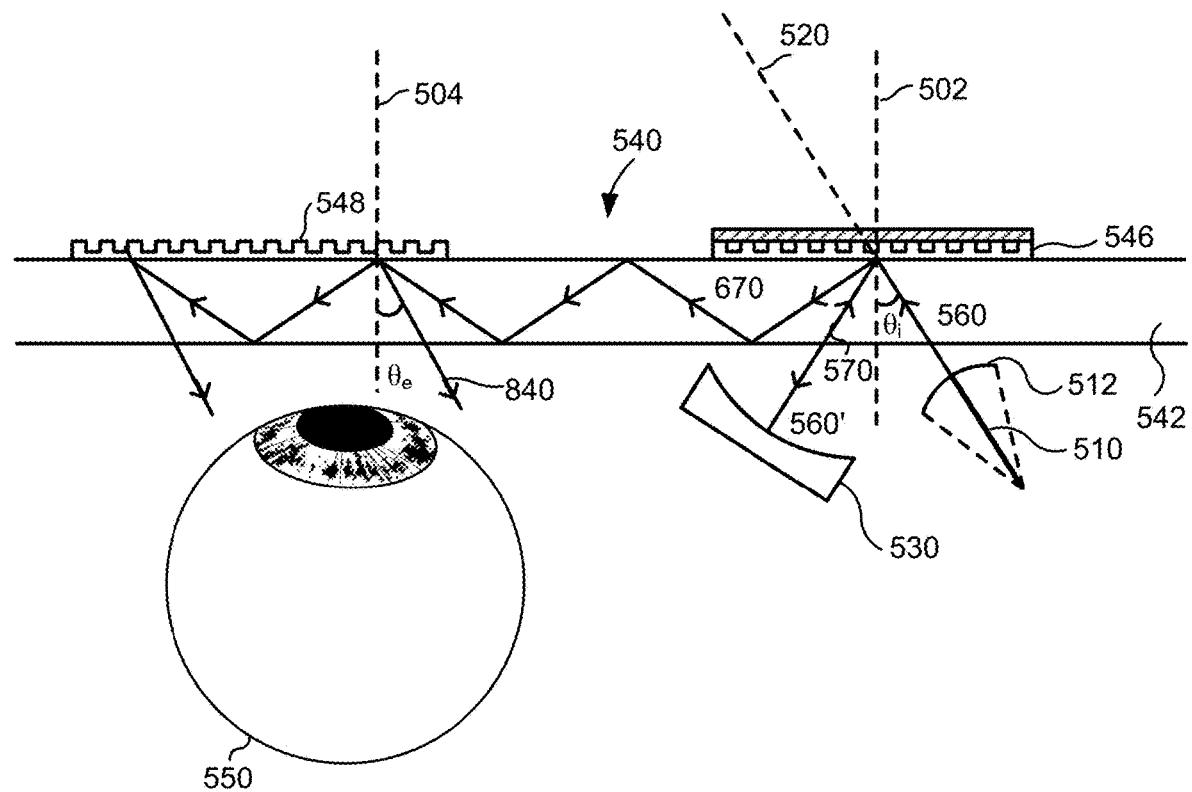
FIG. 8 illustrates schematically a fiber scanning projector coupled to an eyepiece according to some other embodiments of the present invention.

In general, an eyepiece may include an outcoupling DOE (e.g., the outcoupling DOE 548 illustrated in FIG. 5 or the outcoupling DOE 748 illustrated in FIG. 7) configured to have the same grating parameters, including periodicity, as the incoupling DOE (e.g., the incoupling DOE 546 illustrated in FIG. 5 or the incoupling DOE 746 illustrated in FIG. 7). For instance, in the system illustrated in FIGS. 5 and 6A-6B and reproduced in FIG. 8, for an input light beam 560 incident on the waveguide 542 at an angle of incidence $\theta_i$, a diffracted light beam 670, as a negative first order diffraction produced by the metallized incoupling DOE 546 as the collimated light beam 570 is incident thereon on the second pass, may propagate in the waveguide 542 toward the outcoupling DOE 548, as discussed above with reference to FIG. 6B. If the outcoupling DOE 548 is configured to have the same grating parameters (e.g., having the same grating period d) as the incoupling DOE 546, the outcoupling DOE 548 may couple a portion of the light beam 670, e.g., as a negative first order diffraction at an exit angle $\theta_e$ toward the eye 550 of the viewer, where ee is substantially equal to the angle of incidence $\theta_i$. Therefore, for the angled configuration of the fiber scanning projector with respect to the eyepiece 540 as illustrated in FIG. 5 (or as illustrated in FIGS. 3 and 7), the light field projected to the eye 550 may cover only an angular field of view (FOV) that is biased on one side of the normal 504.

According to other embodiments of the present invention, they eyepiece may be implemented in such a manner such that the outcoupling DOE 548 has a grating period d that is different from the grating period of the incoupling DOE 546. This may allow the outcoupling DOE 548 to diffract light at angles that differ from angles diffracted by the incoupling DOE 546.

Figure 9:
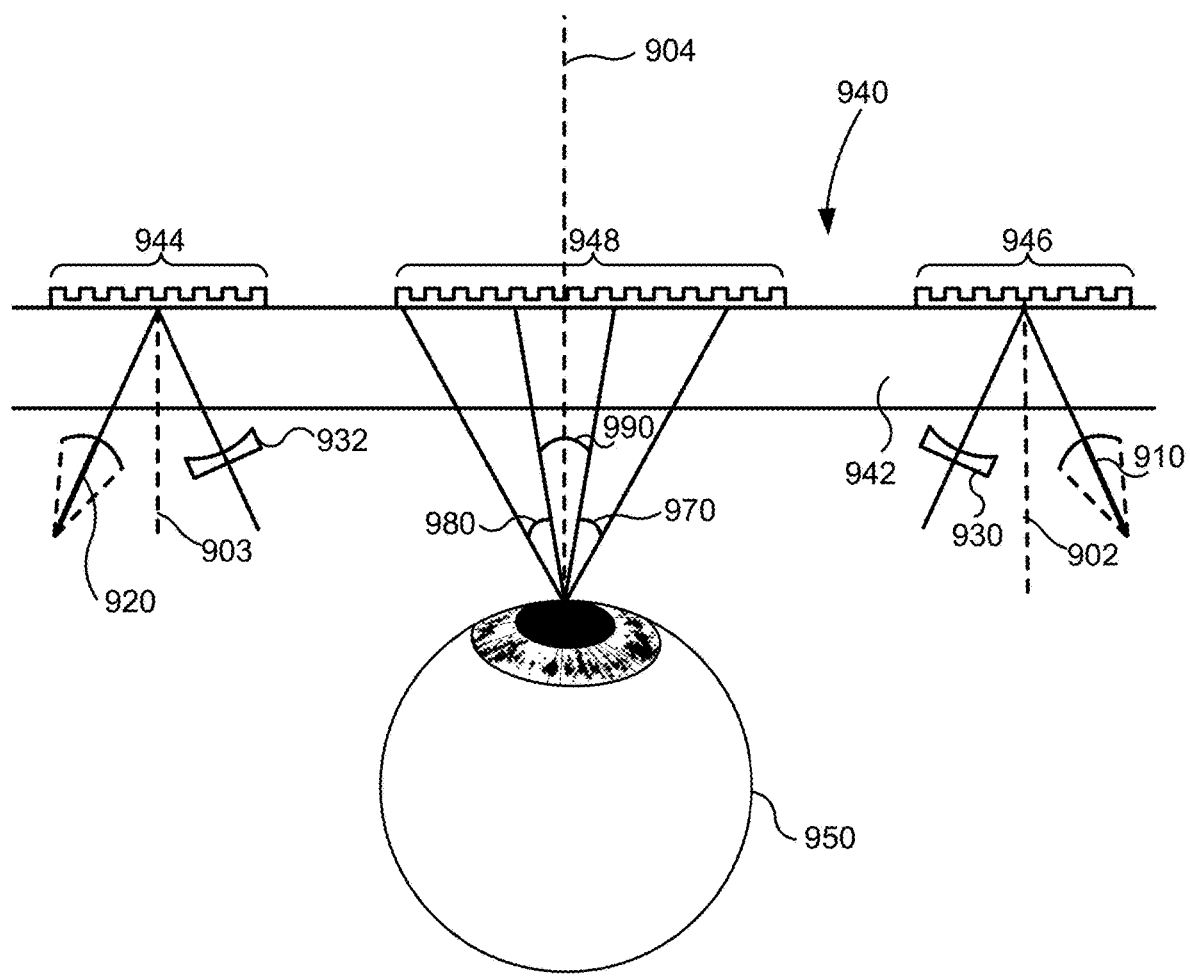
FIG. 9 illustrates schematically a configuration that includes two fiber scanning projectors coupled to an eyepiece according to some embodiments of the present invention.

According to some embodiments, two fiber scanning projectors may be used in order to cover FOVs on both sides of the normal. FIG. 9 illustrates schematically an exemplary configuration that includes two fiber scanning projectors. An eyepiece 940 may include a waveguide 942, a first incoupling DOE 946 coupled to a first lateral region of the waveguide 942 on the right side, a second incoupling DOE 944 coupled to a second lateral region of the waveguide 942 on the left side, and an outcoupling DOE 948 (e.g., an EPE) coupled to a third lateral region of the waveguide 942 on the center. A first fiber scanning projector may include a first optical fiber 910 and a first collimating optical element 930, arranged in an angled-configuration with respect to the eyepiece 940 in the vicinity of the first incoupling DOE 946, similar to that illustrated in FIG. 5. A second fiber scanning projector may include a second optical fiber 920 and a second collimating optical element 932, also arranged in an angled-configuration with respect to the eyepiece 940 in the vicinity of the second incoupling DOE 944, as a mirror image of the first fiber scanning projector.

As illustrated, the first fiber scanning projector may project a light field in a first angular FOV 980 on the left side of the normal 904, whereas the second fiber scanning projector may be configured to project a light field in a second angular FOV 970 on the right side of the normal 904. The first FOV 980 and the second FOV 970 may represent two parts of an image tiled with respect to each other. In some embodiments, the first FOV 980 and the second FOV 970 may butt against each other in the vicinity of the normal 904 (i.e., the gap 990 between the first FOV 980 and the second FOV 970 substantially disappears) to form a combined FOV that represents a continuous image. It may be necessary to make sure that, in the region where the first FOV 980 and the second FOV 970 meet, no ghost images are created.

Figure 10:
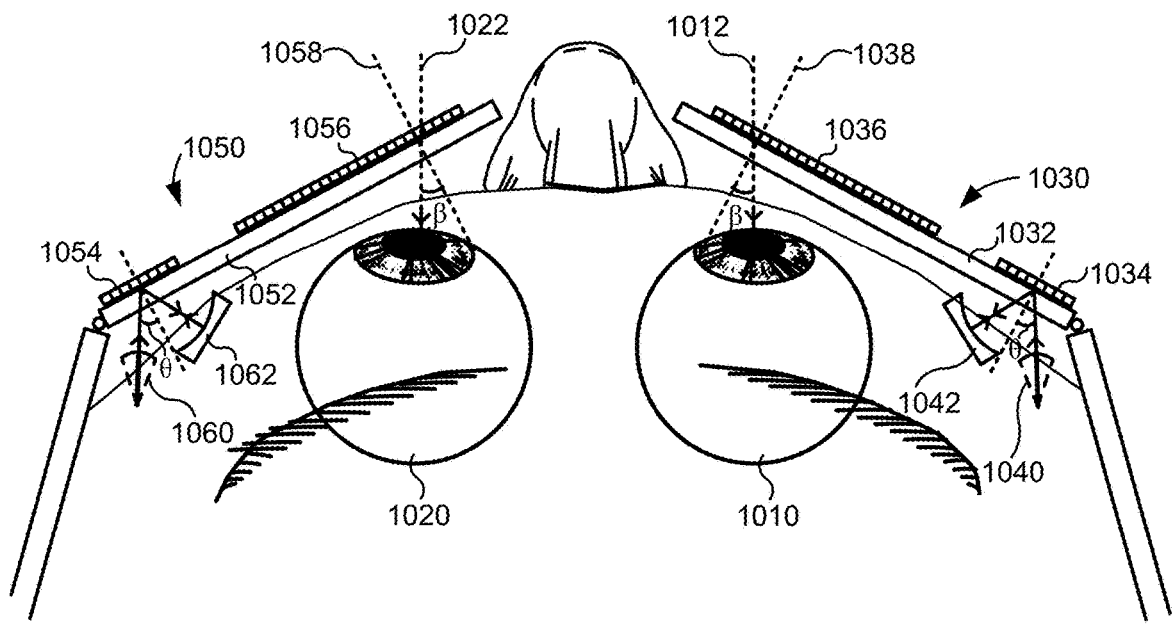
FIG. 10 illustrates schematically a top view of a wearable display according to some embodiments of the present invention.

FIG. 10 illustrates schematically a top view of a wearable display according to some embodiments. The wearable display includes a first eyepiece 1030 for a right eye 1010 of a viewer, and second eyepiece 1050 for a left eye 1020 of the viewer. The first eyepiece 1030 and the second eyepiece 1050 may be positioned in a goggle that can be worn around a face of the viewer.

The first eyepiece 1030 may include a first planar waveguide 1032, and a first incoupling DOE 1034 and a first outcoupling DOE 1036 coupled to the first waveguide 1032. A first fiber scanning projector may include a first optical fiber 1040 and a first collimating optical element 1042, coupled to the first eyepiece 1030 in an angle-configuration, similar to those illustrated in FIG. 5 or 7. Similarly, the second eyepiece 1050 may include a second planar waveguide 1052, and a second incoupling DOE 1054 and a second outcoupling DOE 1056 coupled to the second waveguide 1052. A second fiber scanning projector may include a second optical fiber 1060 and a second collimating optical element 1062, coupled to the second eyepiece 1050 in an angle-configuration.

It may be preferable to have a finite wrap angle of the eyepieces 1030 and 1050 around the viewers eyes 1010 and 1020, as compared to a straight wrap angle. As illustrated in FIG. 10, the first eyepiece 1030 may be wrapped around the face of the viewer such that there is a finite wrap angle β between the normal 1038 of the first waveguide 1032 and a sagittal plane 1012 of the viewer. Similarly, the second eyepiece 1050 may be wrapped around the face of the viewer such that there is a finite wrap angle β between the normal 1058 of the second waveguide 1052 and a sagittal plane 1022 of the viewer. (Note that the illustration in FIG. 10 may be somewhat exaggerated.) According to some embodiments, the wrap angle β may substantially match the tilting angle θ of the first optical fiber 1040 with respect to the first waveguide 1032, or the tilting angle θ of the second optical fiber 1060 with respect to the second waveguide 1052. As such, the light field projected by each of the first eyepiece 1030 and the second eyepiece 1050 may cover a FOV that includes normal incidence to each respective eye 1010 or 1020. In some other embodiments, the wrap angle β may be less than the tilting angle θ of the optical fiber 1040 or 1060, so as to have a gentler wrap angle. By positioning the first eyepiece 1030 and the second eyepiece 1050 at a finite wrap angle β, the viewer may have a more immersive experience with respect to the virtual content, as compared to a straight wrap angle (e.g., β=0).

Figure 11:
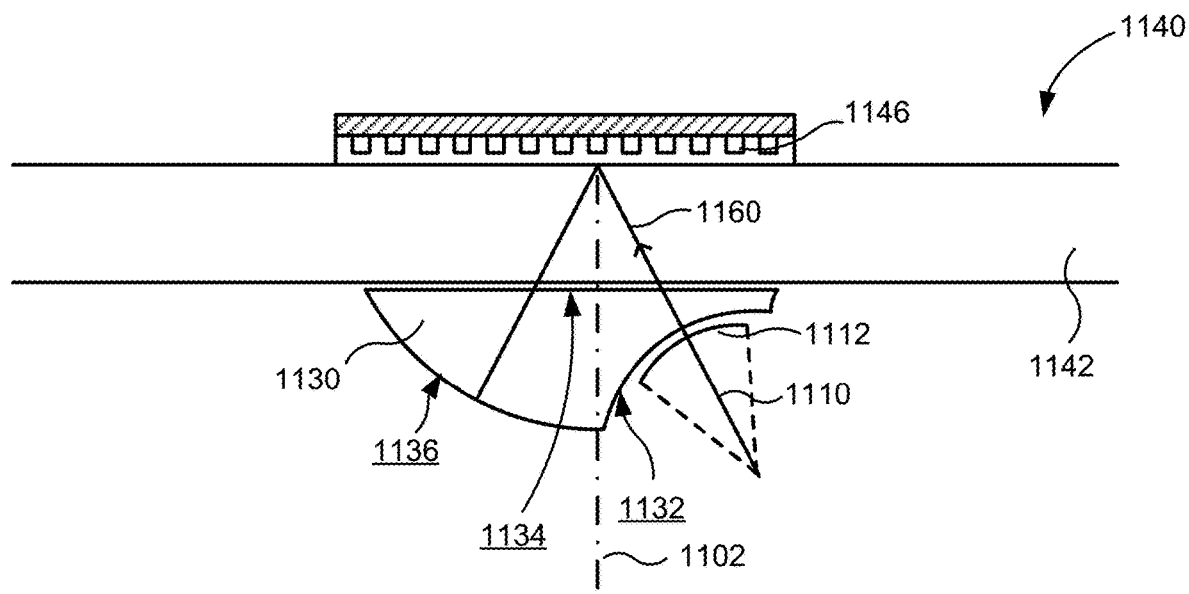
FIG. 11 illustrates schematically a fiber scanning projector coupled to an eyepiece according to some further embodiments of the present invention.

FIG. 11 illustrates schematically a fiber scanning projector coupled to an eyepiece 1140 according to some further embodiments of the present invention. The eyepiece 1140 may include a waveguide 1142, and a metallized incoupling DOE 1146 coupled to a lateral region of the waveguide 1142. The fiber scanning projector may include an optical fiber 1110 (or another suitable waveguide scanner). The optical fiber 1110 may be deflected such that the trajectory of its tip defines a two-dimensional convex object surface 1112 (e.g., a part of a spherical surface). The fiber scanning projector may further include a solid "prism" 1130. The prism 1130 may include a first curved surface 1132 that may serve as an input surface for receiving an input light beam 1160 emitted from the tip of the optical fiber 1110. The prism 1130 may further include a second surface 1134 that may serve as an output surface for transmitting the input light beam 1160. The prism 1130 may further include a third curved surface 1136. The third curved surface 1136 may have a reflective coating, e.g., a metallic coating, and may serve as a collimating mirror, similar to the collimating optical element 530 or 730 as illustrated in FIGS. 5 and 7, respectively.

In some embodiments, the first curved surface 1132 may be characterized by an optical power, similar to the polarizing beam splitter described in U.S. patent application Ser. No. 15/927,765. In some other embodiments, the first curved surface 1132 may be part of a spherical surface that substantially matches with the object surface 1112. Thus, the light beam 1160 emitted from the tip of the optical fiber 1110 may normally incident on the first curved surface 1132. The second surface 1134 may also be characterized by an optical power. In some other embodiments, the second surface 1134 may be substantially flat and may make physical contact with the waveguide 1142. The prism 1130 may comprise a material with an index of refraction that substantially matches with the index of refraction of the waveguide 1142, so that light rays exiting the second surface 1134 may not be refracted or may experience negligible refraction. It should be noted that some embodiments utilizing the prism 1130 illustrated in FIG. 11 may benefit from the index of refraction of the prism being greater than one, resulting in the angles at which light refracts in the prism being less than the angles at which light is incident on the prism.

The methods described above in connection with FIGS. 3-11 can be used in waveguide display systems that includes a scanning mirror as described more fully below. Such waveguide display system can be used in a wearable display system, such virtual reality or augmented reality glasses. In some embodiments, a waveguide display system may include an eyepiece waveguide that can have a first surface and a second surface, the waveguide including an incoupling diffractive optical element (DOE), e.g., an incoupling grating (ICG), and an outcoupling DOE, e.g., outcoupling grating (OCG). The waveguide display system may include a first light beam, e.g., an incoming light beam, passing through the eyepiece waveguide to reach a first reflective optical element. The first reflective optical element can be a scanning mirror, a collimating mirror, or a scanning collimating mirror. A second light beam, the light beam reflected from the first reflective optical element, may be incoupled into the waveguide to form an image that can be viewed by a user. In this case, the incoupling DOE is configured to prevent or suppress propagation of the first light beam to the outcoupling DOE in the waveguide through total internal reflection (TIR). The incoupling grating is also configured to cause the second light beam to propagate to the outcoupling DOE in the waveguide through TIR.

As described above, the angles of incidence and the period, or pitch, of the grating can be selected to determine diffraction angles. The incoupling DOE can be configured so that the first light beam transmitting through the incoupling DOE does not satisfy the TIR condition for the first light beam to propagate to the outcoupling DOE. Similarly, incoupling DOE can be configured so that the second light beam reaching the incoupling DOE satisfies the TIR condition, so the second light beam can propagate to the outcoupling DOE.

In an embodiment, the first light beam, or the incoming light beam, can be a non-scanning collimated image beam, and the first reflective optical element can be a scanning mirror. The reflected scanned beam can be incoupled into a waveguide for an image.

In another embodiment, the first light beam, or the incoming light beam, may be a divergent light beam provided by a fiber scanner, and the first reflective optical element can be a collimating scanning mirror. For example, the collimating scanning mirror can be a scanning mirror having a reflected optical element with positive optical power, e.g., a concave mirror. The reflected scanned beam, which is collimated, can be incoupled into the waveguide to form an image.

In another embodiment, the first light beam, or the incoming light beam, may be a collimated light beam provided by a collimating mirror, and the first reflective optical element can be a non-collimating scanning mirror. For example, a collimating mirror can be a segment, or a sliver, of a concave reflected optical element with positive optical power, e.g., a concave mirror. The collimating mirror can be configured to receive an input light beam from a fiber scanner. The reflected scanned beam from the first reflective optical element can be incoupled into the waveguide to form an image.

In another embodiment, the first light beam, or the incoming light beam, may be a scanned divergent light beam provided by a scanning mirror, which receives an input light beam from a fiber scanner and provides the scanned divergent light beam, which is transmitted through the waveguide to reach the first reflective optical element. The first reflective optical element can be a collimating mirror, which is configured to receive the scanned divergent light beam and provide a reflected collimated light beam to the waveguide. The reflected scanned beam from the first reflective optical element can be incoupled into the waveguide to form an image.

In some embodiments, the fiber scanner may be disposed on an opposite side of the waveguide as the scanning mirror. In this case, the light beam from the fiber scanner needs to pass through the waveguide. In order to prevent the light beam from the fiber scanner from being incoupled into the waveguide to reach the outcoupling DOE, the fiber scanner can be disposed such that the light beam transmits to the waveguide in a portion of the waveguide that does not have the incoupling DOE. Alternative, the incoupling DOE can be configured so that the light beam from the fiber scanner transmitting through the incoupling DOE does not satisfy the TIR condition for the first light beam does not propagate to the outcoupling DOE.

In the above embodiments, the waveguide display system includes an incoming light beam passing through the eyepiece waveguide to reach a first reflective optical component. The reflected light beam may be incoupled into the waveguide to form an image that can be viewed by a user. In alternative embodiments, the first reflected light beam may pass through the waveguide to reach a second reflective optical component, which can provide a second reflected light beam to be incoupled into the waveguide. In this case, the incoupling grating is configured to prevent the first light beam or the first reflected light beam from propagating to the output grating in the waveguide through total internal reflection (TIR). The incoupling grating is also configured to cause the second reflected light beam to propagate to the output grating in the waveguide through total internal reflection (TIR).

For example, in an embodiment, the incoming light beam may be a divergent light beam from a fiber scanner, which transmits through the waveguide without being incoupled into the waveguide to the outcoupling DOE. The first reflective optical component can be a scanning mirror, which receives the incoming light beam from the fiber scanner and provides a first reflected light beam, a scanned divergent light beam, which transmits through the waveguide to reach a second reflective optical element. The second reflective optical element can be a collimating mirror, which is configured to receive the scanned divergent light beam and provide a second reflected light beam, which is a reflected collimated light beam, to the waveguide. The second reflected light beam can be incoupled into the waveguide to form an image.

Figure 12A:
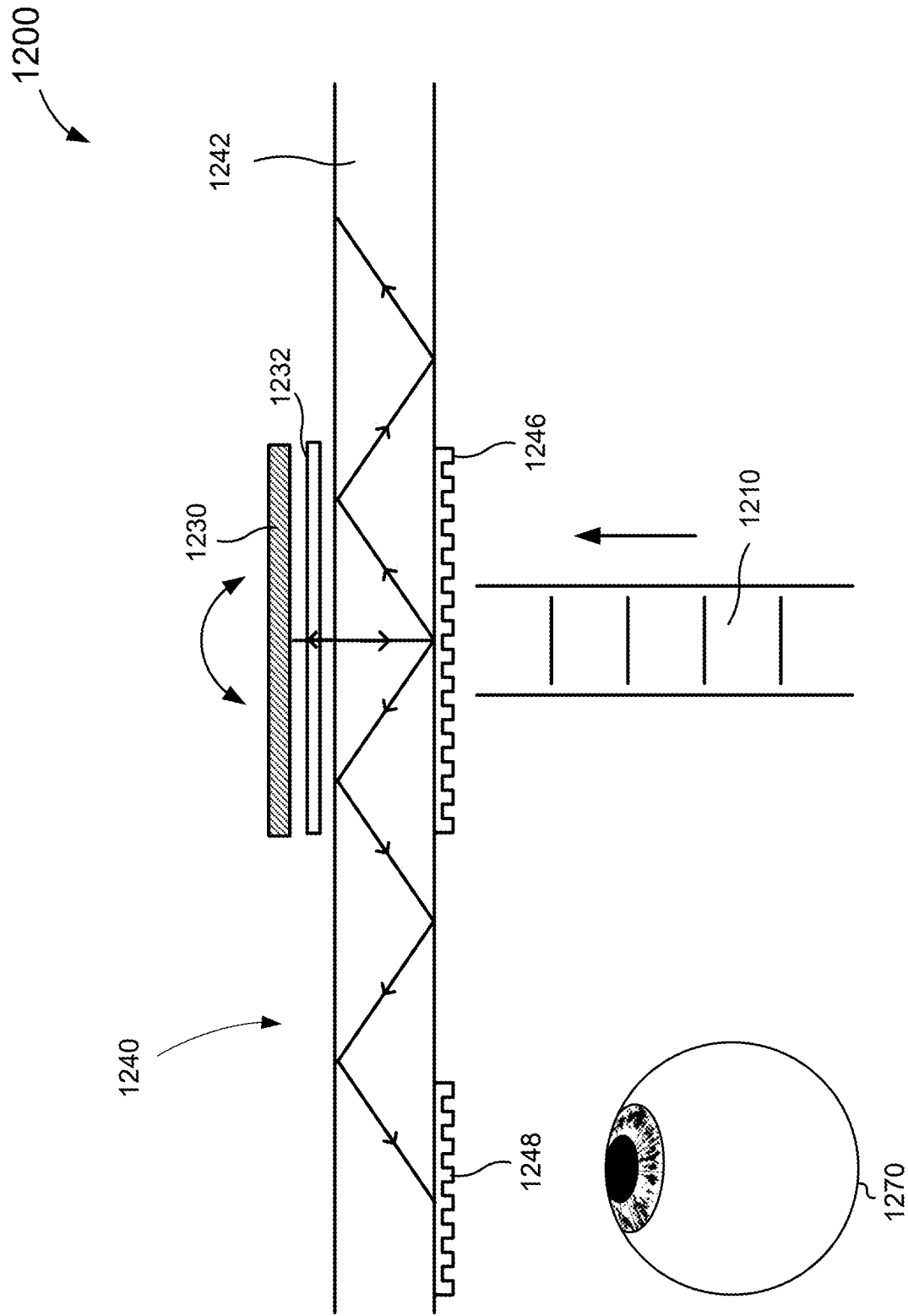
FIG. 12A is a simplified schematic diagram illustrating a waveguide display system including a projector integrated with a scanning mirror according to some embodiments of the present invention.

FIG. 12A is a simplified schematic diagram illustrating a waveguide display system including a projector integrated with a scanning mirror according to some embodiments of the present invention. As shown in FIG. 12A, a waveguide display system 1200 includes an eyepiece waveguide 1240 having a planar waveguide 1242. A non-scanning input light beam 1210, e.g., as emitted from a Liquid Crystal on Silicon (LCOS) projector, is incident on an eyepiece 1240. The eyepiece 1240 includes a waveguide 1242, an incoupling diffractive optical element (DOE) 1246, coupled to a first lateral region of the waveguide 1242, and an outcoupling DOE 1248, e.g., an exit pupil expander (EPE) or outcoupling grating (OCG), coupled to a second lateral region of the waveguide 1242. For example, the DOE 1248 can be an exit pupil expander (EPE), such as an outcoupling grating (OCG). The display system includes a scanning mirror 1230 positioned on the other side of the eyepiece 1240 from the input light beam 1210. The scanning mirror 1230 may be scanned around a scanning axis perpendicular to the plane of the paper. The scanning mirror 1230 may be positioned flat against the eyepiece 1240, the mirror can be disposed close to the eyepiece to make it as small as possible, and it may be possible to make the scanning angular range as small as possible.

In the system of FIG. 12A, the scanned reflected light beam from the scanning mirror 1230 is incoupled into the waveguide by the incoupling DOE 1246 and propagates by TIR to the OCG to provide images viewable by a user. In this configuration, it is desirable to prevent the input light beam 1210 from being coupled effectively into the EPE or OCG region of the eyepiece 1240 (i.e., the second lateral region where the DOE 1248 is coupled to) by TIR in the waveguide 1242. In some embodiments, the input light beam 1210 can be a polarized collimated light beam, and the incoupling DOE 1246 can be a polarization-sensitive incoupling grating, such that the input light beam 1210 is not coupled into the waveguide. Further, the system can include a quarter-wave plate 1232 between the waveguide 1242 and the scanning mirror 1230, such that the scanned reflected light beam has a different polarization than the polarization of the input light beam 1210, and can be incoupled into the waveguide to by TIR to form output images for a user's eye 1270.

In some embodiments, alternative systems can be provided without the polarization-sensitive grating or beam splitter and the quarter wave plate. In these embodiments, the incident angles of the light beams and/or the period or pitch of the gratings can be selected to prevent an incoming light beam from propagating to the output grating in the waveguide through total internal reflection (TIR). The incident angles of the light beams and/or the period or pitch of the gratings can also be configured to cause the reflected light beam to propagate to the output grating in the waveguide through total internal reflection (TIR). An example is illustrated in FIG. 12B.

Figure 12B:
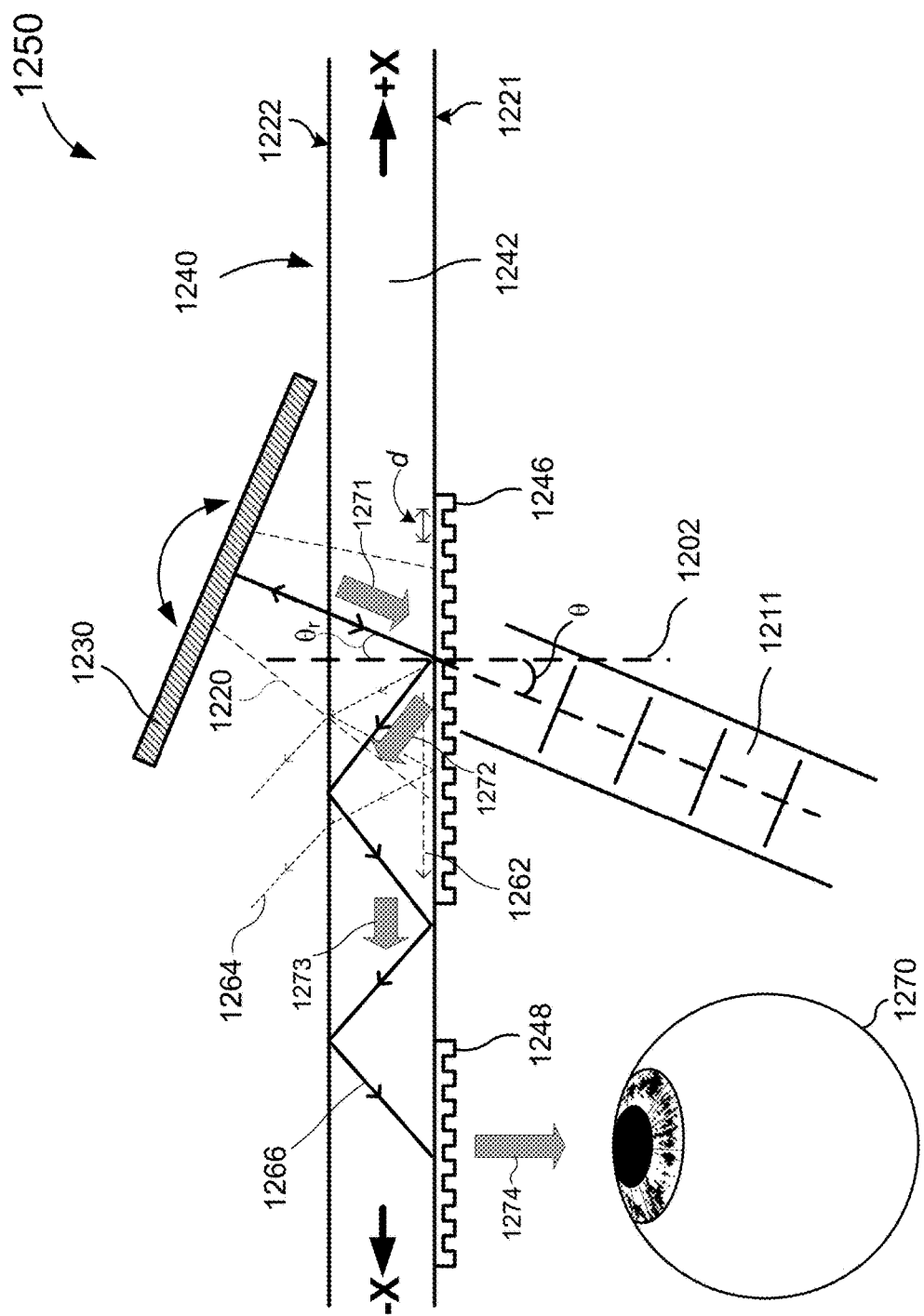
FIG. 12B is a simplified schematic diagram illustrating another waveguide display system including a projector integrated with a scanning mirror according to some embodiments of the present invention.

FIG. 12B is a simplified schematic diagram illustrating a waveguide display system including a projector integrated with a scanning mirror according to some embodiments of the present invention. As shown in FIG. 12B, a waveguide display system 1250 includes an eyepiece waveguide 1242 having a first surface 1221 and a second surface 1222. The waveguide 1242 includes an incoupling diffraction element (DOE) 1246, which could be an incoupling grating (ICG), and an outcoupling diffraction element (DOE) 1248, which can be an outcoupling grating (OCG) or an exit pupil expander (EPE).

A collimated light beam 1211 is projected to the first surface 1221 of the waveguide 1242 at a first incident angle θ. A scanning mirror 1230 is disposed adjacent the second surface 1222 of the waveguide 1242. The scanning mirror is configured to receive the collimated input light beam 1210 and to provide a collimated reflected light beam 1220 toward the waveguide at a second incident angle $θ_r$. The reflected light beam 1250 can span a range of incident angles with the dotted lines marking the marginal rays. Since the collimated light beam 1211 is incident on the incoupling DOE 1246 at an oblique angle of incidence, the diffractive coupling of the incident light into the waveguide 1242 can be controlled to achieve desired diffractive coupling conditions. To facilitate the discussion, the direction oriented along the plane of the waveguide pointing from the incoupling DOE 1246 toward the outcoupling DOE 1248 as the "−X" direction, and the opposite direction as the "+X" direction.

As shown in FIG. 12B, the input light beam 1210 is incident on the eyepiece 1240 off axis, e.g., at an angle θ with respect to a normal 1202 of the waveguide 1242. Since the collimated light beam 1211 is incident on the incoupling DOE 1246 at an oblique angle of incidence, the diffractive coupling of the incident light into the waveguide 1242 can be controlled to achieve the desired diffractive coupling conditions. For example, the angle of incidence θ and the grating period d of the incoupling DOE 1246 may be selected to achieve the desired diffractive coupling conditions. In some embodiments, the incoupling DOE 1246 is configured to prevent the collimated input light beam from the collimated light source from propagating to the outcoupling DOE 1248 in the waveguide through total internal reflection (TIR), and cause the collimated reflected light beam 1220 to propagate to the outcoupling DOE 1248 through total internal reflection (TIR) in the waveguide.

For example, when collimated light beam 1211 passes through the incoupling DOE 1246) a negative first order diffraction (in a reflection geometry) by the incoupling DOE 1246 at the diffraction angle θ on the first pass may fail the TIR condition of the waveguide 1242 in the "−X" direction toward the outcoupling DOE. In FIG. 12B, the light beams that fail the TIR condition and propagate as an evanescent wave 1262 along the surface of the waveguide 1242 or are refracted out of the waveguide 1242 at each bounce in the waveguide 1242, as shown by dotted lines 1264. However, when after the input light beam 1210 has been reflected by the scanning mirror 1230, the scanned reflected light beam 1220 is incident upon the incoupling DOE 1246, a negative first order diffraction (in a transmission geometry) by the incoupling DOE 1246 may meet the TIR condition of the waveguide 1242 in the "−X" direction toward the outcoupling DOE 1248, as shown by light beam 1266. To illustrate the light path for image projection, the light beams that are diffracted in the waveguide and emitted to reach the eye 1270 of the viewer are marked by grey arrows 1271, 1272, 1273, and 1274. To simplify the drawings, the light beams in the "−X" direction away from the outcoupling DOE 1248 are omitted in FIG. 12B. More details about the selective diffraction functions of the incoupling DOE are described above in connection with FIGS. 3, 4A, and 4B.

The scanning mirror 1230 can be a MEMS (micro-electro-mechanical system) 2-axis scanning mirror, which is a two-dimensional scanning mirror, configured to rotate in two dimensions with a pitch axis and a roll axis. Depending on the embodiments, the scanning mirror may be driven by magnetic, electrical, or piezoelectric actuators. The scanning mirror movement may be resonant in one degree of freedom and quasi-statically controlled in a second degree of freedom. For example, the resonant axis may correspond to a movement analogous to movement along lines of a display and the quasi-statically controlled second degree of freedom may correspond to movement analogous to vertical movement between lines of a display. In one possible case, the resonant axis may be the pitch axis and the quasi-statically controlled axis may be the yaw axis. For relatively high resolution imagery, it is desirable to have the equivalent of 1000 or 2000 scan lines, for example, and a frame refresh rate of 30 to 60 frames per second. Such parameters call for a line rate of 30 KHz to 120 KHz. For small MEMS scanners that are small enough to be included in augmented reality wearables, there is generally a tradeoff between the angular range of the resonant axis, which relates to the field of view (FOV), and the resonant frequency, which equates to the line rate.

FIG. 12B illustrates an example of a waveguide display system with light source providing a collimated image light integrated with a scanning mirror. The system enables the light source and the scanning mirror to be disposed on opposite sides of the eyepiece waveguide. One advantage of this configuration is reduced size of the device. Further, this configuration can be implemented without a polarization-sensitive DOE, wave plates for altering the polarization, or a polarization dependent light source, etc. The complexity and cost of the display system can be substantially reduced.

In some embodiments, a divergent light source and a collimating optical element can be placed on opposite sides of a waveguide. For example, the incoming light beam may be a divergent light beam provided by a fiber scanner, and the collimating scanning mirror can be a scanning mirror having a reflected optical element with positive optical power, e.g., a scanning concave mirror. The incident angles of the light beams and/or the period (or pitch) of the incoupling DOE can be selected to prevent an incoming light beam from propagating to the output grating in the waveguide through total internal reflection (TIR). The incident angles of the light beams and/or the period or pitch of the gratings can also be configured to cause the collimated scanned reflected light beam to propagate in the waveguide through total internal reflection (TIR) to the outcoupling DOE to form an image that can be viewed by a user. An example is illustrated in FIG. 13.

Figure 13:
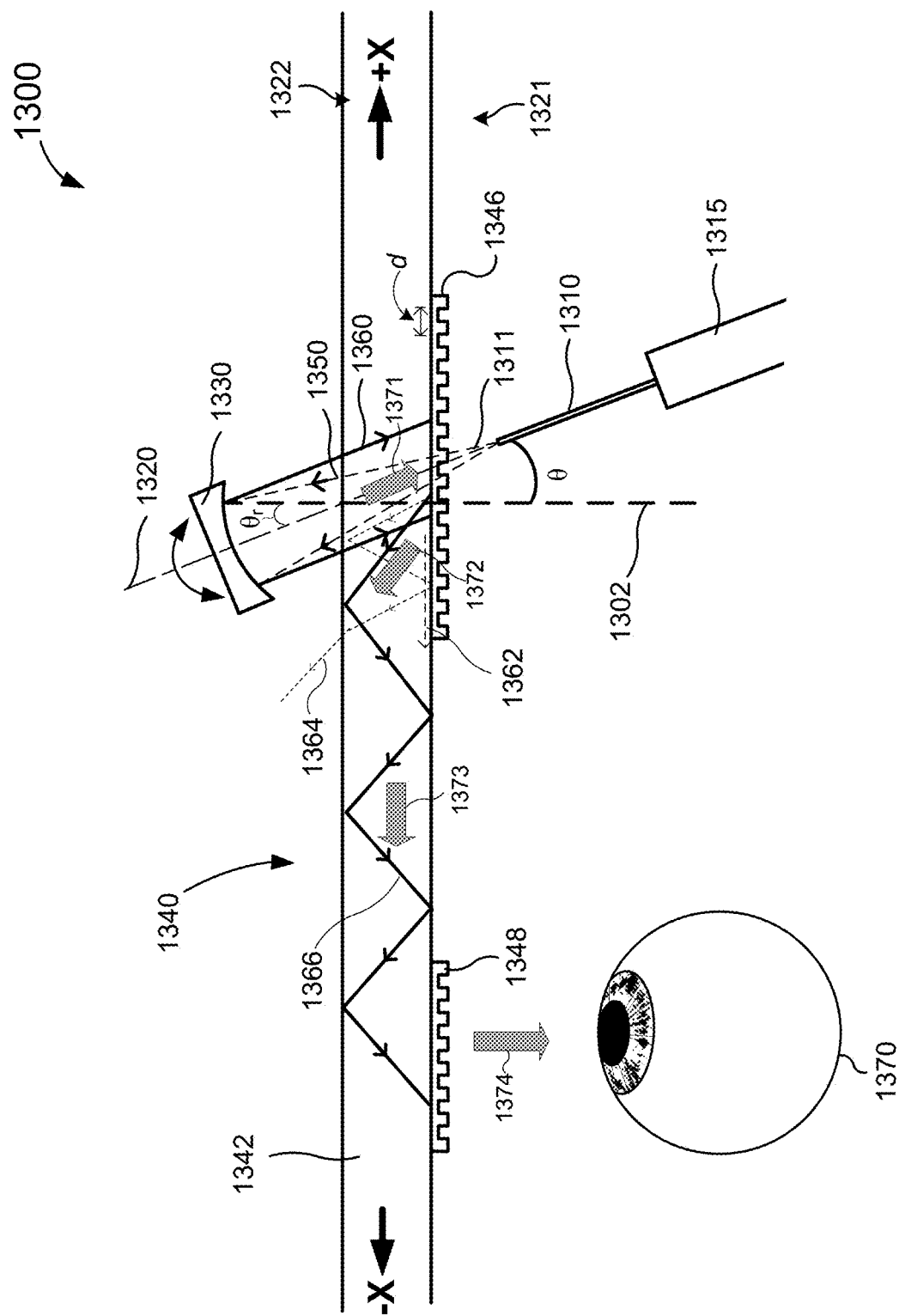
FIG. 13 is a simplified schematic diagram illustrating another waveguide display system including a projector integrated with a scanning mirror according to some embodiments of the present invention.

FIG. 13 is a simplified schematic diagram illustrating another waveguide display system including a projector integrated with a scanning mirror according to some embodiments of the present invention. As shown in FIG. 13, a waveguide display system 1300 includes an eyepiece waveguide 1340 having a planar waveguide 1342 with a first surface 1321 and a second surface 1322. The eyepiece waveguide 1340 also has an incoupling diffractive optical element (DOE) 1346 coupled to a first lateral region of the waveguide 1342, and an outcoupling DOE 1348 coupled to a second lateral region of the waveguide 1342. A fiber scanner 1315 is disposed adjacent the first surface 1321 of the waveguide 1342. A collimating scanning optical element, e.g., a collimating scanning mirror, 1330 is disposed adjacent the second surface of the waveguide. The configuration of the fiber scanner, waveguide, and collimating mirror in FIG. 13 can be similar to the configuration of corresponding components as shown in FIG. 3. However, in a waveguide display system 1300, the fiber scanner 1315 is configured to be a line scanner, i.e., with one scanning axis, and collimating mirror 1330 is a scanning mirror configured to scan with one scanning axis, which can be orthogonal to the scanning axis of the fiber scanner.

The fiber scanner 1315 may include an optical fiber 1310 (or another suitable waveguide scanner), and is configured to scan a divergent input light beam 1311 toward the incoupling DOE 1346 of waveguide 1342 at a first incident angle θ. The optical fiber 1310 may be deflected such that the trajectory of its tip defines a one-dimensional convex object surface. As the light beam exits the tip of the optical fiber 1310, the light beam may diverge as a cone of light rays (e.g., bounded by the marginal rays 1350 as illustrated in FIG. 13) with a subtended angle determined by the numerical aperture of the optical fiber 1310. An optical axis 1320 may be defined as a line that passes through the optical fiber 1310 when the optical fiber 1310 is not deflected.

The collimating scanning mirror 1330, disposed adjacent the second surface 1322 of the waveguide 1342, is configured to receive the divergent input light beam 1311 from the fiber scanner 1315 through the waveguide 1342 and to provide a collimated reflected light beam 1360 toward the incoupling DOE 1346 of the waveguide at a second incident angle $\theta_r$.

As shown in FIG. 13, the input light beam 1311 is incident on the eyepiece 1340 off axis, e.g., at an angle $\theta$ with respect to a normal 1302 of the waveguide 1342. The diffractive coupling of the incident light into the waveguide 1342 can be configured to achieve desired diffractive coupling conditions. For example, the angle of incidence $\theta$ and the grating period d of the incoupling DOE 1346 may be selected to achieve desired diffractive coupling conditions. In some embodiments, the incoupling DOE 1346 is configured to prevent the collimated input light beam from the collimated light source from propagating to the outcoupling DOE 1348 in the waveguide through total internal reflection (TIR), and cause the collimated reflected light beam 1360 to propagate to the outcoupling DOE 1348 through total internal reflection (TIR) in the waveguide. To facilitate the discussion, the direction oriented along the plane of the waveguide pointing from the incoupling DOE 1346 toward the outcoupling DOE 1348 as the "-X" direction, and the opposite direction as the "+X" direction.

For example, when input light beam 1311 passes through the incoupling DOE 1346, a negative first order diffraction (in a reflection geometry) by the incoupling DOE 1346 at the diffraction angle on the first pass may fail the TIR condition of the waveguide 1342 in the "-X" direction toward the outcoupling DOE 1348. In FIG. 13, the light beams that fail the TIR condition and propagate as an evanescent wave 1362 along the surface of the waveguide 1342 or are refracted out of the waveguide 1342 at each bounce in the waveguide 1342, as shown by dotted lines 1364. However, after the input light beam 1311 has been reflected by the collimating scanning mirror 1330, and the scanned reflected light beam 1360 is incident upon the incoupling DOE 1346, a negative first order diffraction (in a transmission geometry) by the incoupling DOE 1346 may meet the TIR condition of the waveguide 1342 in the "-X" direction toward the outcoupling DOE 1348, as shown by light beam 1366. The outcoupling DOE 1348 may comprise a diffraction grating (may be referred herein as an outcoupling grating) configured to diffract a portion of light propagating in the waveguide 1366 out of the waveguide 1342 and toward an eye 1350 of a viewer. To illustrate the light path for image projection, the light beams that are diffracted in the waveguide and emitted to reach the eye 1370 of the viewer are marked by grey arrows 1371, 1372, 1373, and 1374. To simplify the drawings, the light beams in the "+X" direction away from the outcoupling DOE 1348 are omitted in FIG. 13. More details about the selective diffraction functions of the incoupling DOE are described above in connection with FIGS. 3, 4A, and 4B.

FIG. 13 illustrates an example of a waveguide display system with a fiber scanner providing a divergent light beam integrated with a collimating scanning mirror for providing a collimated light beam. The system enables the light source and the scanning mirror to be disposed on opposite sides of the eyepiece waveguide. One advantage of this configuration is reduced size of the device. Further, this configuration can be implemented without a polarization-sensitive DOE, wave plates for altering the polarization, or a polarization dependent light source, etc. The complexity and cost of the display system can be substantially reduced.

In some embodiments, a divergent light source and a collimating optical element can be placed on the same side of a waveguide, and a scanning mirror on the other side of the waveguide. For example, a divergent input light beam may be provided by a fiber scanner, which transmits the divergent input light beam through an incoupling DOE to a scanning mirror. The scanning mirror can receive the divergent input light beam and transmits a divergent reflected light beam through incoupling DOE to the collimating optical element. The collimating optical element can reflect a collimated light beam toward the incoupling DOE of the waveguide. In this case, the light beams pass through the incoupling DOE three times. In order to reduce unwanted diffraction, the incoupling DOE can be configured to prevent the divergent input light beam from the fiber scanner and the reflected light beam from the scanning mirror from propagating to the outcoupling DOE in the waveguide through total internal reflection (TIR). The incoupling DOE can also be configured to cause the collimated light beam to propagate to the outcoupling DOE in the waveguide through total internal reflection (TIR). Similar to the embodiments described above, the incident angles of the light beams and/or the period (or pitch) of the incoupling DOE can be selected to enable desirable diffractions and suppress undesirable diffractions. An example is illustrated in FIG. 14.

Figure 14:
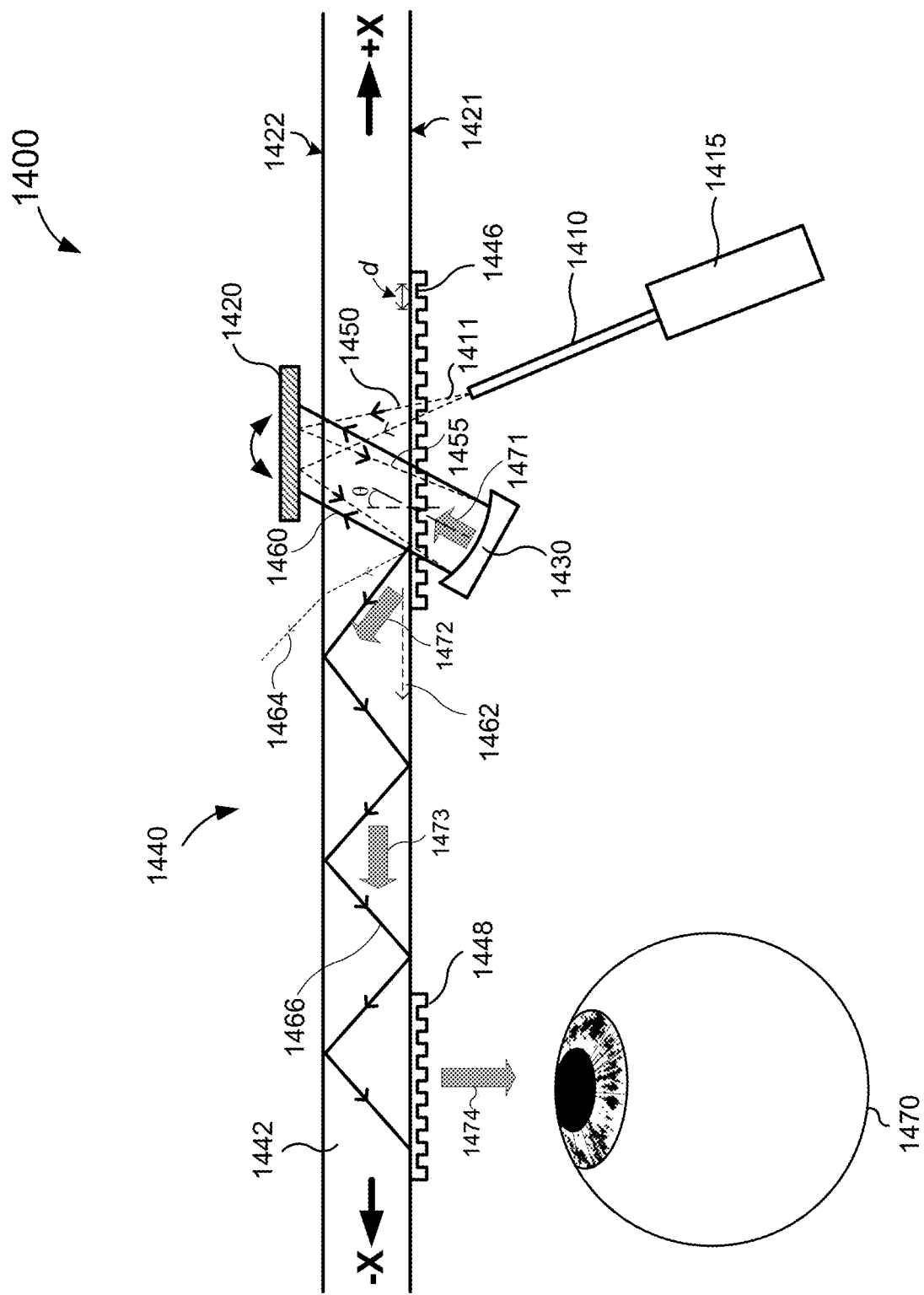
FIG. 14 is a simplified schematic diagram illustrating another waveguide display system including a projector integrated with a scanning mirror according to some embodiments of the present invention.

FIG. 14 is a simplified schematic diagram illustrating another waveguide display system including a projector integrated with a scanning mirror according to some embodiments of the present invention. As shown in FIG. 14, a waveguide display system 1400 includes an eyepiece waveguide 1440 having a planar waveguide 1442 with a first surface 1421 and a second surface 1422. The eyepiece waveguide 1440 also has an incoupling diffractive optical element (DOE) 1446 coupled to a first lateral region of the waveguide 1442, and an outcoupling DOE 1448 coupled to a second lateral region of the waveguide 1442. A fiber scanner 1415 is disposed adjacent to the first surface 1421 of the waveguide 1442. A scanning optical element, e.g., a scanning mirror, 1420 is disposed adjacent to the second surface of the waveguide. A collimating scanning optical element, e.g., a collimating scanning mirror, 1430 is disposed adjacent the first surface of the waveguide. The configuration of the fiber scanner, waveguide, scanning mirror, and collimating mirror in FIG. 14 can be similar to the configuration of corresponding components as shown in FIG. 5. However, in a waveguide display system 1400, the fiber scanner 1415 is configured to be a line scanner, i.e., with one scanning axis, and scanning mirror 1430 is a scanning mirror configured to scan with one scanning axis, which can be orthogonal to the scanning axis of the fiber scanner.

The fiber scanner 1415 may include an optical fiber 1410 (or another suitable waveguide scanner), and is configured to scan a divergent input light beam 1411 toward the incoupling DOE 1446 of waveguide 1442 at a first incident angle $\theta$. The optical fiber 1410 is configured to be scanned linearly (i.e., line scanning) such that its tip moves along an arc in and out of the page, similar to the optical fiber 1310 illustrated in FIG. 13. The optical fiber 1410 may be deflected such that the trajectory of its tip defines a one-dimensional convex object surface. As the light beam exits the tip of the optical fiber 1410, the light beam may diverge as a cone of light rays (e.g., bounded by the marginal rays 1450 as illustrated in FIG. 14) with a subtended angle determined by the numerical aperture of the optical fiber 1410. Similar to optical axis 1320 in FIG. 13, an optical axis may be defined in FIG. 14 as a line that passes through the optical fiber 1410 when the optical fiber 1410 is not deflected.

The scanning mirror 1420 is disposed adjacent to the second surface 1422 of the waveguide 1442. The scanning mirror 1420 can be configured to scan in a slow axis perpendicular to the plane of the page. The scanning mirror is configured to receive the divergent input light beam 1411 and to provide a reflected light beam 1455 toward the waveguide at a second incident angle. The reflected light beam 1455 can span a range of incident angles with the dotted lines marking the marginal rays.

The collimating mirror 1430, disposed adjacent to the first surface 1421 of the waveguide 1442, is configured to receive the divergent reflected light beam 1455 from the scanning mirror 1420 through the incoupling DOE 1446 of waveguide 1442 and to provide a collimated reflected light beam 1460 toward the incoupling DOE 1446 of the waveguide at a third incident angle.

As shown in FIG. 14, the divergent input light beam 1450, the scanned reflected divergent light beam 1455, and collimated light beam 1460 are incident on the eyepiece 1440 off axis, e.g., at an angle with respect to a normal of the waveguide 1442. The diffractive coupling of the incident light beam into the waveguide 1442 can be configured to achieve desired diffractive coupling conditions. For example, the angle of incidence θ and the grating period d of the incoupling DOE 1446 may be selected to achieve desired diffractive coupling conditions. In some embodiments, the incoupling DOE 1446 is configured to prevent the divergent input light beam 1450 and the reflected divergent light beam 1455 from the collimated light source from propagating to the outcoupling DOE 1448 in the waveguide through total internal reflection (TIR), and cause the collimated light beam 1460 to propagate to the outcoupling DOE 1448 through total internal reflection (TIR) in the waveguide. To facilitate the discussion, the direction oriented along the plane of the waveguide pointing from the incoupling DOE 1446 toward the outcoupling DOE 1448 as the "−X" direction, and the opposite direction as the "+X" direction.

For example, when divergent input light beam 1450 passes through the incoupling DOE 1446, a negative first order diffraction (in a transmission geometry) by the incoupling DOE 1446 at the diffraction angle on the first pass may fail the TIR condition of the waveguide 1442 in the "−X" direction toward the outcoupling DOE 1448. In FIG. 14, the light beams that fail the TIR condition and propagate as an evanescent wave 1462 along the surface of the waveguide 1442 or are refracted out of the waveguide 1442 at each bounce in the waveguide 1442, as shown by dotted lines 1464. Similarly, the reflected divergent light beam 1455 is also configured to fail the TIR condition of the waveguide 1442 in the "−X" direction toward the outcoupling DOE 1448. However, after the input light beam 1411 has been reflected by the collimating scanning mirror 1430, and the collimated reflected light beam 1460 (also marked by gray arrow 1461) is incident upon the incoupling DOE 1446, a negative first order diffraction (in a transmission geometry) by the incoupling DOE 1446 may meet the TIR condition of the waveguide 1442 in the "−X" direction toward the outcoupling DOE 1448, as shown by light beam 1466. The outcoupling DOE 1448 may comprise a diffraction grating (may be referred herein as an outcoupling grating) configured to diffract a portion of light beam 1466 out of the waveguide 1442 and toward an eye 1470 of a viewer. To illustrate the light path for image projection, the light beams that are diffracted in the waveguide and emitted to reach the eye 1470 of the viewer are marked by grey arrows 1471, 1472, 1473, and 1474. To simplify the drawings, the light beams diffracted in the "+X" direction away from the outcoupling DOE 1448 are omitted in FIG. 14. More details about the selective diffraction functions of the incoupling DOE are described above in connection with FIGS. 3, 4A, 4B, 5, 6A, and 6B.

As described above, FIG. 14 illustrates an example of a waveguide display system with a fiber scanner providing a divergent light beam integrated with a scanning mirror for providing a two-dimensional scanned light beam. A collimating mirror is then used to produce a collimated light beam to be incoupled into the waveguide to form an image. The system enables the light source and the scanning mirror to be disposed on opposite sides of the eyepiece waveguide. A collimating mirror can be disposed on the same side as the light source. One advantage of this configuration is reduced size of the device. Further, this configuration can be implemented without a polarization-sensitive DOE, wave plates for altering the polarization, or a polarization dependent light source, etc. The complexity and cost of the display system can be substantially reduced.

Figure 15A:
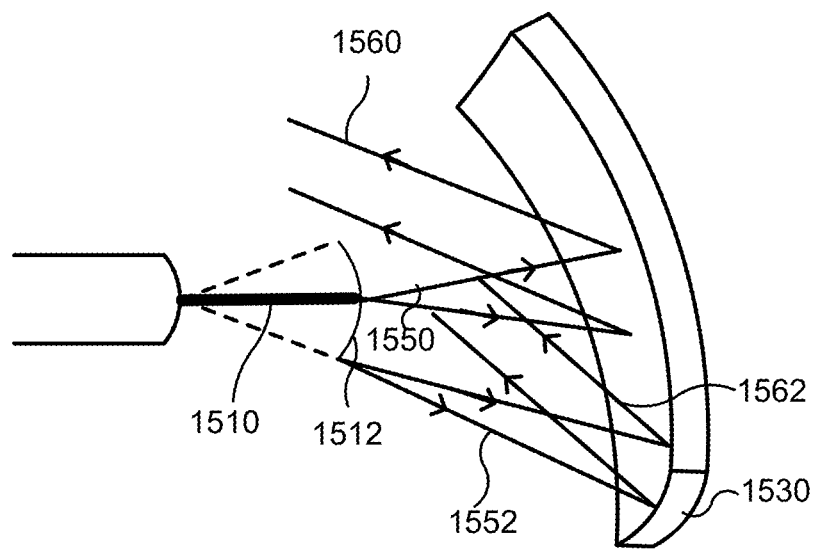
FIG. 15A illustrates schematically a perspective view of a fiber scanning projector according to some embodiments.

FIG. 15A illustrates schematically a perspective view of a fiber scanning projector according to some embodiments. The fiber scanning projector includes an optical fiber 1510 configured to be scanned linearly (i.e., line scanning) along an arc 1512 in the plane of the page. The fiber scanning projector further includes a section of a collimating mirror 1530, instead of a full round mirror. The section of the collimating mirror 1530 may be configured to receive a divergent input light beam 1550 or 1552 emitted from the tip of the optical fiber 1510, and produce a collimated light beam 1560 or 1562.

Figure 15B:
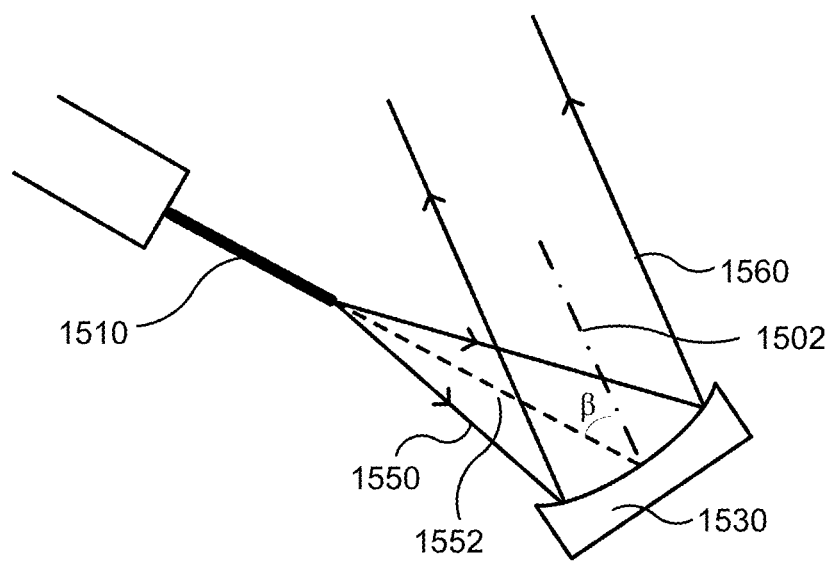
FIG. 15B illustrates schematically a side view of the fiber scanning projector illustrated in FIG. 15A.

FIG. 15B illustrates schematically a side view of the fiber scanning projector illustrated in FIG. 15A. The optical fiber 1510 is configured to scan along an arc in and out of the page. As illustrated, a normal 1502 of the section of the collimating mirror 1530 may be slightly tilted at an angle β with respect to the optical axis 1552 of the optical fiber 1510, so that the reflected collimated light beam 1560 is directed upward, avoiding the optical fiber 1510 (instead of directed back toward the optical fiber 1510). The tilting angle β may be relatively small, so that only a small amount of off-axis aberration may be introduced.

In some embodiments, a divergent light source and a collimating optical element can be placed on the same side of a waveguide, and a scanning mirror on the other side of the waveguide, similar to the system illustrated in FIG. 14. However, in an alternative embodiment, a divergent input light beam may be provided by a fiber scanner, which transmits the divergent input light beam directly to a collimating optical element, which can transmit the collimated light beam through an incoupling DOE to a scanning mirror on the other side of the waveguide. In this case, the light beams passes through the incoupling DOE twice. In order to reduce unwanted diffraction, the incoupling DOE can be configured to prevent the collimated light beams from the collimating mirror from propagating to the outcoupling DOE in the waveguide through total internal reflection (TIR). The incoupling DOE can also be configured to cause the collimated light beam provided by the scanning mirror to propagate to the outcoupling DOE in the waveguide through total internal reflection (TIR). Similar to the embodiments described above, the incident angles of the light beams and/or the period (or pitch) of the incoupling DOE can be selected to enable desirable diffractions and suppress undesirable diffractions. An example is illustrated in FIG. 15C.

Figure 15C:
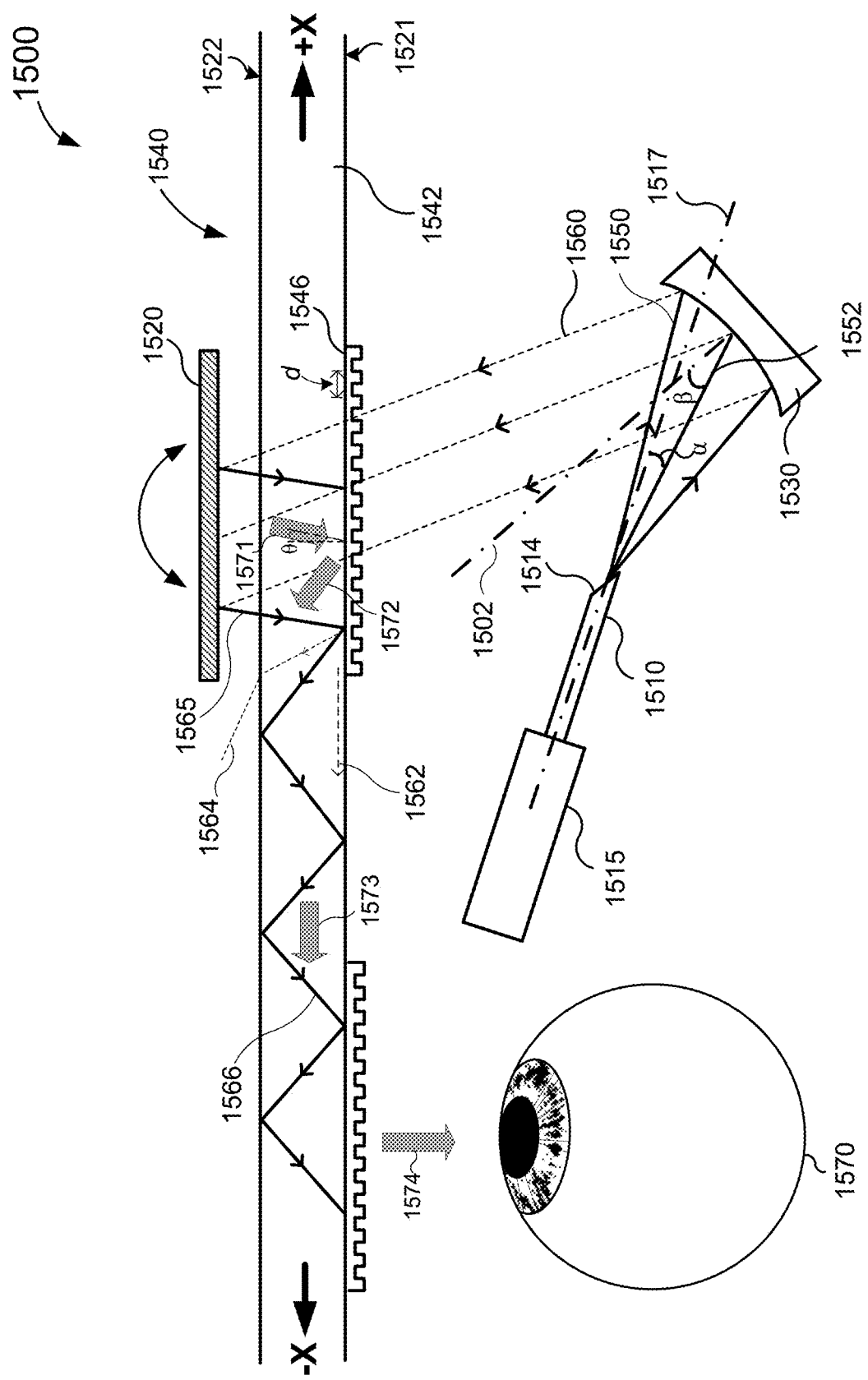
FIG. 15C is a simplified schematic diagram illustrating another waveguide display system including a projector integrated with a scanning mirror according to some embodiments of the present invention.

FIG. 15C is a simplified schematic diagram illustrating another waveguide display system including a projector integrated with a scanning mirror according to some embodiments of the present invention. As shown in FIG. 15C, a waveguide display system 1500 includes an eyepiece waveguide 1540 having a planar waveguide 1542 with a first surface 1521 and a second surface 1522. The eyepiece waveguide 1540 also has an incoupling diffractive optical element (DOE) 1546 coupled to a first lateral region of the waveguide 1542, and an outcoupling DOE 1548 coupled to a second lateral region of the waveguide 1542. A fiber scanner 1515 is disposed adjacent to the first surface 1521 of the waveguide 1542. A collimating scanning optical element, e.g., a collimating scanning mirror, 1530 is disposed adjacent to the first surface of the waveguide, on the same side as the fiber scanner. A scanning optical element, e.g., a scanning mirror, 1520 is disposed adjacent to the second surface of the waveguide. In a waveguide display system 1500, the fiber scanner 1515 is configured to be a line scanner, i.e., with one scanning axis, and scanning mirror 1520 is a scanning mirror configured to scan with one scanning axis, which can be orthogonal to the scanning axis of the fiber scanner.

The fiber scanner 1515 may include an optical fiber 1510 (or another suitable waveguide scanner). The tip of the optical fiber 1510 can have an angled facet 1514, so that the optical axis 1552 of an input light beam 1550 emitted from the tip of the optical fiber 1510 is refracted at an angle α relative to an extension 1517 of the optical fiber 1510. The collimating mirror 1530 can be a section, or a sliver, of a collimating mirror, instead of a full round mirror. The section of the collimating mirror 1530 may be configured to receive a divergent input light beam 1550 emitted from the tip of the optical fiber 1510. The optical fiber 1510 can scan along an arc in and out of the page. As illustrated, a normal 1502 of the section of the collimating mirror 1530 may be slightly tilted at an angle β with respect to the optical axis 1552, so that the reflected collimated light beam 1560 is directed upward, missing the optical fiber 1510 (instead of directed back toward the optical fiber 1510). The optical axis 1552 of the divergent input light beam 1550 is incident on the collimating mirror 1530 at an angle of incidence β. Because of the tilting angle α, the magnitude of the angle β required for having the collimated light beam 1560 clear the optical fiber 1510 may be less. As such, off-axis aberration may be reduced, as described above in connection to FIGS. 15A and 15B.

The scanning mirror 1520 is disposed adjacent the second surface 1522 of the waveguide 1542, on the opposite side of the waveguide from the fiber scanner and the collimating mirror. The scanning mirror 1520 can be configured to scan in a slow axis perpendicular to the plane of the page. The scanning mirror is configured to receive the collimated light beam 1560 through the incoupling DOE and to provide a scanned reflected light beam 1565 toward the waveguide at a second incident angle.

Similar to the embodiments described above, the diffractive coupling of the incident light beams into the waveguide can be configured to achieve desired diffractive coupling conditions. For example, the angle of incidence θ of the light beams and the grating period d of the incoupling DOE 1546 may be selected to achieve the desired diffractive coupling conditions. In some embodiments, the incoupling DOE 1546 is configured to prevent the collimated light beam 1560 from propagating to the outcoupling DOE in the waveguide through total internal reflection (TIR). The incoupling DOE 1546 is also configured to cause the collimated scanned light beam from the scanning mirror to propagate to the outcoupling DOE in the waveguide through total internal reflection (TIR). To facilitate the discussion, the direction oriented along the plane of the waveguide pointing from the incoupling DOE 1546 toward the outcoupling DOE 1548 as the "−X" direction, and the opposite direction as the "+X" direction.

For example, when divergent light beam 1560 passes through the incoupling DOE 1546, a negative first order diffraction (in a transmission geometry) by the incoupling DOE 1546 at the diffraction angle on the first pass may fail the TIR condition of the waveguide 1542 in the "−X" direction toward the outcoupling DOE 1548. In FIG. 15, the light beams that fail the TIR condition and propagate as an evanescent wave 1562 along the surface of the waveguide 1542 or are refracted out of the waveguide 1542 at each bounce in the waveguide 1542, as shown by dotted lines 1564. However, the collimated reflected light beam 1565 is incident upon the incoupling DOE 1546, a negative first order diffraction (in a transmission geometry) by the incoupling DOE 1546 may meet the TIR condition of the waveguide 1542 in the "−X" direction toward the outcoupling DOE 1548, as shown by light beam 1566. The outcoupling DOE 1548 may comprise a diffraction grating (may be referred herein as an outcoupling grating) configured to diffract a portion of light beam 1566 out of the waveguide 1542 and toward an eye 1570 of a viewer. To illustrate the light path for image projection, the light beams that are diffracted in the waveguide and emitted to reach the eye 1570 of the viewer are marked by grey arrows 1571, 1572, 1573, and 1574. To simplify the drawing, the light beams diffracted in the "+X" direction away from the outcoupling DOE 1548 are omitted in FIG. 15C. More details about the selective diffraction functions of the incoupling DOE are described above in connection with FIGS. 3, 4A, 4B, 5, 6A, and 6B.

As described above, FIG. 15C illustrates an example of a waveguide display system with a fiber scanner providing a divergent light beam integrated with a scanning mirror for providing a two-dimensional scanned light beam. A collimating mirror is then used to produce a collimated light beam to be incoupled into the waveguide for form an image. The system enables the light source and the collimating mirror to be disposed on the same side of the eyepiece waveguide, with the scanning mirror on the other side. Further, the collimating mirror is in the shape of a segment, or sliver, in order to avoid the fiber scanner to be in the light path of the reflected light beams from the collimating mirror. One advantage of this configuration is reduced size of the device. Further, this configuration can be implemented without a polarization-sensitive DOE, wave plates for altering the polarization, or a polarization dependent light source, etc. The complexity and cost of the display system can be substantially reduced.

Figure 16:
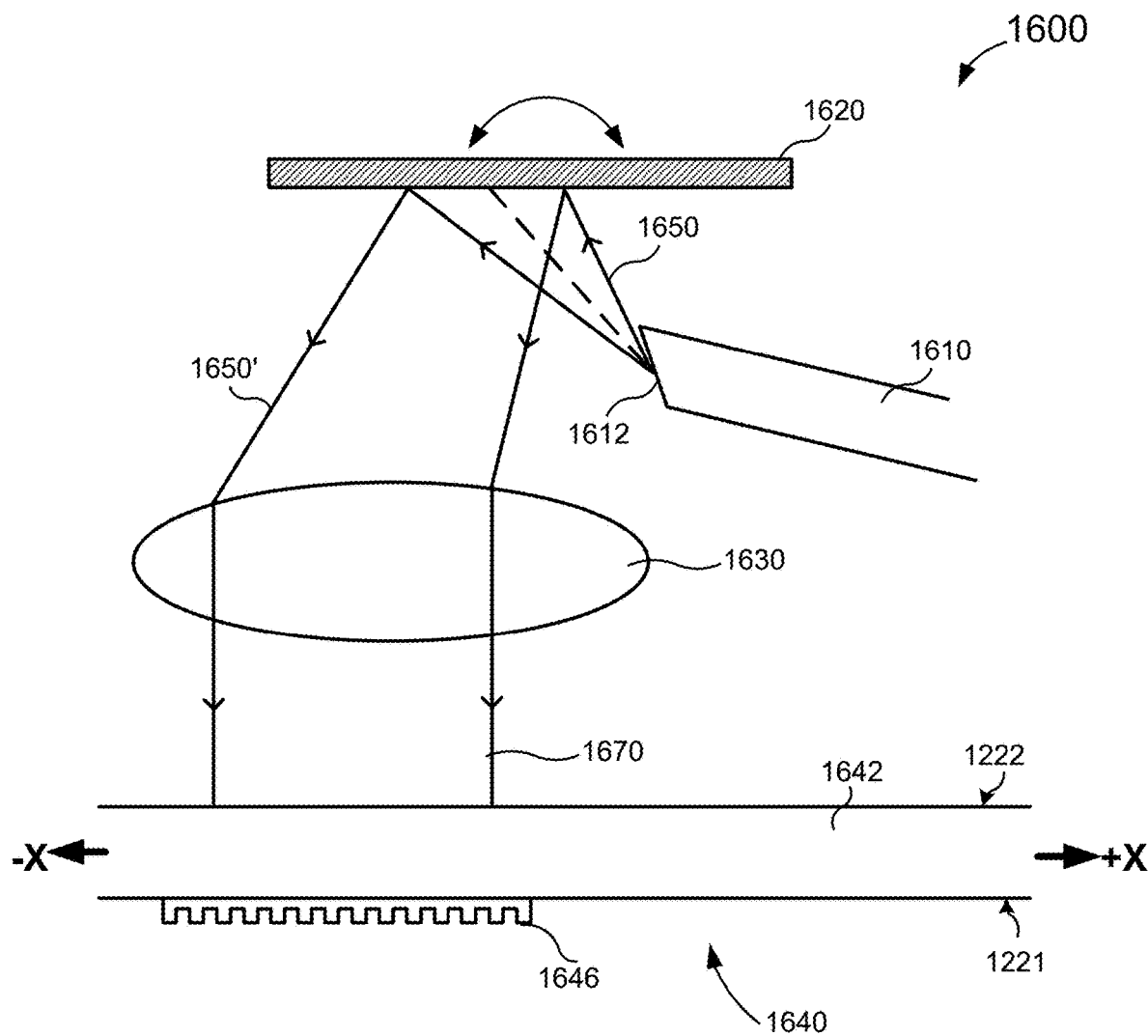
FIG. 16 is a simplified schematic diagram illustrating another waveguide display system including a projector integrated with a scanning mirror according to some embodiments of the present invention.

FIG. 16 is a simplified schematic diagram illustrating another waveguide display system including a projector integrated with a scanning mirror according to some embodiments of the present invention. The waveguide display system may include an optical fiber 1610. The tip of the optical fiber 1610 may have an angled facet 1612, such that an input light beam 1650 is refracted at the facet 1612 and is incident upward toward a MEMS mirror 1620. A MEMS scanning mirror 1620 may be configured to be scanned in the slow axis perpendicular to the plane of the page. Here, the MEMS mirror 1620 scans a diverging light beam 1650, instead of a collimated light beam. The fiber scanning projector may further include a collimating lens 1630 configured to receive the diverging light beam 1650' reflected by the MEMS mirror 1620, and to produce a collimated light beam 1670, to be incident on an eyepiece 1640. The eyepiece 1640 includes a waveguide 1642 and an incoupling DOE 1646 coupled to a first lateral region of the waveguide 1642. The collimated light beam 1670 is diffracted by the incoupling DOE 1646 in the waveguide and can propagate by total internal reflection (TIR) to reach an outcoupling DOE (not shown).

The light source illustrated in the example of FIG. 16 is an optical fiber. In other embodiments, the light source can be provided by a cantilever scanner with a waveguide, similar to the cantilever scanner described below in connection with FIGS. 18A-18D, 19-20, 21A-21C, and 22A-22B.

In some embodiments, it may be desirable to modify the system of FIG. 16 to position the collimating mirror on the other side of the waveguide to allow a more compact configuration. In some embodiments, a divergent light source and a collimating optical element can be placed on the same side of a waveguide, and a scanning mirror on the other side of the waveguide. In an embodiment, a divergent input light beam may be provided by a fiber point light source, which transmits the divergent input light beam to the scanning mirror. The scanning mirror can receive the divergent input light beam and transmits a divergent scanned light beam through incoupling DOE to the collimating optical element. The collimating optical element can reflect a collimated light beam toward the incoupling DOE of the waveguide. The configuration of the scanned divergent light beam from the scanning mirror and the collimated light beam from the collimating mirror is similar to the configuration in the system of FIG. 14. However, in the system of FIG. 14, the divergent light beam from the fiber is transmitted through the incoupling DOE of the waveguide before reaching the scanning mirror. Therefore, the light beams pass through the incoupling DOE three times. In alternative embodiments, the divergent light beam from the fiber is transmitted through the waveguide without passing through the incoupling DOE. For example, the divergent light beam from the fiber is transmitted through a region of the waveguide outside the incoupling DOE. In alternative embodiments, the fiber light source can be positioned on the same side of the scanning mirror, such that the divergent light beam from the fiber can reach the scanning mirror without going through the waveguide. In these alternative embodiments, the light beams pass through the incoupling DOE only twice. In order to reduce unwanted diffraction, the incoupling DOE can be configured to prevent the reflected light beam from the scanning mirror from propagating to the outcoupling DOE in the waveguide through total internal reflection (TIR). The incoupling DOE can also be configured to cause the collimated light beam from the collimating mirror to propagate to the outcoupling DOE in the waveguide through total internal reflection (TIR). Similar to the embodiments described above, the incident angles of the light beams and/or the period (or pitch) of the incoupling DOE can be selected to enable desirable diffractions and suppress undesirable diffractions. Two examples are illustrated in FIGS. 17A and 17B.

Figure 17A:
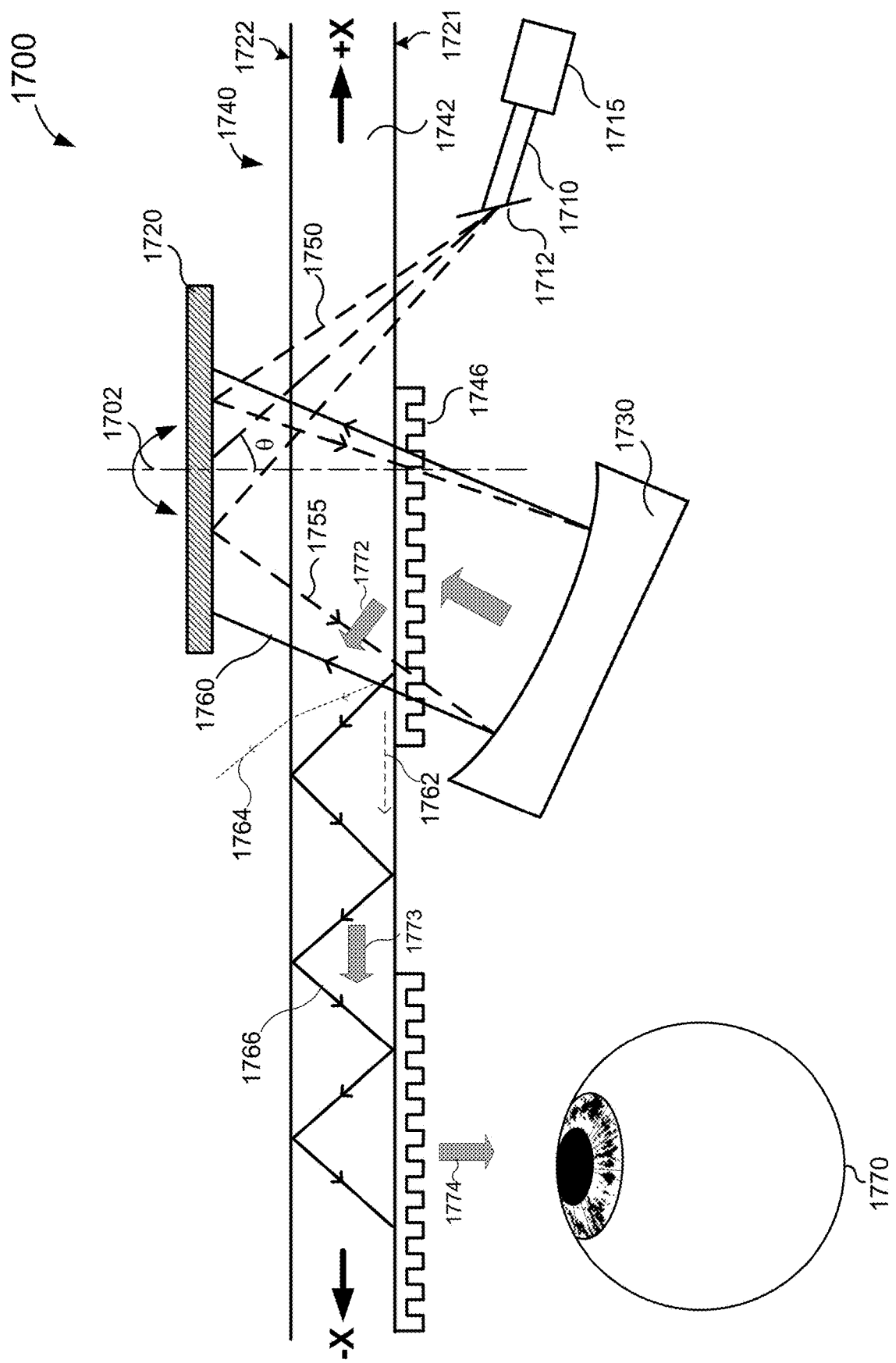
FIG. 17A is a simplified schematic diagram illustrating another waveguide display system including a projector integrated with a scanning mirror according to some embodiments of the present invention.
Figure 17B:
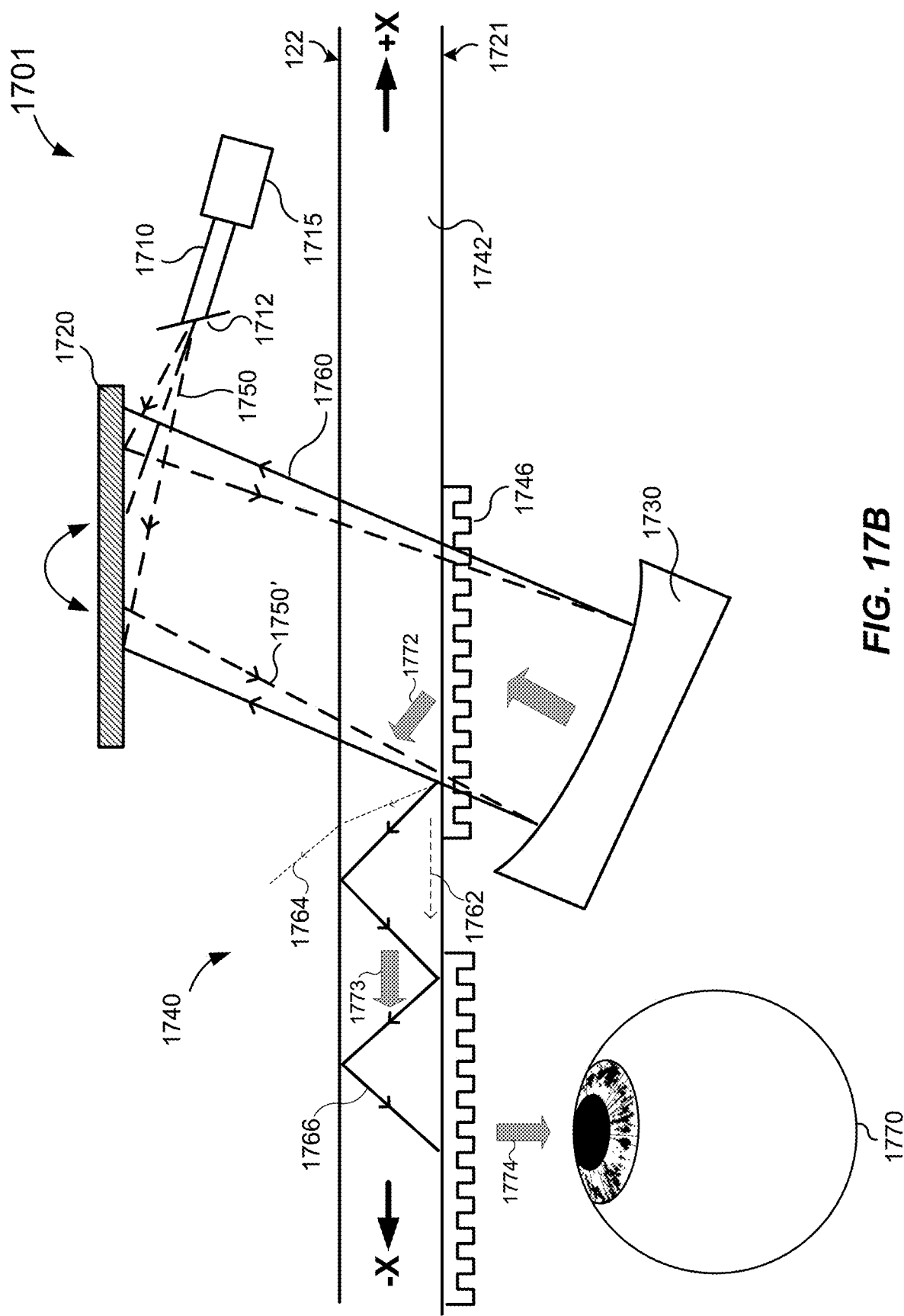
FIG. 17B is a simplified schematic diagram illustrating another waveguide display system including a projector integrated with a scanning mirror according to some embodiments of the present invention.

FIG. 17A is a simplified schematic diagram illustrating another waveguide display system including a projector integrated with a scanning mirror according to some embodiments of the present invention. As shown in FIG. 17A, a waveguide display system 1700 includes an eyepiece waveguide 1740 having a planar waveguide 1742 with a first surface 1721 and a second surface 1722. The eyepiece waveguide 1740 also has an incoupling diffractive optical element (DOE) 1746 coupled to a first lateral region of the waveguide 1742, and an outcoupling DOE 1748 coupled to a second lateral region of the waveguide 1742. A fiber point light source 1715 is disposed adjacent the first surface 1721 of the waveguide 1742. A scanning optical element, e.g., a scanning mirror, 1720 is disposed adjacent to the second surface of the waveguide. A collimating scanning optical element, e.g., a collimating scanning mirror, 1730 is disposed adjacent to the first surface of the waveguide. The configuration of the fiber light source, waveguide, scanning mirror, and collimating mirror in FIG. 17A can be similar to the configuration of corresponding components as shown in FIG. 14.

However, in a waveguide display system 1400, the fiber scanner 1415 is configured to be a line scanner, i.e., with one scanning axis, and scanning mirror 1430 is a scanning mirror configured to scan with one scanning axis, which can be orthogonal to the scanning axis of the fiber scanner.

The tip of the optical fiber 1710 has an angled facet 1712, such that an input light beam 1750 emitted from the tip of the optical fiber 1710 is refracted at the facet 1712 and incident at the MEMS scanning mirror 1720 at an angle θ.

The fiber point light source 1715 may include an optical fiber 1710 (or another suitable waveguide scanner). In some embodiments, the tip of the optical fiber 1710 has an angled facet 1712, which may be metalized, such that an input light beam 1750 emitted from the tip of the optical fiber 1710 is refracted at the facet 1712 and incident at the MEMS scanning mirror 1720 at an angle θ. As the divergent light beam exits the tip of the optical fiber 1710, the light beam may diverge as a cone of light rays (e.g., bounded by the marginal rays 1750 as illustrated in FIG. 17A).

The scanning mirror 1720 is disposed adjacent the second surface 1722 of the waveguide 1742. The scanning mirror is configured to receive the divergent input light beam 1750 from the fiber point light source and to provide a reflected light beam 1755 toward the waveguide at a second incident angle.

The collimating mirror 1730, disposed adjacent to the first surface 1721 of the waveguide 1742, is configured to receive the divergent reflected light beam 1755 from the scanning mirror 1720 through the incoupling DOE 1746 of waveguide 1742 and to provide a collimated reflected light beam 1760 toward the incoupling DOE 1746 of the waveguide at a third incident angle.

As shown in FIG. 17A, the divergent input light beam 1750, the scanned reflected divergent light beam 1755, and collimated light beam 1760 are incident on the eyepiece 1740 off axis, e.g., at an angle with respect to a normal of the waveguide 1742. In the embodiment of FIG. 17A, the fiber point light source 1715 is configured to provide a divergent input light beam to a portion of the waveguide outside the incoupling DOE at a first incident angle θ. The diffractive coupling of the incident light beam into the waveguide 1742 can be configured to achieve desired diffractive coupling conditions. For example, the angle of incidence θ and the grating period d of the incoupling DOE 1746 may be selected to achieve desired diffractive coupling conditions for the scanned reflected divergent light beam 1755, and collimated light beam 1760. In some embodiments, the incoupling DOE 1746 is configured to prevent the reflected divergent light beam 1755 from the collimated light source from propagating to the outcoupling DOE 1748 in the waveguide through total internal reflection (TIR), and cause the collimated light beam 1760 to propagate to the outcoupling DOE 1748 through total internal reflection (TIR) in the waveguide. Similar to the descriptions in connection to FIG. 14, the direction oriented along the plane of the waveguide pointing from the incoupling DOE 1746 toward the outcoupling DOE 1748 as the "−X" direction, and the opposite direction as the "+X" direction.

For example, when the reflected divergent light beam 1755 passes through the incoupling DOE 1746, a negative first order diffraction (in a transmission geometry) by the incoupling DOE 1746 at the diffraction angle on the first pass may fail the TIR condition of the waveguide 1742 in the "−X" direction toward the outcoupling DOE 1748. In FIG. 17A, the light beams that fail the TIR condition and propagate as an evanescent wave 1762 along the surface of the waveguide 1742 or are refracted out of the waveguide 1742 at each bounce in the waveguide 1742, as shown by dotted lines 1764. However, the collimated reflected light beam 1760 is incident upon the incoupling DOE 1746, a negative first order diffraction (in a transmission geometry) by the incoupling DOE 1746 may meet the TIR condition of the waveguide 1742 in the "−X" direction toward the outcoupling DOE 1748, as shown by light beam 1766. The outcoupling DOE 1748 may comprise a diffraction grating (may be referred herein as an outcoupling grating) configured to diffract a portion of light beam 1766 out of the waveguide 1742 and toward an eye 1770 of a viewer. To illustrate the light path for image projection, the light beams that are diffracted in the waveguide and emitted to reach the eye 1770 of the viewer are marked by grey arrows 1771, 1772, 1773, and 1774. To simplify the drawings, the light beams diffracted in the "+X" direction away from the outcoupling DOE 1748 are omitted in FIG. 17A. More details about the selective diffraction functions of the incoupling DOE are described above in connection with FIGS. 3, 4A, 4B, 5, 6A, 6B, and 14.

As described above, FIG. 17A illustrates an example of a waveguide display system with a fiber point light source providing a divergent light beam integrated with a scanning mirror for providing a two-dimensional scanned light beam. A collimating mirror is then used to produce a collimated light beam to be incoupled into the waveguide for form an image. The light source illustrated in the example of FIG. 17A is a fiber point light source. In other embodiments, the light source can be provided by a cantilever scanner with a waveguide, similar to the cantilever scanner described below in connection with FIGS. 18A-18D, 19-20, 21A-21C, and 22A-22B. The system enables the light source and the scanning mirror to be disposed on opposite sides of the eyepiece waveguide, and a collimating mirror can be disposed on the same side as the light source. One advantage of this configuration is reduced size of the device. Further, this configuration can be implemented without a polarization-sensitive DOE, wave plates for altering the polarization, or a polarization dependent light source, etc. The complexity and cost of the display system can be substantially reduced.

FIG. 17B is a simplified schematic diagram illustrating another waveguide display system including a projector integrated with a scanning mirror according to some embodiments of the present invention. As shown in FIG. 17B, waveguide display system 1701 includes an eyepiece waveguide 1740 having a planar waveguide 1742 with a first surface 1721 and a second surface 1722. The eyepiece waveguide 1740 also has an incoupling diffractive optical element (DOE) 1746 coupled to a first lateral region of the waveguide 1742, and an outcoupling DOE 1748 coupled to a second lateral region of the waveguide 1742. A fiber point light source 1715 is disposed adjacent to the first surface 1721 of the waveguide 1742. A scanning optical element, e.g., a scanning mirror, 1720 is disposed adjacent to the second surface of the waveguide. A collimating scanning optical element, e.g., a collimating scanning mirror, 1730 is disposed adjacent to the first surface of the waveguide.

FIG. 17B, illustrates a waveguide display system 1701 that is similar to waveguide display system 1700 of FIG. 17A. One difference is that, in FIG. 17B, the fiber point light source 1715 is disposed on the same side as the scanning mirror 1720. Therefore, the divergent input light beam 1750 from the fiber point light source 1715 to the scanning mirror 1720 does not pass through the waveguide 1742. The operation of waveguide display system 1701 in FIG. 17B is otherwise similar to the operation of waveguide display system 1700 in FIG. 17A. Therefore, the detailed description is not repeated here. To illustrate the light path for image projection, the light beams that are diffracted in the waveguide and emitted to reach the eye 1770 of the viewer are marked by grey arrows 1771, 1772, 1773, and 1774. To simplify the drawings, the light beams diffracted in the "+X" direction away from the outcoupling DOE 1748 are omitted in FIG. 17B.

As described above, FIG. 17B illustrates an example of a waveguide display system with a fiber point light source providing a divergent light beam integrated with a scanning mirror for providing a two-dimensional scanned light beam. A collimating mirror is then used to produce a collimated light beam to be incoupled into the waveguide to form an image. The light source illustrated in the example of FIG. 17B is a fiber point light source. In alternative embodiments, the point light source can be provided by a cantilever point light source, such as a cantilever scanner with a waveguide, similar to the cantilever scanner described below in connection with FIGS. 18A-18D, 19-20, 21A-21C, and 22A-22B. The system enables the light source and the scanning mirror to be disposed on the same side of the eyepiece waveguide, and a collimating mirror can be disposed on the opposite side of the waveguide. One advantage of this configuration is reduced size of the device. Further, this configuration can be implemented without a polarization-sensitive DOE, wave plates for altering the polarization, or a polarization dependent light source, etc. The complexity and cost of the display system can be substantially reduced.

In the various embodiments of waveguide display systems description above, light sources including fiber scanners are used. In alternative embodiments, light sources incorporating MEMS cantilever scanners can be used. Some examples are described below.

Figure 18A:
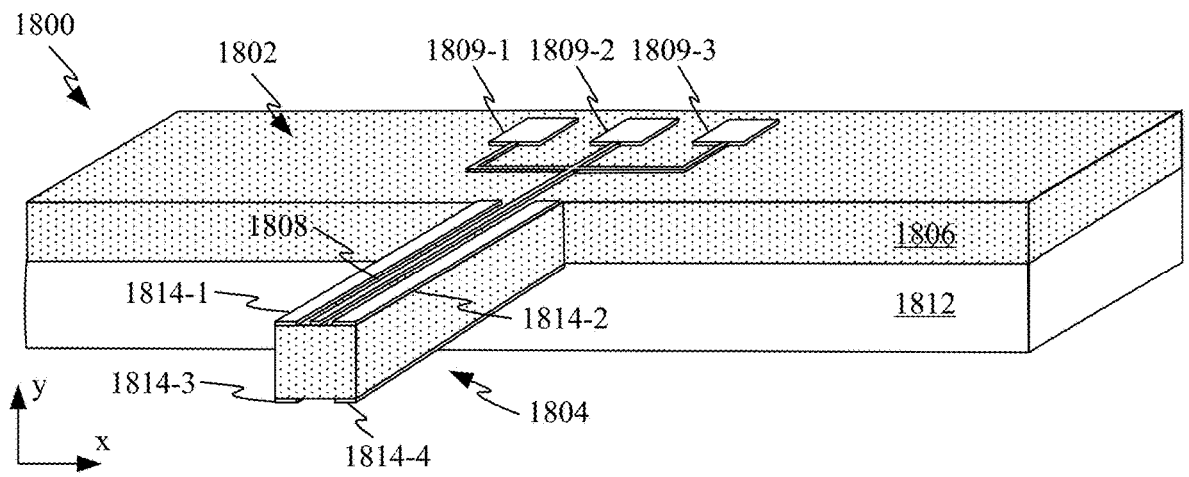
FIGS. 18A-18C are simplified perspective views illustrating various examples of a cantilevered MEMS scanner according to some embodiments of the present invention.
Figure 18B:
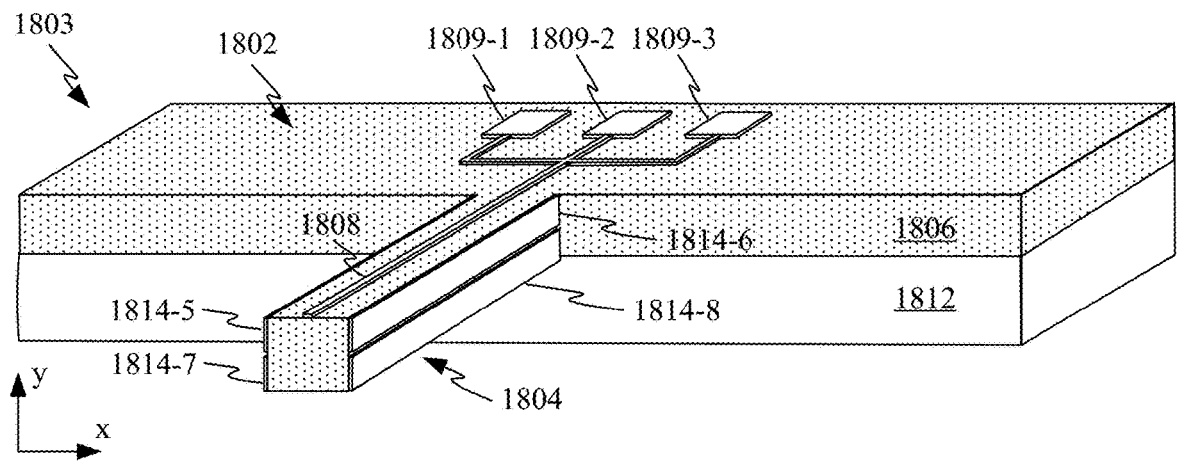
Figure 18C:
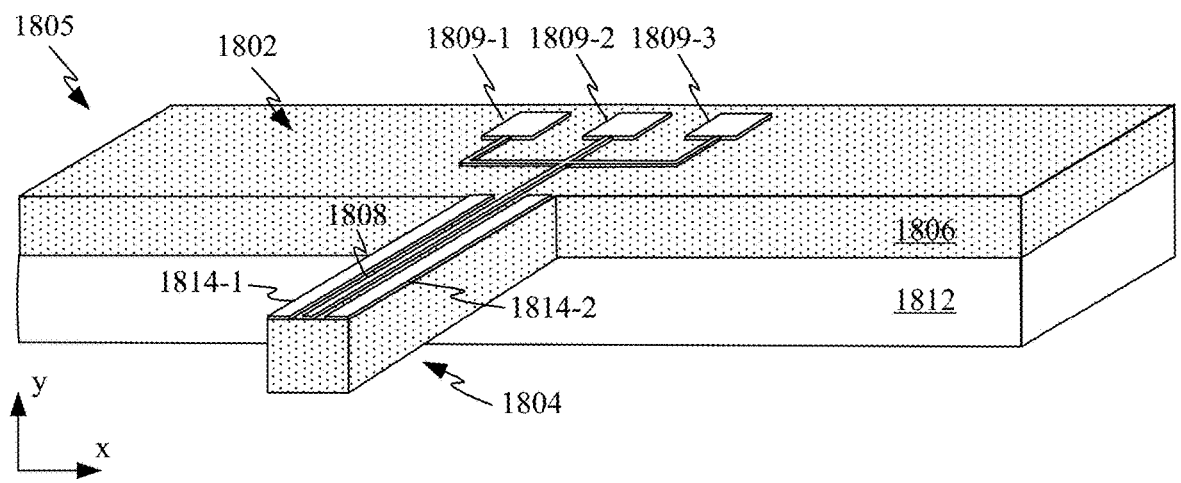

FIGS. 18A-18C are simplified perspective views illustrating various examples of a cantilevered MEMS scanner according to some embodiments of the present invention. As illustrated in FIGS. 18A-18C, discrete piezoelectric film actuators are used to induce movement of a cantilevered beam in a MEMS scanner 1800. In some embodiments, MEMS scanner 1800 can be formed using a silicon on insulator (SOI) wafer construction that includes a base region 1802 and cantilevered beam 1804. FIG. 18A shows how a portion of base region 1802 and cantilevered beam 1804 can be formed from a layer of material such as monocrystalline silicon layer 1806. In some embodiments, the monocrystalline silicon layer 1806 forming a portion of base region 1802 and cantilevered beam 1804 can be about 100 µm thick, thereby allowing for deflection of cantilevered beam 1804 during operation of MEMS scanner 1800. A waveguide 1808 can be formed along an upper surface of base region 1802 and cantilevered beam 1804. In some embodiments, light can be received by waveguide 1808 from laser diodes 1809-1, 1809-2 and 1809-3, which are secured to a surface of monocrystalline silicon layer 1806. In some embodiments, laser diode 1809-1 can be a red laser diode, laser diode 1809-2 can be a blue laser diode, and laser diode 1809-3 can be a green laser diode. In some embodiments, additional laser diodes could be added to allow for a larger variety of colors to be produced and propagated through waveguide 1808 by mixing light generated by two or more of laser diodes 1809. Base region 1802 can be affixed to a support structure to secure MEMS scanner 1800 in place and to align a distal end of cantilevered beam with additional optics for propagating the light released from the distal end of waveguide 1808.

Base region 1802 can also include a layer of silicon 1812 that is coupled to monocrystalline silicon layer 1806. In some embodiments, monocrystalline silicon layer 1806 can be bonded to silicon layer 1812 by a compression bonding operation resulting in the two layers being bonded by a silicon oxide layer. Silicon layer 1812 can be configured to provide structural support to base region 1802 and can be about 200 µm in thickness or twice as thick as monocrystalline silicon layer 1806, which can have a thickness of about 100 µm. In some embodiments, silicon layer 1812 can provide a mounting surface to which one or more actuation structures can be affixed.

FIG. 18A also depicts a scanning mechanism that includes four piezoelectric film actuators 1814 configured to cooperatively maneuver cantilevered beam 1804 in a desired scan pattern. Each of actuators 1814-1 and 1814-4 can be actuated in the same or different directions to impart different forces upon cantilevered beam 1804. Since piezoelectric film actuators 1814-1 and 1814-2 lie substantially in the same plane, an input that causes both of piezoelectric actuators 1814-1 and 1814-2 to expand longitudinally would induce movement of cantilevered beam 1804 downward, in the −y direction, whereas an input causing piezoelectric film actuators 1814-1 and 1814-2 to contract longitudinally would induce movement of cantilevered beam 1804 upward in the +y direction. Concurrent actuation of all four of piezoelectric film actuators 1814 could increase the amount of force being exerted upon cantilevered beam 1804. For example, sending a contraction signal to piezoelectric film actuators 1814-1 and 1814-2 and an expansion signal to piezoelectric film actuators 1814-3 and 1814-4 would induce movement of cantilevered beam 1804 upward, in the +y direction. Sending an expansion signal to piezoelectric film actuators 1814-1 and 1814-3 and a contraction signal to piezoelectric film actuators 1814-2 and 1814-4 would induce lateral movement of cantilevered beam 1804 in the +x direction while reversing those signals would induce movement of cantilevered beam 1804 laterally in the −x direction.

FIG. 18B shows an alternative configuration for MEMS scanner 1803 in which piezoelectric film actuators 1814-5, 1814-6, 1814-7 and 1814-8 are arranged on lateral surfaces of cantilevered beam 1804. This configuration has the benefit of placing piezoelectric film actuators 1814-5-1814-8 on a different surface from waveguide 1808, thereby allowing for piezoelectric actuators 1814 to occupy a larger area of cantilevered beam 1804. Contraction and expansion inputs can be adjusted to achieve movement of cantilevered beam 1804 in the +x, −x, +y and −y directions. For example, by sending a contraction signal to piezoelectric actuators 1814-5 and 1814-6 and an expansion signal to piezoelectric film actuators 1814-7 and 1814-8 movement of cantilevered beam in the +y direction can be achieved. By applying differential signals to piezoelectric actuators 1814, a circular scan pattern of cantilevered beam 1804 can be established. Vertical and horizontal patterns are also possible where a line scan pattern is desired.

FIG. 18C shows another alternative configuration of MEMS scanner 1805 in which piezoelectric film actuators 1814-1 and 1814-2 are positioned on an upward facing surface of cantilevered beam 1804. Piezoelectric film actuators 1814-1 and 1814-2 can maneuver cantilevered beam 1804 in +x, −x, −y and +y directions and consequently are able to drive cantilevered beam 1804 in single axis or circular scan patterns as discussed above. For example, supplying a contraction signal/input to piezoelectric film actuator 1814-1 and an expansion signal/input to piezoelectric film actuator 1814-2 moves cantilevered beam 1804 laterally in the +x direction.

Piezoelectric actuators 1814 can be controlled in accordance with the control methods described below in conjunction with FIG. 18D In some embodiments, strain gauge(s) positioned on or adjacent to cantilevered beam 1804 can be configured to track movement of cantilevered beam 1804 and can provide feedback for the previously described control methods.

Figure 18D:
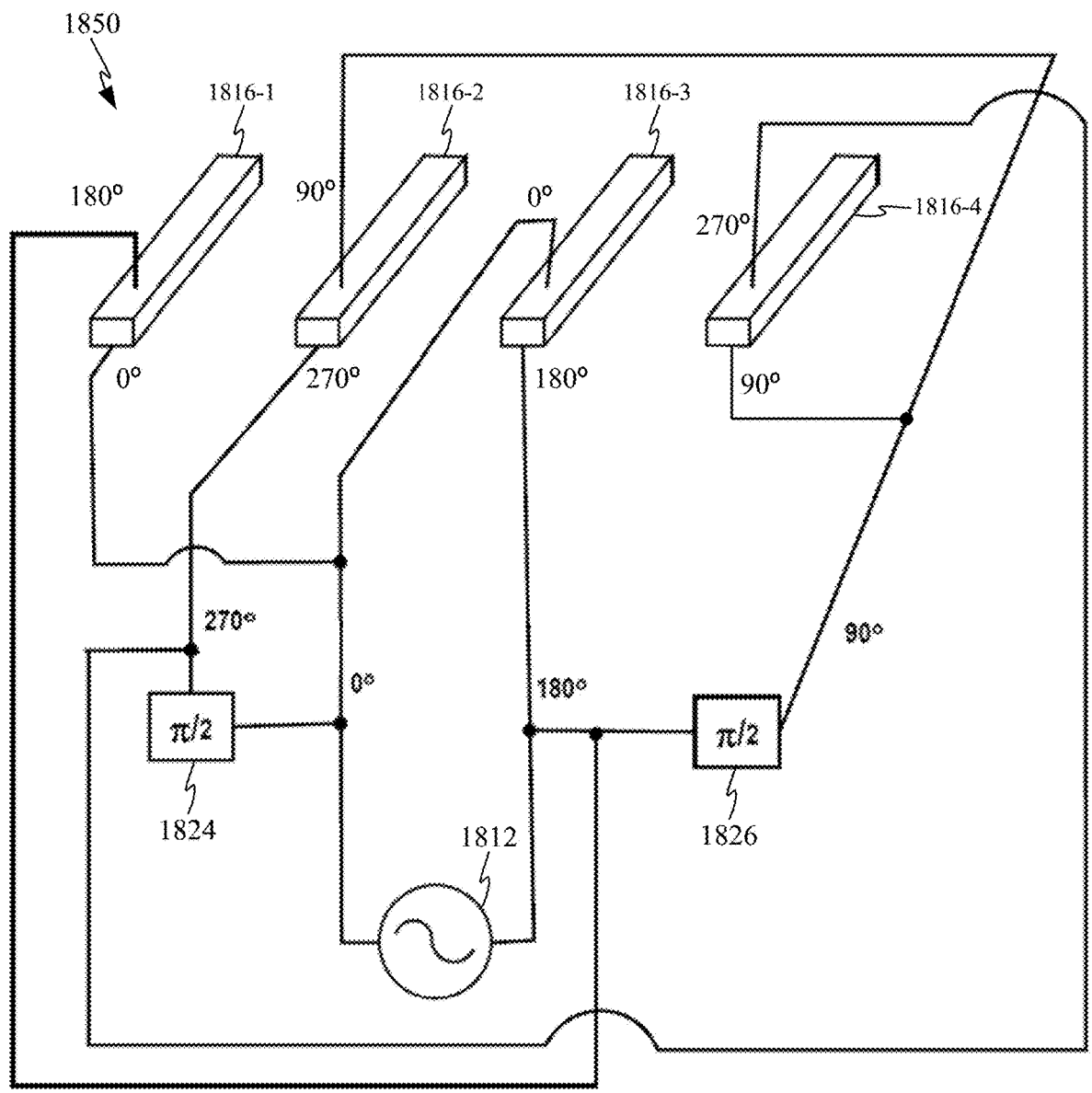
FIG. 18D is an electric schematic diagram illustrating a four-phase signal splitter network for driving piezoelectric actuators according to some embodiments of the present invention.

FIG. 18D is an electric schematic diagram illustrating a four-phase signal splitter network 1850 for driving piezoelectric actuators 1826 according to an embodiment of the present invention. For purposes of clarity, piezoelectric actuators are illustrated separately from the rest of the piezoelectric scanner. In some embodiments, four phases are applied to piezoelectric actuators 1826 arranged on opposing sides of a scanning assembly. Signal generator 1812 provides outputs that are connected to electrically conductive pathways, which are, in turn, connected to corresponding actuation inputs. Signal generator 1812 is also connected to a first 90° phase shifter 1824 and a second 90° phase shifter 1826, which are connected to piezoelectric actuators 1816-1 and 1816-4. Thus, signal generator 1812, in concert with the phase shifters 1824 and 1826, provides four phases that are 90° out of phase with respect to each other.

For the purposes of discussion of FIG. 18D, it can be considered that all of the piezoelectric actuators 1826 are poled in the same vertical direction. The four piezoelectric actuators 1826 can be considered to be grouped in two pairs. A first pair is taken to include a first piezoelectric actuator 1816-1 and a third piezoelectric actuator 1816-3, while a second pair is taken to include a second piezoelectric actuator 1816-2 and a fourth piezoelectric actuator 1816-4. The four-phase splitter network 1850 is configured such that within each of the aforementioned pairs of actuators, the electric field directions established by network 1850 within piezoelectric actuators with each pair are oppositely directed. Accordingly, when one member of each pair is induced by the applied field acting through the agency of the piezoelectric effect to contract, the other member of the pair will be induced to expand. The two pairs, i.e., the first pair of piezoelectric actuators 1816-1 and 1816-3 and the second pair of piezoelectric actuators 1816-2 and 1816-4, can be said to drive two perpendicular axes (denoted X'-axis and Y'-axis) of the scanner. For the purposes of discussion, one can imagine the X'-axis rotated about the rest axis of the a scanner from the plane.

Although as shown in FIG. 18D, a single signal generator 1812 is supplying a signal to all four piezoelectric actuators 1826, as will be discussed below, alternatively, circuitry may be provided to provide separate phase and amplitude controlled signals to the first (X'-axis) pair of piezoelectric actuators, 1816-1 and 1816-3, and second (Y'-axis) pair of piezoelectric actuators, 1816-2 and 1816-4. Further, network

1850 and signal generator 1812 can be adopted to drive a scanner with only two piezoelectric actuators 1826. Further details of cantilever scanners and piezoelectric actuators are described in PCT Application No. PCT/US2019/039088, filed Jun. 25, 2019, the contents of which is hereby incorporated by reference in its entirety.

In some embodiments, a divergent light source and a collimating optical element can be placed on opposite sides of a waveguide. For example, the incoming light beam may be a divergent light beam provided by a cantilever scanner, such as those described above in connections with FIGS. 18A-18D, and the collimating scanning mirror can be a scanning mirror having a reflected optical element with positive optical power, e.g., a scanning concave mirror. The incident angles of the light beams and/or the period (or pitch) of the incoupling DOE can be selected to prevent an incoming light beam from propagating to the output grating in the waveguide through total internal reflection (TIR). The incident angles of the light beams and/or the period or pitch of the gratings can also be configured to cause the collimated scanned reflected light beam to propagate in the waveguide through total internal reflection (TIR) to the outcoupling DOE to form an image that can be viewed by a user. An example is illustrated in FIG. 19.

Figure 19:
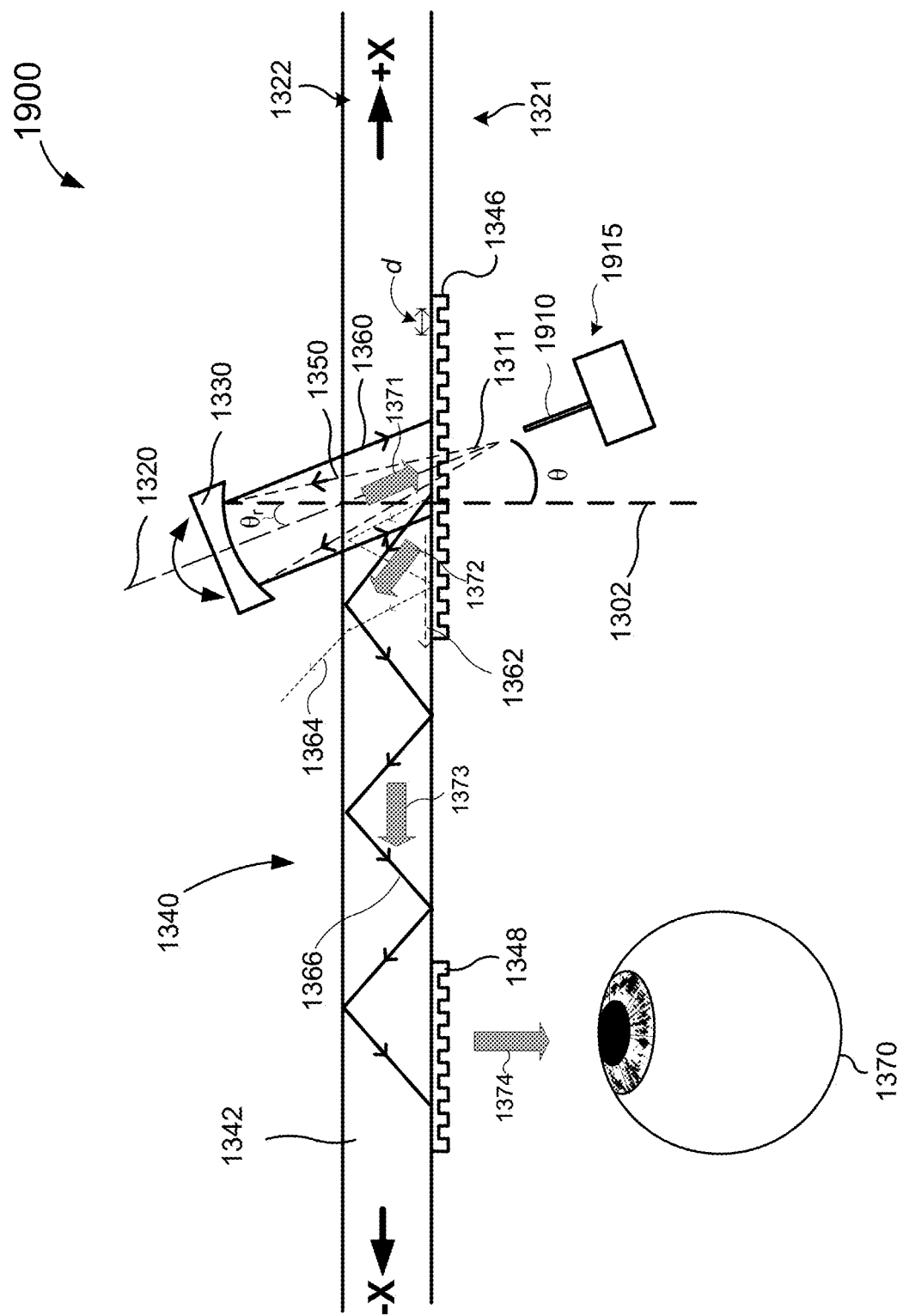
FIG. 19 is a simplified schematic diagram illustrating another waveguide display system including a projector integrated with a scanning mirror according to some embodiments of the present invention.

FIG. 19 is a simplified schematic diagram illustrating another waveguide display system including a projector integrated with a scanning mirror according to some embodiments of the present invention. As shown in FIG. 19, waveguide display system 1900 is similar to waveguide display system 1300 illustrated in FIG. 13. A difference between these waveguide display systems is that waveguide display system 1300 illustrated in FIG. 13 has a fiber scanner 1315, whereas waveguide display system 1900 illustrated in FIG. 19 has a cantilever scanner 1915. Therefore, similar components in the waveguide display systems are designated with the same reference numerals and the discussion provided in relation to FIG. 13 is applicable to FIG. 19 as appropriate.

As shown in FIG. 19, waveguide display system 1900 includes an eyepiece waveguide 1340 having a planar waveguide 1342 with a first surface 1321 and a second surface 1322. The eyepiece waveguide 1340 also has an incoupling diffractive optical element (DOE) 1346 coupled to or integrally formed with a first lateral region of the waveguide 1342, and an outcoupling DOE 1348 coupled to or integrally formed with a second lateral region of the waveguide 1342. A cantilever scanner 1915 is disposed adjacent the first surface 1321 of the waveguide 1342. A collimating scanning optical element, e.g., a collimating scanning mirror, 1330 is disposed adjacent the second surface of the waveguide. The configuration of the fiber scanner, waveguide, and collimating mirror in FIG. 13 can be similar to the configuration of corresponding components as shown in FIG. 3. However, in a waveguide display system 1900, the cantilever scanner 1915 is configured to be a line scanner, i.e., with one scanning axis, and collimating mirror 1330 is a scanning mirror configured to scan with one scanning axis, which can be orthogonal to the scanning axis of the fiber scanner.

The cantilever scanner 1915 may include a cantilevered optical member 1910, which may include a cantilever beam and a waveguide coupled to a light source, similar to those described above in connection with FIGS. 18A-18C. The cantilever scanner 1915 is configured to scan a divergent input light beam 1311 toward the incoupling DOE 1346 of waveguide 1342 at a first incident angle $\theta$. The cantilevered optical member 1910 may be deflected such that the trajectory of its tip defines a one-dimensional convex object surface. As the light beam exits the tip of the cantilevered optical member 1910, the light beam may diverge as a cone of light rays (e.g., bounded by the marginal rays 1350 as illustrated in FIG. 19) with a subtended angle determined by the numerical aperture of the cantilevered optical member 1910. An optical axis 1320 may be defined as a line that passes through the cantilevered optical member 1910 when the cantilevered optical member 1910 is not deflected.

The collimating scanning mirror 1330, disposed adjacent the second surface 1322 of the waveguide 1342, is configured to receive the divergent input light beam 1311 from the cantilever scanner 1915 through the waveguide 1342 and to provide a collimated reflected light beam 1360 toward the incoupling DOE 1346 of the waveguide at a second incident angle $\theta_r$.

As shown in FIG. 19, the input light beam 1311 is incident on the eyepiece 1340 off axis, e.g., at an angle $\theta$ with respect to a normal 1302 of the waveguide 1342. The diffractive coupling of the incident light into the waveguide 1342 can be configured to achieve desired diffractive coupling conditions. For example, the angle of incidence $\theta$ and the grating period d of the incoupling DOE 1346 may be selected to achieve desired diffractive coupling conditions, as described above in connection with FIG. 3. In some embodiments, the incoupling DOE 1346 is configured to prevent the collimated reflected light beam 1360 from the collimating scanning mirror 1330 from propagating to the outcoupling DOE 1348 in the waveguide through total internal reflection (TIR), and cause the collimated reflected light beam 1360 to propagate to the outcoupling DOE 1348 through total internal reflection (TIR) in the waveguide. To facilitate the discussion, the direction oriented along the plane of the waveguide pointing from the incoupling DOE 1346 toward the outcoupling DOE 1348 as the "–X" direction, and the opposite direction as the "+X" direction.

For example, when input light beam 1311 passes through the incoupling DOE 1346, a negative first order diffraction (in a reflection geometry) by the incoupling DOE 1346 at the diffraction angle on the first pass may fail the TIR condition of the waveguide 1342 in the "–X" direction toward the outcoupling DOE 1348. In FIG. 19, the light beams that fail the TIR condition can propagate as an evanescent wave 1362 along the surface of the waveguide 1342 or are refracted out of the waveguide 1342 at each bounce in the waveguide 1342, as shown by dotted lines 1364. However, after the input light beam 1311 has been reflected by the collimating scanning mirror 1330, and the scanned reflected light beam 1360 is incident upon the incoupling DOE 1346, a negative first order diffraction (in a transmission geometry) by the incoupling DOE 1346 may meet the TIR condition of the waveguide 1342 in the "–X" direction toward the outcoupling DOE 1348, as shown by light beam 1366. The outcoupling DOE 1348 may comprise a diffraction grating (may be referred herein as an outcoupling grating) configured to diffract a portion of light propagating in the waveguide 1366 out of the waveguide 1342 and toward an eye 1350 of a viewer. To illustrate the light path for image projection, the light beams that are diffracted in the waveguide and emitted to reach the eye 1370 of the viewer are marked by grey arrows 1371, 1372, 1373, and 1374. To simplify the drawings, the light beams in the "+X" direction away from the outcoupling DOE 1348 are omitted in FIG. 19. More details about the selective diffraction functions of the incoupling DOE are described above in connection with FIGS. 3, 4A, and 4B.

FIG. 19 illustrates an example of a waveguide display system with a cantilever scanner providing a divergent light beam integrated with a collimating scanning mirror for providing a collimated light beam. The system enables the light source and the scanning mirror to be disposed on opposite sides of the eyepiece waveguide. One advantage of this configuration is reduced size of the device. Further, this configuration can be implemented without a polarization-sensitive DOE, waveplates for altering the polarization, or a polarization dependent light source, etc. The complexity and cost of the display system can be substantially reduced.

Figure 20:
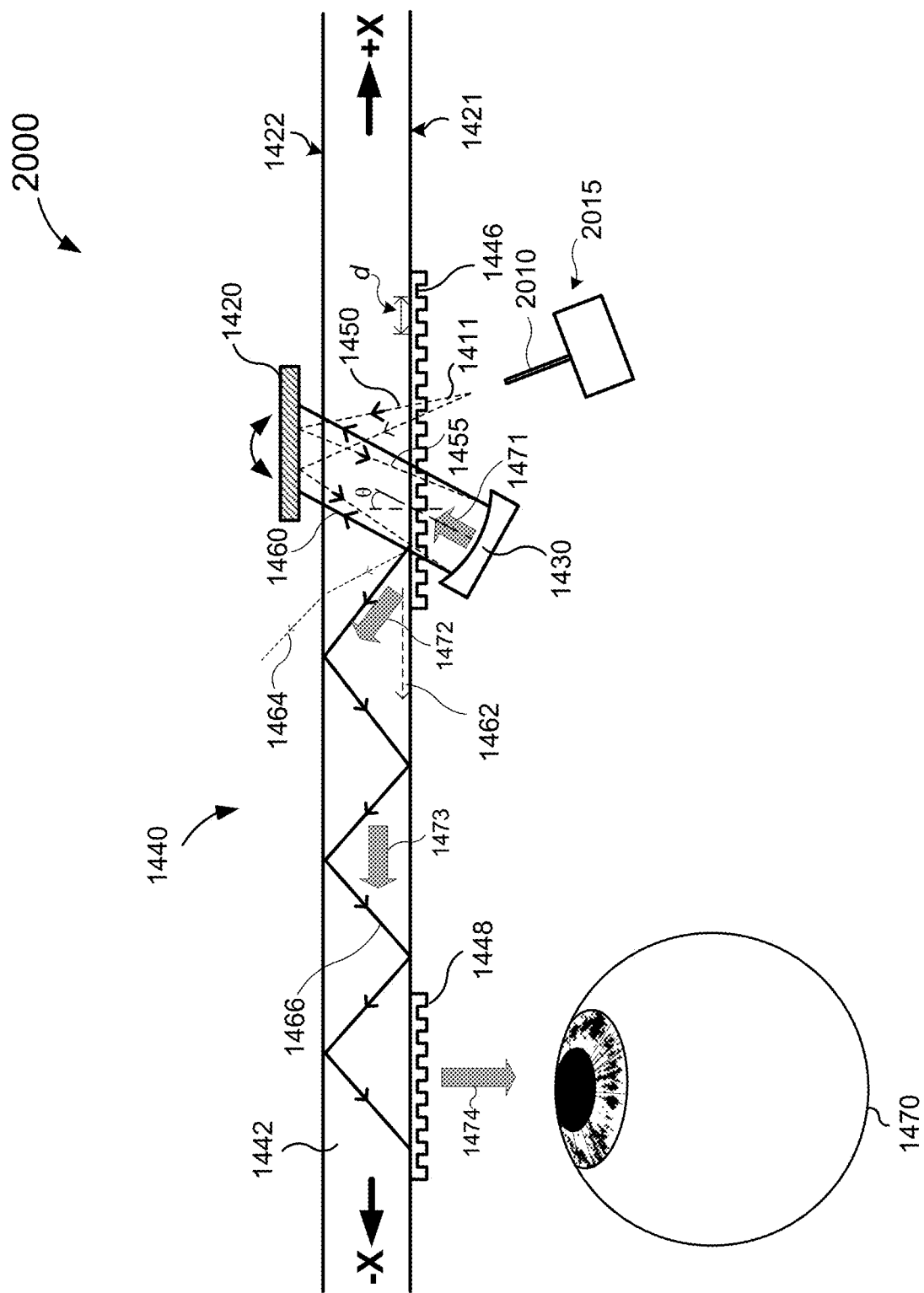
FIG. 20 is a simplified schematic diagram illustrating another waveguide display system including a projector integrated with a scanning mirror according to some embodiments of the present invention.

In some embodiments, a divergent light source and a collimating optical element can be placed on the same side of a waveguide, and a scanning mirror on the other side of the waveguide. For example, a divergent input light beam may be provided by a cantilever scanner, which transmits the divergent input light beam through an incoupling DOE to a scanning mirror. The scanning mirror can receive the divergent input light beam and transmit a divergent reflected light beam through incoupling DOE to the collimating optical element. The collimating optical element can reflect a collimated light beam toward the incoupling DOE of the waveguide. In this case, the light beams pass through the incoupling DOE three times. In order to reduce unwanted diffraction, the incoupling DOE can be configured to prevent the divergent input light beam from the fiber scanner and the reflected light beam from the scanning mirror from propagating to the outcoupling DOE in the waveguide through total internal reflection (TIR). The incoupling DOE can also be configured to cause the collimated light beam to propagate to the outcoupling DOE in the waveguide through total internal reflection (TIR). Similar to the embodiments described above, the incident angles of the light beams and/or the period (or pitch) of the incoupling DOE can be selected to enable desirable diffractions and suppress undesirable diffractions. An example is illustrated in FIG. 20. Thus, in some embodiments, a cantilever mirror scanning in one dimension is used to generate a line and a second scanning mirror (e.g., a MEMS mirror scanning in one dimension in the orthogonal direction is used to convert the line into a plane. In some implementations, the order of mirrors can be switched, such that the collimating mirror is utilized before the second scanning mirror (e.g., the MEMS mirror), but this is not required by the present invention.

FIG. 20 is a simplified schematic diagram illustrating another waveguide display system including a projector integrated with a scanning mirror according to some embodiments of the present invention. As shown in FIG. 20, waveguide display system 2000 is similar to waveguide display system 1400 illustrated in FIG. 14. A difference is that waveguide display system 1400 illustrated in FIG. 14 has a fiber scanner 1415, whereas waveguide display system 2000 illustrated in FIG. 20 has a cantilever scanner 2015. Therefore, similar components in the waveguide display systems are designated with the same reference numerals and the discussion provided in relation to FIG. 14 is applicable to FIG. 20 as appropriate.

As shown in FIG. 20, a waveguide display system 2000 includes an eyepiece waveguide 1440 having a planar waveguide 1442 with a first surface 1421 and a second surface 1422. The eyepiece waveguide 1440 also has an incoupling diffractive optical element (DOE) 1446 coupled to a first lateral region of the waveguide 1442, and an outcoupling DOE 1448 coupled to a second lateral region of the waveguide 1442. A cantilever scanner 2015 is disposed adjacent to the first surface 1421 of the waveguide 1442. A scanning optical element, e.g., a scanning mirror, 1420 is disposed adjacent to the second surface of the waveguide. A collimating scanning optical element, e.g., a collimating scanning mirror, 1430 is disposed adjacent the first surface of the waveguide. The configuration of the cantilever scanner, waveguide, scanning mirror, and collimating mirror in FIG. 20 can be similar to the configuration of corresponding components as shown in FIG. 19. In waveguide display system 2000, the cantilever scanner 2015 is configured to be a line scanner, i.e., with one scanning axis, and scanning mirror 1430 is a scanning mirror configured to scan with one scanning axis, which can be orthogonal to the scanning axis of the fiber scanner.

The cantilever scanner 2015 may include a cantilevered optical member 2010, which may include a cantilever beam and a waveguide coupled to a light source, similar to those described above in connection with FIGS. 18A-18C. The cantilever scanner 2015 is configured to scan a divergent input light beam 1411 toward the incoupling DOE 1446 of waveguide 1442 at a first incident angle θ. The cantilevered optical member 2010 is configured to be scanned linearly (i.e., line scanning) such that its tip moves along an arc in and out of the page, similar to the cantilevered optical member 1910 illustrated in FIG. 19. The cantilevered optical member 2010 may be deflected such that the trajectory of its tip defines a one-dimensional convex object surface. As the light beam exits the tip of the cantilevered optical member 2010, the light beam may diverge as a cone of light rays (e.g., bounded by the marginal rays 1450 as illustrated in FIG. 20) with a subtended angle determined by the numerical aperture of the cantilevered optical member 2010. Similar to optical axis 1320 in FIG. 19, an optical axis may be defined in FIG. 20 as a line that passes through the cantilevered optical member 2010 when the cantilevered optical member 2010 is not deflected.

The scanning mirror 1420 is disposed adjacent to the second surface 1422 of the waveguide 1442. The scanning mirror 1420 can be configured to scan in a slow axis perpendicular to the plane of the page. The scanning mirror is configured to receive the divergent input light beam 1411 and to provide a reflected light beam 1455 toward the waveguide at a second incident angle. The reflected light beam 1455 can span a range of incident angles with the dotted lines marking the marginal rays.

The collimating mirror 1430, disposed adjacent to the first surface 1421 of the waveguide 1442, is configured to receive the divergent reflected light beam 1455 from the scanning mirror 1420 through the incoupling DOE 1446 of waveguide 1442 and to provide a collimated reflected light beam 1460 toward the incoupling DOE 1446 of the waveguide at a third incident angle.

As shown in FIG. 20, the divergent input light beam 1450, the scanned reflected divergent light beam 1455, and collimated light beam 1460 are incident on the eyepiece 1440 off axis, e.g., at an angle with respect to a normal of the waveguide 1442. The diffractive coupling of the incident light beam into the waveguide 1442 can be configured to achieve desired diffractive coupling conditions. For example, the angle of incidence θ and the grating period d of the incoupling DOE 1446 may be selected to achieve desired diffractive coupling conditions, as described above in connection with FIG. 3. In some embodiments, the incoupling DOE 1446 is configured to prevent the divergent input light beam 1450 and the reflected divergent light beam 1455 from the collimated light source from propagating to the outcoupling DOE 1448 in the waveguide through total internal reflection (TIR), and cause the collimated light beam 1460 to propagate to the outcoupling DOE 1448 through total internal reflection (TIR) in the waveguide. To facilitate the discussion, the direction oriented along the plane of the waveguide pointing from the incoupling DOE 1446 toward the outcoupling DOE 1448 as the "−X" direction, and the opposite direction as the "+X" direction.

For example, when divergent input light beam 1450 passes through the incoupling DOE 1446, a negative first order diffraction (in a transmission geometry) by the incoupling DOE 1446 at the diffraction angle on the first pass may fail the TIR condition of the waveguide 1442 in the "−X" direction toward the outcoupling DOE 1448. In FIG. 20, the light beams that fail the TIR condition can propagate as an evanescent wave 1462 along the surface of the waveguide 1442 or are refracted out of the waveguide 1442 at each bounce in the waveguide 1442, as shown by dotted lines 1464. Similarly, the reflected divergent light beam 1455 is also configured to fail the TIR condition of the waveguide 1442 in the "−X" direction toward the outcoupling DOE 1448. However, after the input light beam 1411 has been reflected by the collimating mirror 1430, and the collimated reflected light beam 1460 (also marked by gray arrow 1471) is incident upon the incoupling DOE 1446, a negative first order diffraction (in a transmission geometry) by the incoupling DOE 1446 may meet the TIR condition of the waveguide 1442 in the "−X" direction toward the outcoupling DOE 1448, as shown by light beam 1466. The outcoupling DOE 1448 may comprise a diffraction grating (may be referred herein as an outcoupling grating) configured to diffract a portion of light beam 1466 out of the waveguide 1442 and toward an eye 1470 of a viewer. To illustrate the light path for image projection, the light beams that are diffracted in the waveguide and emitted to reach the eye 1470 of the viewer are marked by grey arrows 1471, 1472, 1473, and 1474. To simplify the drawings, the light beams diffracted in the "+X" direction away from the outcoupling DOE 1448 are omitted in FIG. 20. More details about the selective diffraction functions of the incoupling DOE are described above in connection with FIGS. 3, 4A, 4B, 5, 6A, and 6B.

As described above, FIG. 20 illustrates an example of a waveguide display system with a cantilever scanner providing a divergent light beam integrated with a scanning mirror for providing a two-dimensional scanned light beam. A collimating mirror is then used to produce a collimated light beam to be incoupled into the waveguide to form an image. The system enables the light source and the scanning mirror to be disposed on opposite sides of the eyepiece waveguide. A collimating mirror can be disposed on the same side as the light source. One advantage of this configuration is reduced size of the device. Further, this configuration can be implemented without a polarization-sensitive DOE, wave plates for altering the polarization, or a polarization dependent light source, etc. The complexity and cost of the display system can be substantially reduced.

Figure 21A:
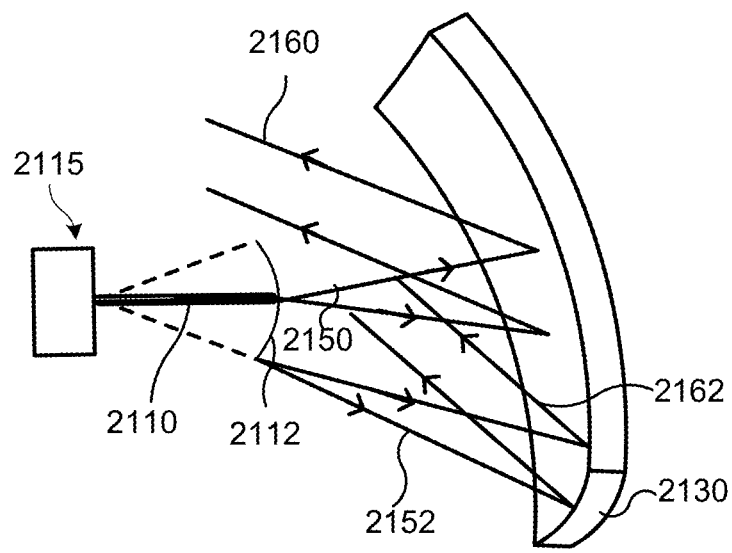
FIG. 21A is a perspective view illustrating a cantilever scanning projector according to some embodiments of the present invention.

FIG. 21A is a perspective view illustrating a cantilever scanning projector according to some embodiments of the present invention. The cantilever scanning projector includes a cantilever scanner 2115 with a cantilevered optical member 2110 configured to be scanned linearly (i.e., line scanning) along an arc 2112 in the plane of the page. The cantilever scanning projector further includes a section of a collimating mirror 2130, instead of a full round mirror. The section of the collimating mirror 2130 may be configured to receive a divergent input light beam 2150 or 2152 emitted from the tip of the cantilevered optical member 2110, and produce a collimated light beam 2160 or 2162.

Figure 21B:
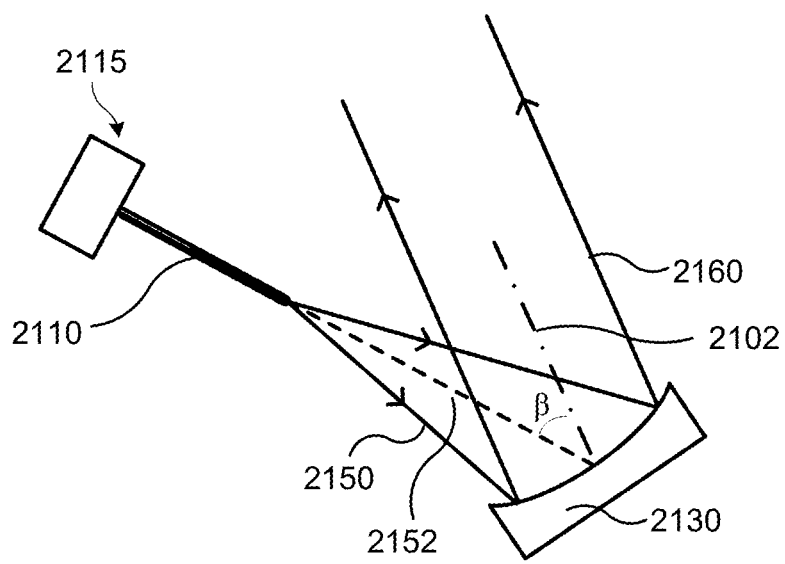
FIG. 21B illustrates schematically a side view of the cantilever scanning projector illustrated in FIG. 21A.

FIG. 21B illustrates schematically a side view of the cantilever scanning projector illustrated in FIG. 21A. The cantilevered optical member 2110 is configured to scan along an arc in and out of the plane of the figure (i.e., in and out of the page). As illustrated, a normal 2102 of the section of the collimating mirror 2130 may be slightly tilted at an angle β with respect to the optical axis 2152 of the cantilevered optical member 2110, so that the reflected collimated light beam 2160 is directed upward, avoiding the cantilevered optical member 2110 (instead of directed back toward the cantilevered optical member 2110). The tilting angle β may be relatively small, so that only a small amount of off-axis aberration may be introduced.

In some embodiments, a divergent light source and a collimating optical element can be placed on the same side of a waveguide, and a scanning mirror on the other side of the waveguide, similar to the system illustrated in FIG. 20. However, in an alternative embodiment, a divergent input light beam may be provided by a cantilever scanner, which transmits the divergent input light beam directly to a collimating optical element, which can transmit the collimated light beam through an incoupling DOE to a scanning mirror on the other side of the waveguide. In this case, the light beams passes through the incoupling DOE twice. In order to reduce unwanted diffraction, the incoupling DOE can be configured to prevent the collimated light beams from the collimating mirror from propagating to the outcoupling DOE in the waveguide through total internal reflection (TIR). The incoupling DOE can also be configured to cause the collimated light beam provided by the scanning mirror to propagate to the outcoupling DOE in the waveguide through total internal reflection (TIR). Similar to the embodiments described above, the incident angles of the light beams and/or the period (or pitch) of the incoupling DOE can be selected to enable desirable diffractions and suppress undesirable diffractions. An example is illustrated in FIG. 21C.

Figure 21C:
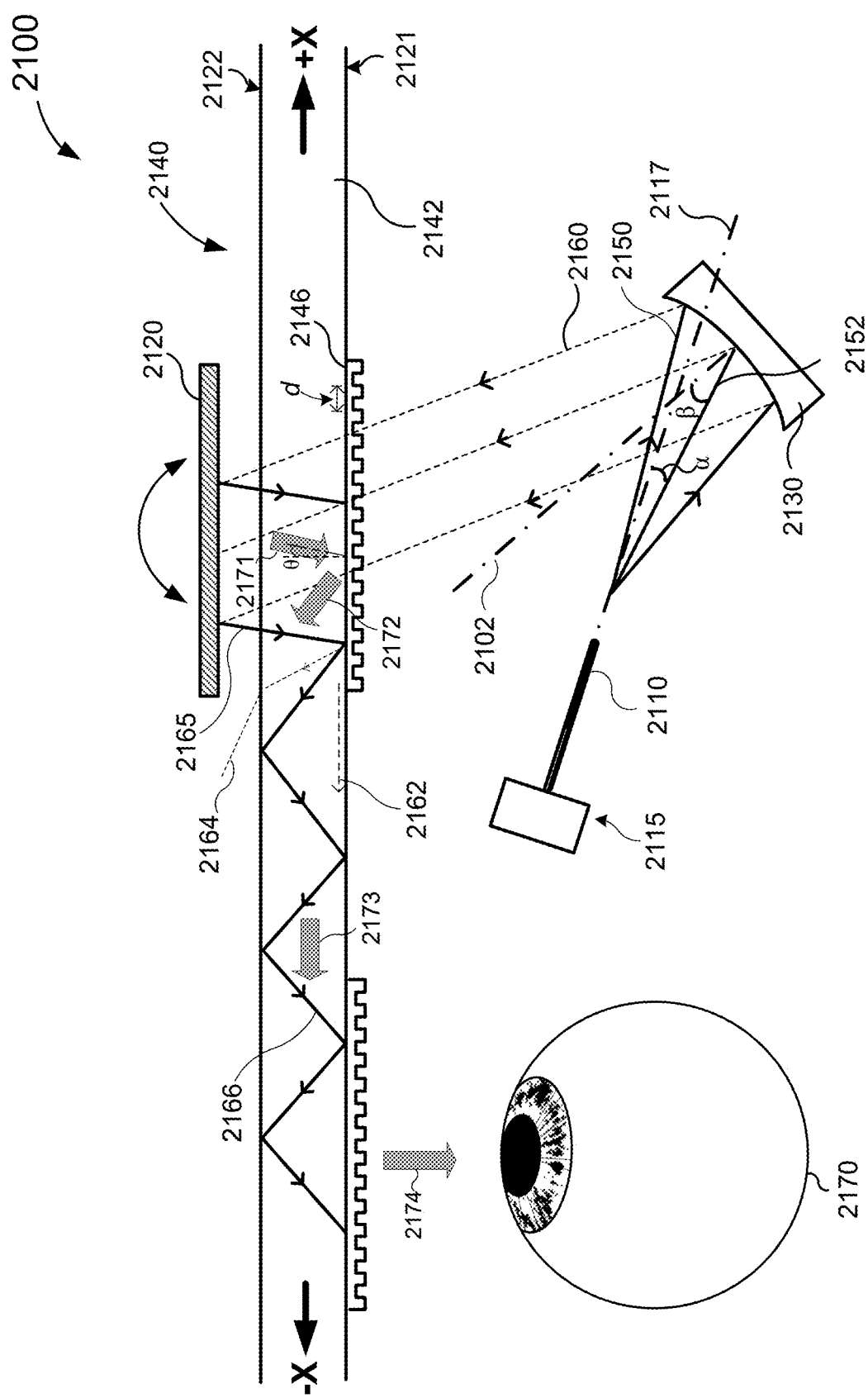
FIG. 21C is a simplified schematic diagram illustrating another waveguide display system including a cantilever projector integrated with a scanning mirror according to some embodiments of the present invention.

FIG. 21C is a simplified schematic diagram illustrating another waveguide display system including a projector integrated with a scanning mirror according to some embodiments of the present invention. As shown in FIG. 21C, a waveguide display system 2100 includes an eyepiece waveguide 2140 having a planar waveguide 2142 with a first surface 2121 and a second surface 2122. The eyepiece waveguide 2140 also has an incoupling diffractive optical element (DOE) 2146 coupled to or otherwise formed with a first lateral region of the waveguide 2142, and an outcoupling DOE 2148 coupled to or otherwise formed with a second lateral region of the waveguide 2142. While DOE 2146 and DOE 2148 are shown on the first surface 2121, in other embodiments, one or more of the DOE 2146 and DOE 2148 can be configured to operate in reflection mode and can be disposed on the second surface 2122. A cantilever scanner 2115 is disposed adjacent to the first surface 2121 of the waveguide 2142. A collimating scanning optical element, e.g., a collimating scanning mirror, 2130 is disposed adjacent to the first surface of the waveguide, on the same side as the cantilever scanner. A scanning optical element, e.g., a scanning mirror, 2120 is disposed adjacent to the second surface of the waveguide. In a waveguide display system 2100, the cantilever scanner 2115 is configured to be a line scanner, i.e., with one scanning axis, and scanning mirror 2120 is a scanning mirror configured to scan with one scanning axis, which can be orthogonal to the scanning axis of the cantilever scanner.

The cantilever scanner 2115 may include a cantilevered optical member 2110 (or another suitable waveguide scanner). The tip of the cantilevered optical member 2110, which can include a waveguide, can be configured so that the optical axis 2152 of an input light beam 2150 emitted from the tip of the cantilevered optical member 2110 is refracted at an angle α relative to an extension 2117 of the cantilevered optical member 2110. For example, the end of the waveguide can be cut at an angle such that the tip surface is not orthogonal to an axis of the waveguide, or a waveguide with a tip surface that is orthogonal to the axis of the waveguide is mounted such that the tip is angled relative to a long axis of the cantilever scanner. The collimating mirror 2130 can be a section, or a sliver, of a collimating mirror, instead of a full round mirror. The section of the collimating mirror 2130 may be configured to receive a divergent input light beam 2150 emitted from the tip of the cantilevered optical member 2110. The cantilevered optical member 2110 can scan along an arc in and out of the page. As illustrated, a normal 2102 of the section of the collimating mirror 2130 may be slightly tilted at an angle β with respect to the optical axis 2152, so that the reflected collimated light beam 2160 is directed upward, missing the cantilevered optical member 2110 (instead of directed back toward the cantilevered optical member 2110). The optical axis 2152 of the divergent input light beam 2150 is incident on the collimating mirror 2130 at an angle of incidence β. Because of the tilting angle α, the magnitude of the angle β required for having the collimated light beam 2160 clear the cantilevered optical member 2110 may be less. As such, off-axis aberration may be reduced, as described above in connection to FIGS. 21A and 21B.

The scanning mirror 2120 is disposed adjacent the second surface 2122 of the waveguide 2142, on the opposite side of the waveguide from the cantilever scanner and the collimating mirror. The scanning mirror 2120 can be configured to scan in a slow axis perpendicular to the plane of the page. The scanning mirror is configured to receive the collimated light beam 2160 through the incoupling DOE and to provide a scanned reflected light beam 2165 toward the waveguide at a second incident angle.

Similar to the embodiments described above, the diffractive coupling of the incident light beams into the waveguide can be configured to achieve desired diffractive coupling conditions. For example, the angle of incidence θ of the light beams and the grating period d of the incoupling DOE 2146 may be selected to achieve the desired diffractive coupling conditions, as described above in connection with FIG. 3. In some embodiments, the incoupling DOE 2146 is configured to prevent the collimated light beam 2160 from propagating to the outcoupling DOE in the waveguide through total internal reflection (TIR). The incoupling DOE 2146 is also configured to cause the collimated scanned light beam from the scanning mirror to propagate to the outcoupling DOE in the waveguide through total internal reflection (TIR). To facilitate the discussion, the direction oriented along the plane of the waveguide pointing from the incoupling DOE 2146 toward the outcoupling DOE 2148 as the "−X" direction, and the opposite direction as the "+X" direction.

For example, when collimated light beam 2160 passes through the incoupling DOE 2146, a negative first order diffraction (in a transmission geometry) by the incoupling DOE 2146 at the diffraction angle on the first pass may fail the TIR condition of the waveguide 2142 in the "−X" direction toward the outcoupling DOE 2148. In FIG. 21C, the light beams that fail the TIR condition can propagate as an evanescent wave 2162 along the surface of the waveguide 2142 or are refracted out of the waveguide 2142 at each bounce in the waveguide 2142, as shown by dotted lines 2164. However, the collimated reflected light beam 2165 is incident upon the incoupling DOE 2146, a negative first order diffraction (in a transmission geometry) by the incoupling DOE 2146 may meet the TIR condition of the waveguide 2142 in the "−X" direction toward the outcoupling DOE 2148, as shown by light beam 2166. The outcoupling DOE 2148 may comprise a diffraction grating (may be referred herein as an outcoupling grating) configured to diffract a portion of light beam 2166 out of the waveguide 2142 and toward an eye 2170 of a viewer. To illustrate the light path for image projection, the light beams that are diffracted in the waveguide and emitted to reach the eye 2170 of the viewer are marked by grey arrows 2171, 2172, 2173, and 2174. To simplify the drawing, the light beams diffracted in the "+X" direction away from the outcoupling DOE 2148 are omitted in FIG. 21C. More details about the selective diffraction functions of the incoupling DOE are described above in connection with FIGS. 3, 4A, 4B, 5, 6A, and 6B.

As described above, FIG. 21C illustrates an example of a waveguide display system with a cantilever scanner providing a divergent light beam integrated with a scanning mirror for providing a two-dimensional scanned light beam. A collimating mirror is then used to produce a collimated light beam to be incoupled into the waveguide for form an image. The system enables the light source and the collimating mirror to be disposed on the same side of the eyepiece waveguide, with the scanning mirror on the other side. Further, the collimating mirror is in the shape of a segment, or sliver, in order to avoid the cantilever scanner to be in the light path of the reflected light beams from the collimating mirror. One advantage of this configuration is a reduced size of the device. Further, this configuration can be implemented without a polarization-sensitive DOE, wave plates for altering the polarization, or a polarization dependent light source, etc. The complexity and cost of the display system can be substantially reduced.

Figure 22A:
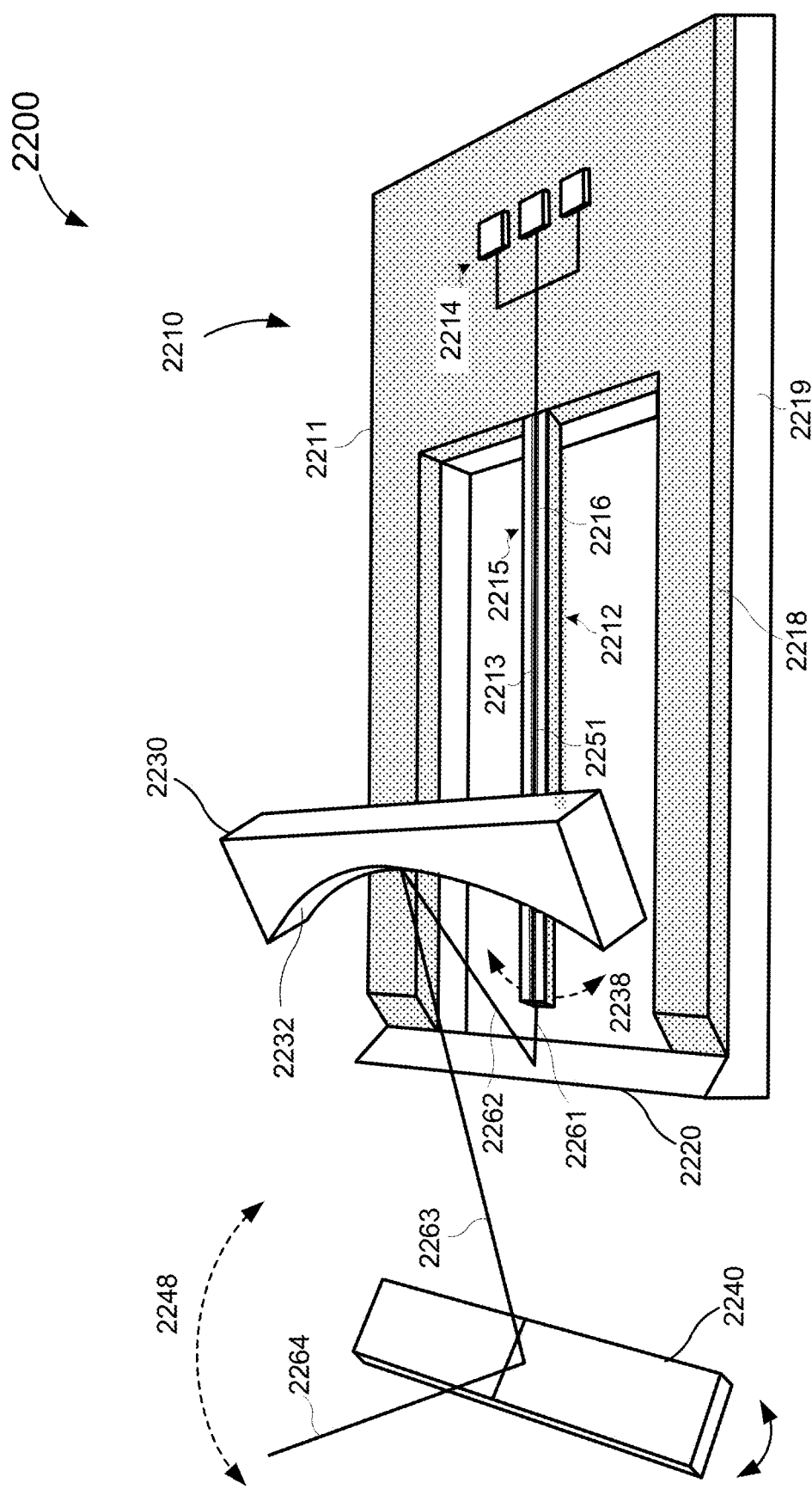
FIG. 22A is a perspective view diagram illustrating a two-dimensional scanning light source according to some embodiments of the present invention.
Figure 22B:
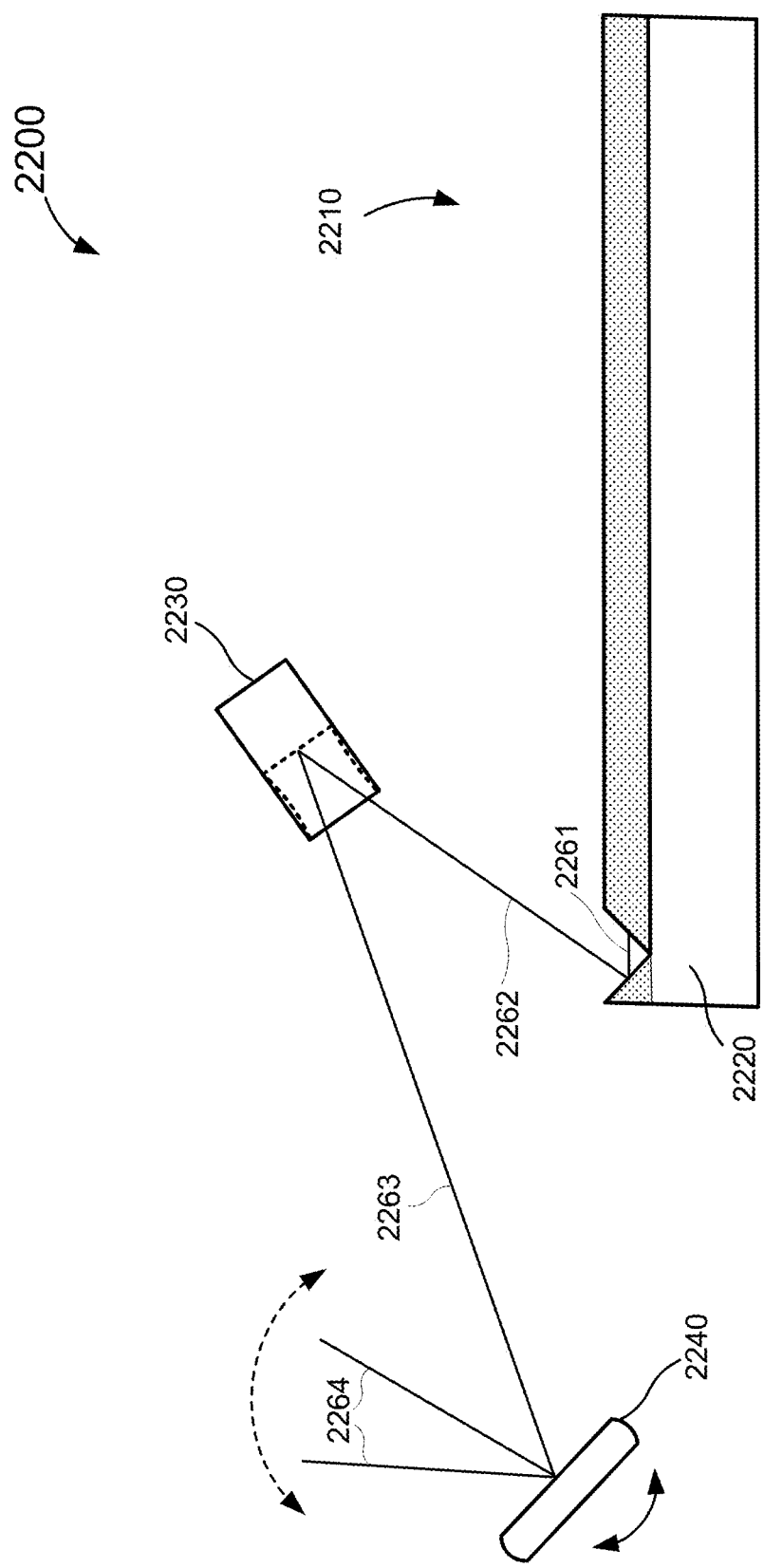
FIG. 22B is a side view diagram illustrating the two-dimensional scanning light source of FIG. 22A.

FIG. 22A is a perspective view diagram illustrating a two-dimensional scanning light source according to some embodiments of the present invention, and FIG. 22B is a side view diagram illustrating the two-dimensional scanning light source of FIG. 22A. As shown, two-dimensional scanning light source 2200 includes a cantilever scanner 2210 configured to provide a scanning light beam 2261, a reflective optical element 2220 disposed adjacent to the cantilever scanner 2210 and configured to receive the scanning light beam 2261 and to provide a reflected scanning light beam 2262. Two-dimensional scanning light source 2200 also includes a collimating optical element 2230 disposed adjacent to the reflective optical element 2220 and configured to receive the reflected scanning light beam 2262 from the reflective optical element 2220 and to provide a collimated scanning light beam 2263. Two-dimensional scanning light source 2200 further includes a scanning optical element 2240 disposed adjacent to the collimating optical element 2230 and configured to receive the collimated scanning light beam 2263 and to provide a collimated two-dimensional scanning light beam 2264.

In FIGS. 22A and 22B, the cantilever scanner 2210 includes a base portion 2211 and a cantilevered optical member 2212 protruding from the base portion 2211. The base portion 2211 and cantilevered optical member 2212 can be similar to corresponding components in example cantilever scanners 1800 described above in connection with FIGS. 18A-18C. The cantilevered optical member 2212 can include a waveguide 2213 for coupling to a light source 2214. Light source 2214 can be laser diodes, similar to laser diodes 1809 described above in connection with FIGS. 18A-18C. The cantilever scanner 2210 also includes a scanning mechanism provided by a transducer assembly 2215 having one or more piezoelectric actuators 2216 coupled to the cantilevered optical member 2212 and configured to induce motion of the cantilevered optical member 2212 in a first plane 2217 (shown by sweeping arrows) to provide the scanning light beam 2261 that travels back and forth along the width of reflective optical element 2220. The piezoelectric actuators 2216 can be similar to the piezoelectric film actuators 1814 described above in connection with FIG. 18.

The base portion 2211 of the cantilever scanner 2210 includes a layer of material such as monocrystalline silicon layer 2218. The base portion 2211 can also include another silicon layer 2219 that is coupled to monocrystalline silicon layer 2218 to provide mechanical support. The cantilevered optical member 2212 includes a cantilevered beam integrally formed with and protruding from the monocrystalline silicon layer 2218. Each of the one or more piezoelectric actuators 2216 is oriented in a direction substantially parallel to a longitudinal axis 2251 of the cantilevered optical member 2212.

The collimating optical element 2230 includes a mirror 2232 with positive optical power. For example, the collimating optical element 2230 can be a concave mirror. In some embodiments, the collimating optical element 2230 is configured to compensate for the difference in light path in the scanning light emitted the cantilevered optical member 2212. The scanning optical element 2240 is a one-axis scanning mirror that scans in a second scan plane 2248 (shown by sweeping arrows) that is orthogonal to the first scan plane 2238 of the cantilever scanner.

As shown in FIGS. 22A and 22B, the cantilever scanner 2210 is configured to be a one-dimensional scanner, i.e., with one scanning axis. The scanning optical element 2240 is a scanning optical element 2240 scanning mirror configured to scan with one scanning axis, which can be orthogonal to the scanning axis of the cantilever scanner 2210. In some embodiments, the scanning optical element 2240 can be a MEMS scanning mirror. In alternative embodiments, the scanning optical element 2240 can be a square or triangle shaped structure that constantly rotates at the same speed and in the same direction, generating a plane image from the 1D cantilever line scan. The advantage of this approach is twofold—as the rotating object is going a constant speed, there is no brightening at the end of each slow pass as the mirror comes to a stop and reverses direction. Further, this would scan the line always in the same direction (it would get to the bottom of the image and then jump back to the top for the next image), so that the time between refreshes of each pixel is the same.

In some embodiments, the cantilever scanner 2210, the reflective optical element 2220, the collimating optical element 2230, and the scanning optical element 2240 can be made separately and then assembled into a light source device. In alternative embodiments, the cantilever scanner 2210, the reflective optical element 2220, the collimating optical element 2230, and the scanning optical element 2240 are integrated in a single semiconductor MEMS device, such as a silicon MEMS device, to form an integrated two-dimensional scanning light source. In these embodiments, the scanning cantilever and the scanning mirror are located on the same side of the device, and in plane with one another, such that they could be fabricated in the same piece of silicon, with cost and complexity savings. As described above, the two-dimensional scanning light source 2200 can be made into a compact device providing collimated scanning light source in two dimensions, which can be integrated easily into a display system. An example is described below with reference to FIG. 23. In other embodiments, the components can be made separately and assembled into a two-dimensional scanning light source.

Figure 23:
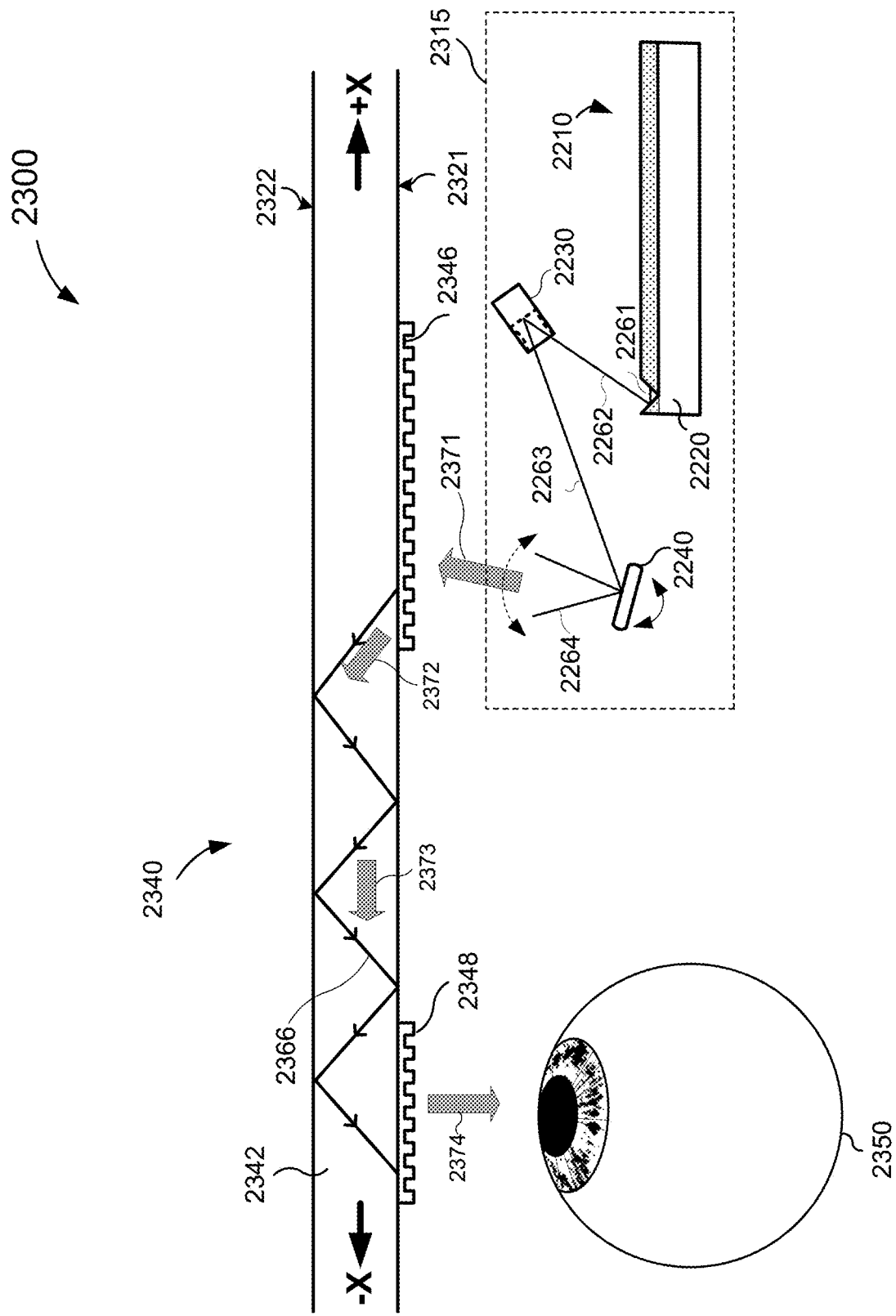
FIG. 23 is a simplified schematic diagram illustrating another waveguide display system including a projector integrated with a scanning mirror according to some embodiments of the present invention.

FIG. 23 is a simplified schematic diagram illustrating another waveguide display system including a projector integrated with a scanning mirror according to some embodiments of the present invention. As shown in FIG. 23, a waveguide display system 2300 includes an eyepiece waveguide 2340 having a planar waveguide 2342 with a first surface 2321 and a second surface 2322. The eyepiece waveguide 2340 also has an incoupling diffractive optical element (DOE) 2346 coupled to a first lateral region of the waveguide 2342, and an outcoupling DOE 2348 coupled to a second lateral region of the waveguide 2342. While the incoupling and outcoupling DOEs are described as being laterally offset, other configurations are possible. For example, the incoupling DOE may be vertically offset or offset at an angle from the outcoupling DOE on a waveguide surface. A cantilever based two-dimensional scanning light source 2315 is disposed adjacent to the first surface 2321 of the waveguide 2342.

Two-dimensional scanning light source 2315 is similar to two-dimensional scanning light source 2200 of FIGS. 22A and 22B, and corresponding components are marked with the same reference numerals and the discussion provided in relation to FIGS. 22A and 22B is applicable to FIG. 23 as appropriate.

As shown, two-dimensional scanning light source 2315 includes a cantilever scanner 2210 configured to provide a scanning light beam 2261, a reflective optical element 2220 disposed adjacent to the cantilever scanner 2210 and configured to receive the scanning light beam 2262 and to provide a reflected scanning light beam 2222. Two-dimensional scanning light source 2315 also includes a collimating optical element 2230 disposed adjacent to the reflective optical element 2220 and configured to receive the reflected scanning light beam 2262 from the reflective optical element 2220 and to provide a collimated scanning light beam 2263. Two-dimensional scanning light source 2200 further includes a scanning optical element 2240 disposed adjacent to the collimating optical element 2230 and configured to receive the collimated scanning light beam 2263 and to provide a collimated two-dimensional scanning light beam 2264. More details of two-dimensional scanning light source 2315 can be found in the description of two-dimensional scanning light source 2200 of FIGS. 22A and 22B, and are not repeated here.

The waveguide 2342 is configured to receive the collimated two-dimensional scanning light beam 2264 at the incoupling DOE 2346 and to propagate the collimated two-dimensional scanning light beam to the outcoupling DOE 2348 through total internal reflection (TIR). For example, the collimated two-dimensional scanning light beam 2264 is incident upon the incoupling DOE 2346 and meets the TIR condition of the waveguide 2342 in the "−X" direction toward the outcoupling DOE 2348, as shown by light beam 2366. The dimensions of the incoupling DOE 2346 can be selected such that all angles of light scanned toward the waveguide by scanning optical element 2240 are incident on the incoupling DOE 2346. In some embodiments, the incoupling DOE 2346 is laterally elongated. The outcoupling DOE 2348 may include a diffraction grating (may be referred herein as an outcoupling grating) configured to diffract a portion of light beam 2366 out of the waveguide 2342 and toward an eye 2350 of a viewer. To illustrate the light path for image projection, the light beams that are diffracted in the waveguide and emitted to reach the eye 2350 of the viewer are marked by grey arrows 2371, 2372, 2373, and 2374.

In the example of FIG. 23, the components of two-dimensional scanning light source 2315, including the cantilever scanner 2210, the reflective optical element 2220, the collimating optical element 2230, and the scanning optical element 2240, are disposed on a same side of the waveguide, adjacent to the first surface 2321. In alternative embodiments, two-dimensional scanning light source 2315 can also be disposed adjacent to the second surface 2322 of the waveguide 2342, with the incident angle of collimated two-dimensional scanning light beam 2264 selected such that the collimated two-dimensional scanning light beam 2264 is received at the incoupling DOE 2346 and propagated to the outcoupling DOE 2348 through total internal reflection (TIR). The proper incident angle can be selected using the techniques described above in connection with the various configurations of waveguide display systems.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A waveguide display system, comprising:
    a waveguide having a first surface and a second surface, the waveguide including an incoupling diffractive optical element (DOE) and an outcoupling DOE, wherein the incoupling DOE of the waveguide is configured to receive a diverging first light beam transmitted toward the incoupling DOE of the waveguide;
    a first reflective optical element configured to receive the diverging first light beam after passing through the incoupling DOE of the waveguide, the first reflective optical element being configured to reflect a collimated second light beam toward the incoupling DOE of the waveguide;
    wherein the waveguide display system is configured to:
        prevent propagation of the diverging first light beam to the outcoupling DOE in the waveguide through total internal reflection (TIR); and
        cause the collimated second light beam to propagate to the outcoupling DOE in the waveguide through TIR.

2. The waveguide display system of claim 1, wherein angles of incidence of the diverging first light beam, the collimated second light beam, and a grating period of the incoupling DOE are configured to determine diffraction angles, such that the diverging first light beam transmitted through the incoupling DOE does not satisfy a TIR condition for the diverging first light beam to propagate to the outcoupling DOE, and the collimated second light beam reaching the incoupling DOE satisfies the TIR condition to propagate to the outcoupling DOE.

3. The waveguide display system of claim 1, wherein:
    diffraction of the diverging first light beam by the incoupling DOE produces a first negative first order diffracted light beam that fails total internal reflection (TIR) condition of the waveguide; and
    diffraction of the collimated second light beam by the incoupling DOE produces a second negative first order diffracted light beam that meets the TIR condition of the waveguide.

4. The waveguide display system of claim 1, wherein:
    the diverging first light beam is a non-scanning collimated image beam; and
    the first reflective optical element is a scanning mirror.

5. The waveguide display system of claim 1, wherein the diverging first light beam is provided by a scanning light source, and the first reflective optical element is a collimating scanning mirror.

6. The waveguide display system of claim 5, wherein the scanning light source comprises a fiber scanner.

7. The waveguide display system of claim 5, wherein the scanning light source comprises a cantilever scanner.

8. The waveguide display system of claim 1, further comprising a scanning mirror and a light source, wherein the diverging first light beam is a scanned divergent light beam provided by the scanning mirror;
    wherein the scanning mirror is configured to receive an input light beam from the light source and provide the scanned divergent light beam, the scanned divergent light beam being transmitted through the waveguide to reach the first reflective optical element; and
    wherein the first reflective optical element is a collimating mirror, which is configured to receive the scanned divergent light beam and provide a reflected collimated light beam to the waveguide.

9. The waveguide display system of claim 8, wherein the light source comprises a fiber scanner.

10. The waveguide display system of claim 8, wherein the light source comprises a cantilever scanner.

11. A waveguide display system, comprising:
    a waveguide having a first surface and a second surface, the waveguide including an incoupling diffractive optical element (DOE) and an outcoupling DOE;
    a point light source disposed adjacent to the first surface of the waveguide, wherein the point light source is configured to provide a divergent input light beam to a portion of the waveguide outside the incoupling DOE;
    a scanning mirror disposed adjacent to the second surface of the waveguide, the scanning mirror being configured to receive the divergent input light beam from the point light source through the waveguide and to provide a divergent reflected light beam toward the incoupling DOE of the waveguide;
    a collimating scanning optical element positioned adjacent to the first surface of the waveguide, the collimating scanning optical element being configured to receive the divergent reflected light beam emitted from the scanning mirror through the incoupling DOE of the waveguide and to produce a collimated reflected light beam propagating toward the incoupling DOE of the waveguide;
    wherein the incoupling DOE is configured to:
        prevent the divergent reflected light beam from the scanning mirror from propagating to the outcoupling DOE in the waveguide through total internal reflection (TIR); and
        cause the collimated reflected light beam to propagate to the outcoupling DOE in the waveguide through total internal reflection (TIR).

12. The waveguide display system of claim 11, wherein the incoupling DOE is a periodic grating having a pitch configured to selectively incouple light beams of different incident angles.

13. The waveguide display system of claim 11, wherein the point light source comprises a fiber point light source including an optical fiber having a tip with an angled facet and the optical fiber is configured to emit a light beam in a direction at an angle with respect to an axis of the optical fiber.

14. The waveguide display system of claim 11, wherein the point light source comprises a cantilever scanner with a waveguide.

15. A waveguide display system, comprising:
- a waveguide having a first surface and a second surface, the waveguide including an incoupling diffractive optical element (DOE) and an outcoupling DOE;
- a cantilever scanner disposed adjacent to the first surface of the waveguide, wherein the cantilever scanner is configured to provide a scanning light beam;
- a reflective optical element disposed adjacent to the cantilever scanner and configured to receive the scanning light beam and to provide a reflected scanning light beam;
- a collimating optical element disposed adjacent to the reflective optical element and configured to receive the reflected scanning light beam from the reflective optical element and to provide a collimated scanning light beam; and
- a scanning optical element disposed adjacent to the collimating optical element and configured to receive the collimated scanning light beam and to provide a collimated two-dimensional scanning light beam;

wherein the cantilever scanner, the reflective optical element, the collimating optical element, and the scanning optical element are disposed on a same side of the waveguide adjacent to the first surface; and wherein the waveguide is configured to receive the collimated two-dimensional scanning light beam at the incoupling DOE and to propagate the collimated two-dimensional scanning light beam to the outcoupling DOE through total internal reflection (TIR).

16. The waveguide display system of claim 15, wherein the cantilever scanner comprises:
- a base portion;
- a cantilevered optical member protruding from the base portion, the cantilevered optical member including a waveguide for coupling to a light source; and
- a transducer assembly comprising one or more piezoelectric actuators coupled to the cantilevered optical member and configured to induce motion of the cantilevered optical member in a first scan plane to provide the scanning light beam.

17. The waveguide display system of claim 15, wherein the collimating optical element comprises a mirror with positive optical power.

18. The waveguide display system of claim 17, wherein the collimating optical element is a concave mirror.

19. The waveguide display system of claim 15, wherein the scanning optical element is a one-axis scanning mirror that scans in a direction orthogonal to a scan direction of the cantilever scanner.

* * * * *